(12) United States Patent
Taguchi

(10) Patent No.: US 7,390,083 B2
(45) Date of Patent: Jun. 24, 2008

(54) INK-JET RECORDING INK AND METHOD OF INK-JET RECORDING

(75) Inventor: Toshiki Taguchi, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 159 days.

(21) Appl. No.: 10/504,029

(22) PCT Filed: Feb. 4, 2003

(86) PCT No.: PCT/JP03/01127

§ 371 (c)(1),
(2), (4) Date: Feb. 4, 2005

(87) PCT Pub. No.: WO03/066753

PCT Pub. Date: Aug. 14, 2003

(65) Prior Publication Data

US 2005/0117006 A1    Jun. 2, 2005

(30) Foreign Application Priority Data

Feb. 8, 2002 (JP) ............................ 2002-032495
Feb. 12, 2002 (JP) ............................ 2002-034141

(51) Int. Cl.
*G01D 11/00* (2006.01)

(52) U.S. Cl. ................. 347/100; 347/95; 106/31.27

(58) Field of Classification Search ................ 347/100, 347/95, 96, 101; 106/31.27, 31.13, 31.6; 523/160
See application file for complete search history.

(56) References Cited

U.S. PATENT DOCUMENTS

| | | | |
|---|---|---|---|
| 3,287,470 A | 11/1966 | Geigy | |
| 5,451,251 A * | 9/1995 | Mafune et al. | 347/100 |
| 5,704,969 A | 1/1998 | Kanaya et al. | |
| 6,582,502 B2 | 6/2003 | Fujiwara | |
| 2002/0107301 A1 * | 8/2002 | Yamanouchi et al. | 523/160 |
| 2002/0158952 A1 * | 10/2002 | Adachi et al. | 347/100 |
| 2003/0078320 A1 * | 4/2003 | Yatake | 523/160 |
| 2003/0117474 A1 | 6/2003 | Harada et al. | |
| 2003/0213405 A1 | 11/2003 | Harada et al. | |

FOREIGN PATENT DOCUMENTS

| | | |
|---|---|---|
| EP | 20161 A2 | 12/1980 |
| EP | 1 364 994 A1 | 11/2003 |
| EP | 1 388 579 A2 | 2/2004 |
| JP | 2000-239584 A | 9/2000 |
| JP | 2002-285050 A | 10/2002 |
| JP | 2003-64275 A | 3/2003 |
| WO | WO 96/34916 A2 | 11/1996 |
| WO | WO 02/060994 A1 | 8/2002 |
| WO | WO 02/083662 A2 | 10/2002 |
| WO | WO 02/083795 A2 * | 10/2002 |
| WO | WO 03/000811 A1 | 1/2003 |
| WO | WO 03/062324 A1 | 7/2003 |
| WO | WO 03/087231 A1 | 10/2003 |

OTHER PUBLICATIONS

Kabushiki Kaisha Gijutsu Joho Kyokai, "Ink Jet Kiroku ni okeru Ink-Media-Printer no Kaiharsu Gijutsu," Kazuhiro Takausu, Feb. 1, 2001, p. 14.

* cited by examiner

*Primary Examiner*—Manish S. Shah
(74) *Attorney, Agent, or Firm*—Sughrue Mion, PLLC

(57) ABSTRACT

An inkjet recording ink including an aqueous medium having dissolved or dispersed therein a dye having a specific property or structure, and containing at least one antiseptic is provided, which can ensure excellent ejection stability and color hue even after long-term aging of the ink and exhibit excellent weather resistance.

10 Claims, No Drawings

INK-JET RECORDING INK AND METHOD OF INK-JET RECORDING

TECHNICAL FIELD

The present invention relates to an inkjet recording ink and a recording method using the ink, more specifically, the present invention relates to an inkjet recording ink capable of providing a recorded image with excellent preservability and high image quality such as color hue and color density, and ensuring excellent ink ejection stability.

BACKGROUND ART

Accompanying recent popularization of computers, an inkjet printer is widely used for printing letters or drawing an image on paper, film, cloth or the like not only at offices but also at homes.

The inkjet recording method includes a system of jetting out a liquid droplet by applying a pressure from a piezoelectric element, a system of jetting out a liquid droplet by generating a bubble in the ink under heat, a system of using an ultrasonic wave, and a system of jetting out a liquid droplet by suction using an electrostatic force. The inkjet recording ink used therefor includes an aqueous ink, an oily ink and a solid (fusion-type) ink.

Among these inks, an aqueous ink is relatively superior to oily ink or solid (fusion-type) ink in view of production, handleability, odor, safety and the like and therefore, is predominating as the inkjet recording ink at present.

The coloring matter used in such an inkjet recording ink is required to have high solubility in a solvent (ink medium), enable high-density recording, provide good color hue, exhibit excellent fastness to light, heat, air, water and chemicals, ensure good fixing to an image-receiving material and less bleeding, give an ink having excellent storability, have high purity and no toxicity, and be available at a low cost.

However, it is very difficult to find out a coloring matter satisfying these requirements in a high level. Among these requirements, good color hue and excellent fastness are conflicting in many cases and regarding the coloring material for magenta or cyan ink, a coloring matter satisfying the above-described requirements, particularly a coloring matter satisfying both good magenta or cyan color hue and light fastness high enough to withstand the oxidative atmosphere, can be hardly obtained.

Accordingly, although various dyes and pigments for use in inkjet recording have been already proposed and are actually used, a coloring matter satisfying all of the requirements described above is not yet found out at present.

Conventionally well-known dyes and pigments having a color index (C.I.) number can hardly satisfy both color hue and fastness required of the inkjet recording ink.

As for the dye capable of improving the fastness, azo dyes derived from an aromatic amine and a 5-membered heterocyclic amine have been proposed in Patent Document 1. However, these dyes have a problem of bad color reproducibility due to undesirable color hue present in the yellow and cyan regions.

Patent Documents 2 and 3 are disclosing an inkjet recording ink with an attempt to satisfy both color hue and light fastness. However, in use as a water-soluble ink, the coloring matters used in these patent publications are insufficient in the solubility in water. Also, when the coloring matters described in these patent publications are used as a water-soluble ink for inkjet recording, there arises a problem in the fastness to humidity and heat.

In order to solve these problems, compounds and ink compositions described in Patent Document 4 have been proposed. Furthermore, an inkjet recording ink using a pyrazolylaniline azo dye for improving the color hue and light fastness is described (Patent Document 5). However, these inkjet recording inks all are insufficient in the color reproducibility and fastness of the image output.

It has been also found that when an image is recorded on an inkjet special glossy paper for photographic image quality and put on a wall in a room, the image sometimes exhibits extremely bad preservability. The present inventors assume that this phenomenon is ascribable to some oxidative gas in air, such as ozone. This phenomenon scarcely occurs when the air flow is shut out, for example, by putting the image in a glass-made frame, but in this case, use conditions are limited.

This phenomenon is outstanding particularly in the case of inkjet special glossy paper for photographic image quality and raises a large problem for current inkjet recording systems where one of important characteristic features is the photographic image quality.

Furthermore, the aqueous ink is found to readily putrefy and cause a problem that when the ink is aged for a long period of time, the ejection property is seriously worsened due to putrefaction. It is also found that when a single antiseptic is used, the tolerance of bacteria increases and the effect is disadvantageously less expressed.

List of Patent Documents as Related Art

[Patent Document 1]
JP-A-55-161856 (the term "JP-A" as used herein means an "unexamined published Japanese patent application")
[Patent Document 2] JP-A-61-36362
[Patent Document 3] JP-A-2-212566
[Patent Document 4]
JP-T-11-504958 (the term "JP-T" as used herein means a "published Japanese translation of a PCT patent application")
[Patent Document 5]
Japanese Patent Application No. 2000-80733

An object of the present invention is to provide an inkjet recording ink which ensures excellent ejection stability and color hue even after long-term aging of the ink and exhibits excellent weather resistance, and a recording method using the ink.

DISCLOSURE OF THE INVENTION

The objects of the present invention can be attained by the techniques described in the following 1 to 19.

1. An inkjet recording ink comprising an aqueous medium having dissolved or dispersed therein a dye, wherein the dye is a water-soluble dye having an oxidation potential nobler than 1.0 V (vs SCE) and at least one antiseptic is contained in the ink.

2. The inkjet recording ink as described in 1 above, which is an inkjet recording ink comprising an aqueous medium having dissolved or dispersed therein a magenta dye selected from azo dyes, wherein the magenta dye is a dye having an absorption maximum in the spectral region of 500 to 580 nm in the aqueous medium and at the same time, having an oxidation potential nobler than 1.0 V (vs SCE) and at least one antiseptic is contained in the ink.

3. The inkjet recording ink as described in 1 or 2 above, wherein the azo dye has a chromophore represented by the formula: (heterocyclic ring A)-N=N-(heterocyclic ring B), provided that the heterocyclic ring A and the heterocyclic B may have the same structure.

4. The inkjet recording ink as described in any one of 1 to 3 above, wherein the azo dye is an azo dye in which an aromatic nitrogen-containing 6-membered heterocyclic ring is bonded as a coupling component directly to at least one side of the azo group.

5. The inkjet recording ink as described in any one of 1 to 4 above, wherein the azo dye is an azo dye having an aromatic ring amino group- or heterocyclic amino group-containing structure as an auxochrome.

6. The inkjet recording ink as described in any one of 1 to 15 above, wherein the azo dye is an azo dye having a steric structure.

7. The inkjet recording ink as described in any one of 1 to 6 above, wherein the azo dye is a dye represented by the following formula (1):

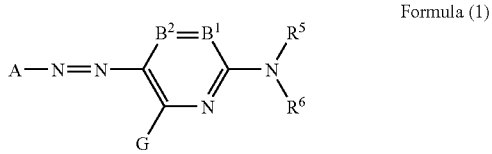

Formula (1)

wherein A represents a 5-membered heterocyclic group;

$B^1$ and $B^2$ each represents $=CR^1-$ or $-CR^2=$ or either one of $B^1$ and $B^2$ represents a nitrogen atom and the other represents $=CR^1-$ or $-CR^2=$;

$R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted;

G, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted; and $R^1$ and $R^5$, or $R^5$ and $R^6$ may combine to form a 5- or 6-membered ring.

8. The inkjet recording ink as described in any one of 1 to 7 above, wherein the ozone discoloration rate constant of recorded image is $5.0 \times 10^{-2}$ [hour$^{-1}$] or less.

9. The inkjet recording ink as described in 1 above, which is an inkjet recording ink comprising an aqueous medium having dissolved or dispersed therein a phthalocyanine dye, wherein the phthalocyanine dye is a water-soluble dye having an oxidation potential nobler than 1.0 and at least one antiseptic is contained in the ink.

10. The inkjet recording ink as described in 9 above, wherein after storage in an ozone environment of 5 ppm for 24 hours, the monochromatic moiety printed by using a single (cyan) color of the ink to give a cyan reflection density of 0.9 to 1.1 in a Status A filter has a coloring matter residual ratio (density after discoloration/initial density×100) of 60% or more.

11. The inkjet recording ink as described in 9 or 10 above, wherein after discoloration with ozone under the conditions of 10 above, the amount of Cu ion flowed out from the ink into water is 20% or less of all dyes.

12. The inkjet recording ink as described in any one of 9 to 11 above, wherein the phthalocyanine dye is a water-soluble dye having an electron-withdrawing group at the β-position of a benzene ring of the phthalocyanine.

13. The inkjet recording ink as described in any one of 9 to 12 above, wherein the phthalocyanine dye is a water-soluble phthalocyanine dye produced by a process not passing through sulfonation of an unsubstituted phthalocyanine.

14. The inkjet recording ink as described in 9 to 13 above, wherein the phthalocyanine dye is represented by the following formula (I):

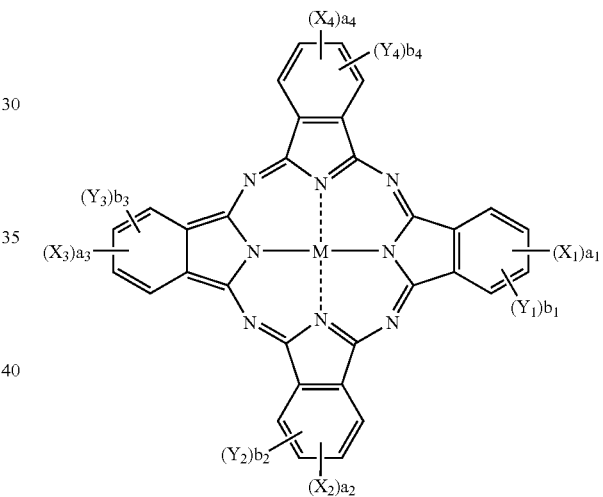

Formula (I)

wherein $X_1$, $X_2$, $X_3$ and $X_4$ each independently represents $-SO-Z$, $-SO_2-Z$, $-SO_2NR1R2$, a sulfo group, $-CONR1R2$ or $-CO_2R1$;

Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, and R1 and R2 each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that when a plurality of Zs are present, these may be the same or different;

$Y_1$, $Y_2$, $Y_3$ and $Y_4$ each independently represents a monovalent substituent;

provided that when a plurality of $X_1$s, $X_2$s, $X_3$s, $X_4$s, $Y_1$s, $Y_2$s, $Y_3$s or $Y_4$s are present, these may be the same or different;

$a_1$ to $a_4$ and $b_1$ to $b_4$ represent the number of substituents $X_1$ to $X_4$ and $Y_1$ to $Y_4$, respectively, $a_1$ to $a_4$ each independently represents an integer of 0 to 4 but all are not 0 at the same time, and $b_1$ to $b_4$ each independently represents an integer of 0 to 4; and M represents a hydrogen atom, a metal atom or an oxide, hydroxide or halide thereof.

15. The inkjet recording ink as described in 14 above, wherein the dye represented by formula (I) is a dye represented by the following formula (II):

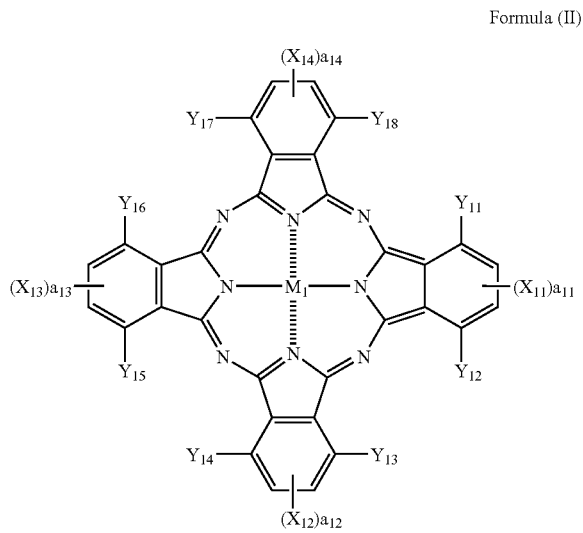

Formula (II)

wherein $X_{11}$ to $X_{14}$, $Y_{11}$ to $Y_{18}$ and $M_1$ have the same meanings as $X_1$ to $X_4$, $Y_1$ to $Y_4$ and M in formula (I), respectively, and $a_{11}$ to $a_{14}$ each independently represents an integer of 1 or 2.

16. The inkjet recording ink as described in any one of 1 to 15 above, which contains two or more different antiseptics.

17. The inkjet recording ink as described in any one of 1 to 16 above, which contains an organic solvent having a boiling point of 150° C. or more.

18. An inkjet recording method comprising using the inkjet recording ink described in 1 to 17 above.

19. An inkjet recording method comprising ejecting ink droplets according to recording signals on an image-receiving material comprising a support having thereon an image-receiving layer containing a white inorganic pigment particle, thereby recording an image on the image-receiving material, wherein the ink droplet comprises the inkjet recording ink described in 1 to 17 above.

The present invention is described in detail below.

As a result of intensive investigations on the inkjet recording ink, the present inventors have found that the properties required of the dye are 1) to give a good color hue and be free of change in the color hue (solvate), 2) to exhibit excellent fastness (to light, ozone, NOx, solvent, oil and water), 3) to be safe (not carcinogenic by AMES, not irritating to skin and easily degradable), 4) to be inexpensive, 5) to have high ε, 6) to be highly soluble, and 7) to have strong fixing property to a medium.

The properties required of the ink and conc. ink are 1) to be uniform irrespective of the temperature and aging, 2) to be less contaminated, 3) to exhibit good penetration into a medium, 4) to be uniform in the hitting size, 5) to be usable for all types of paper, 6) to be easily prepared, 7) to ensure no ejection error, less bubbling and easy defoaming, and 8) to be stably ejected.

The properties required of the image is 1) to be clear without blurring, discoloration and beading, 2) to have scratch resistance, 3) to have high and uniform gloss, 4) to have good image preservability and excellent balance in discoloration, 5) to be quickly dried, 6) to be printed at a high speed, and 7) to have no image density dependency in the discoloration ratio.

Specific embodiments of the present invention are described in detail below.

[Magenta Dye]

In order to satisfy the objective properties of the present invention, the image recording is performed by using a dye having properties specified in 1. to 18. above for the magenta ink. Accordingly, these properties of the magenta dye are described below.

In the magenta ink used for the inkjet recording ink of the present invention, a magenta dye selected from azo dyes is dissolved or dispersed in an aqueous medium and this dye is fundamentally characterized in that the absorption maximum in the aqueous medium is present in the spectral region of 500 to 580 nm and the oxidation potential is nobler than 1.0 V (vs SCE).

The first preferred structural feature of this azo dye is that the dye has a chromophore represented by the formula: (heterocyclic ring A)-N=N-(heterocyclic ring B). In this case, the heterocyclic rings A and B may have the same structure. Specifically, the heterocyclic rings A and B each is a 5- or 6-membered heterocyclic ring selected from pyrazole, imidazole, triazole, oxazole, thiazole, selenazole, pyridone, pyrazine, pyrimidine and pyridine. These are specifically described, for example, in Japanese Patent Application Nos. 2000-15853 and 2001-15614, JP-A-2002-309116 and Japanese Patent Application No. 2001-195014.

The second preferred structural feature of the azo dye is that an aromatic nitrogen-containing 6-membered heterocyclic ring is bonded as a coupling component directly to at least one side of the azo group. Specific examples thereof are described in 2001-110457.

The third preferred structural feature is that the auxochrome has an aromatic ring amino group or heterocyclic amino group structure, specifically, an anilino group or a heterylamino group.

The fourth preferred structural feature is that the dye has a steric structure. This is specifically described in Japanese Patent Application No. 2002-12015.

Among these preferred structural features of the azo dye, the dye most preferred for achieving the objects of the present invention is a dye represented by the following formula (1):

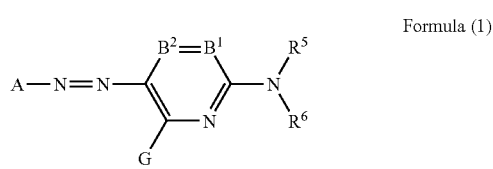

Formula (1)

wherein A represents a 5-membered heterocyclic group;

$B^1$ and $B^2$ each represents $=CR^1-$ or $-CR^2=$ or either one of $B^1$ and $B^2$ represents a nitrogen atom and the other represents $=CR^1-$ or $-CR2=$;

$R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted;

G, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted; and $R^1$ and $R^5$, or $R^5$ and $R^6$ may combine to form a 5- or 6-membered ring.

The dye of formula (1) is described in more detail.

In formula (1), A represents a 5-membered heterocyclic group. Examples of the heteroatom of the heterocyclic ring include N, O and S. A is preferably a nitrogen-containing 5-membered heterocyclic ring and the heterocyclic ring may be condensed with an aliphatic ring, an aromatic ring or another heterocyclic ring. Preferred examples of the heterocyclic ring represented by A include a pyrazole ring, an imidazole ring, a thiazole ring, an isothiazole ring, a thiadiazole ring, a benzothiazole ring, a benzoxazole ring and a benzisothiazole ring. Each heterocyclic group may further have a substituent. Among these rings, more preferred are a pyrazole ring, an imidazole ring, an isothiazole ring, a thiadiazole ring and a benzothiazole ring represented by the following formulae (a) to (f):

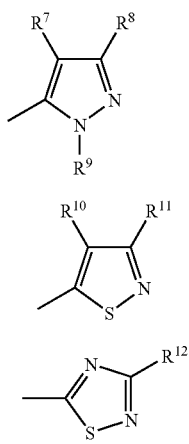

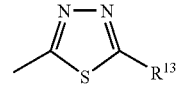

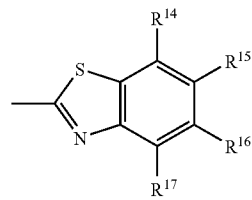

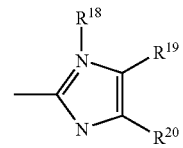

wherein $R^7$ to $R^{20}$ each represents the same substituent as G, $R^1$ and $R^2$ in formula (1).

Among formulae (a) to (f), preferred are a pyrazole ring and an isothiazole ring represented by formulae (a) and (b), and most preferred is a pyrazole ring represented by formula (a).

In formula (1), $B^1$ and $B^2$ each represents $=CR^1-$ or $-CR^2=$ or either one of $B^1$ and $B^2$ represents a nitrogen atom and the other represents $=CR^1-$ or $-CR^2=$. $B^1$ and $B^2$ each preferably represents $=CR^1-$ or $-CR^2=$.

$R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted.

$R^5$ and $R^6$ each is preferably a hydrogen atom, an aliphatic group, an aromatic group, a heterocyclic group, an acyl group, an alkylsulfonyl group or an arylsulfonyl group, more preferably a hydrogen atom, an aromatic group, a heterocyclic group, an acyl group, an alkylsulfonyl group or an arylsulfonyl group, and most preferably a hydrogen atom, an aryl group or a heterocyclic group, and the hydrogen atom of each substituent may be substituted, but $R^5$ and $R^6$ are not a hydrogen atom at the same time.

G, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted.

G is preferably a hydrogen atom, a halogen atom, an aliphatic group, an aromatic group, a hydroxy group, an alkoxy group, an aryloxy group, an acyloxy group, a heterocyclic oxy group, an amino group, an acylamino group, a ureido group, a sulfamoylamino group, an alkoxycarbonylamino group, an aryloxycarbonylamino group, an alkylthio group, an arylthio group or a heterocyclic thio group, more preferably a hydrogen atom, a halogen atom, an alkyl group, a hydroxy group, an alkoxy group, an aryloxy group, an acyloxy group, an amino group or an acylamino group, and most preferably a hydrogen atom, an amino group (preferably an anilino group) or an acylamino group, and the hydrogen atom of each substituent may be substituted.

$R^1$ and $R^2$ each is preferably a hydrogen atom, an alkyl group, a halogen atom, an alkoxycarbonyl group, a carboxyl group, a carbamoyl group, a hydroxy group, an alkoxy group or a cyano group, and the hydrogen atom of each substituent may be substituted.

$R^1$ and $R^5$, or $R^5$ and $R^6$ may combine to form a 5- or 6-membered ring.

When A has a substituent or when the substituent $R^1$, $R^2$, $R^5$, $R^6$ or G further has a substituent, examples of the substituent include the substituents described above for G, $R^1$ and $R^2$.

In the case where the dye of the present invention is a water-soluble dye, the dye preferably further has an ionic hydrophilic group as a substituent on any position of A, $R^1$, $R^2$, $R^5$, $R^6$ and G. Examples of the ionic hydrophilic group as a substituent include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium).

The terms (substituents) used in the present invention are described below. These terms each is common among different symbols in formula (1) and also in formula (1a) shown later.

The halogen atom includes a fluorine atom, a chlorine atom and a bromine atom.

The aliphatic group means an alkyl group, a substituted alkyl group, an alkenyl group, a substituted alkenyl group, an alkynyl group, a substituted alkynyl group, an aralkyl group and a substituted aralkyl group. The "substituted" used for a "substituted alkyl group" and the like in the present invention means that the hydrogen atom present in an "alkyl group" or the like is substituted, for example, by a substituent described above for G, $R^1$ and $R^2$.

The aliphatic group may be branched or may form a ring. The number of carbon atoms in the aliphatic group is preferably from 1 to 20, more preferably from 1 to 16. The aryl moiety in the aralkyl group and in the substituted aralkyl group is preferably a phenyl group or a naphthyl group, more preferably a phenyl group. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The aromatic group means an aryl group and a substituted aryl group. The aryl group is preferably a phenyl group or a naphthyl group, more preferably a phenyl group. The number of carbon atoms in the aromatic group is preferably from 6 to 20, more preferably from 6 to 16.

Examples of the aromatic group include a phenyl group, a p-tolyl group, a p-methoxyphenyl group, an o-chlorophenyl group and an m-(3-sulfopropylamino)phenyl group.

The heterocyclic group includes a substituted heterocyclic group. In the heterocyclic group, the heterocyclic ring may be condensed with an aliphatic ring, an aromatic ring or another heterocyclic ring. The heterocyclic group is preferably a 5- or 6-membered heterocyclic group. Examples of the substituent of the substituted heterocyclic group include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic group include a 2-pyridyl group, a 2-thienyl group, a 2-thiazolyl group, a 2-benzothiazolyl group, a 2-benzoxazolyl group and a 2-furyl group.

The carbamoyl group includes a substituted carbamoyl group. Examples of the substituent therefor include an alkyl group. Examples of the carbamoyl group include a methylcarbamoyl group and a dimethylcarbamoyl group.

The alkoxycarbonyl group includes a substituted alkoxycarbonyl group. The alkoxycarbonyl group is preferably an alkoxycarbonyl group having from 2 to 20 carbon atoms. Examples of the substituent of the substituted alkoxycarbonyl group include an ionic hydrophilic group. Examples of the alkoxycarbonyl group include a methoxycarbonyl group and an ethoxycarbonyl group.

The aryloxycarbonyl group includes a substituted aryloxycarbonyl group. The aryloxycarbonyl group is preferably an aryloxycarbonyl group having from 7 to 20 carbon atoms. Examples of the substituent of the substituted aryloxycarbonyl group include an ionic hydrophilic group. Examples of the aryloxycarbonyl group include a phenoxycarbonyl group.

The heterocyclic oxycarbonyl group includes a substituted heterocyclic oxycarbonyl group. Examples of the heterocyclic ring include the heterocyclic rings described above for the heterocyclic group. The heterocyclic oxycarbonyl group is preferably a heterocyclic oxycarbonyl group having from 2 to 20 carbon atoms. Examples of the substituent of the substituted heterocyclic oxycarbonyl group include an ionic hydrophilic group. Examples of the heterocyclic oxycarbonyl group include a 2-pyridyloxycarbonyl group.

The acyl group includes a substituted acyl group. The acyl group is preferably an acyl group having from 1 to 20 carbon atoms. Examples of the substituent of the substituted acyl group include an ionic hydrophilic group. Examples of the acyl group include an acetyl group and a benzoyl group.

The alkoxy group includes a substituted alkoxy group. The alkoxy group is preferably an alkoxy group having from 1 to 20 carbon atoms. Examples of the substituent of the substituted alkoxy group include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes a substituted aryloxy group. The aryloxy group is preferably an aryloxy group having from 6 to 20 carbon atoms. Examples of the substituent of the substituted aryloxy group include an alkoxy group and an ionic hydrophilic group. Examples of the aryloxy group include a phenoxy group, a p-methoxyphenoxy group and an o-methoxyphenoxy group.

The heterocyclic oxy group includes a substituted heterocyclic oxy group. Examples of the heterocyclic ring include the heterocyclic rings described above for the heterocyclic group. The heterocyclic oxy group is preferably a heterocyclic oxy group having from 2 to 20 carbon atoms. Examples of the substituent of the substituted heterocyclic oxy group include an alkyl group, an alkoxy group and an ionic hydrophilic group. Examples of the heterocyclic oxy group include a 3-pyridyloxy group and a 3-thienyloxy group.

The silyloxy group is preferably a silyloxy group substituted by an aliphatic or aromatic group having from 1 to 20 carbon atoms. Examples of the silyloxy group include a trimethylsilyloxy group and a diphenylmethylsilyloxy group.

The acyloxy group includes a substituted acyloxy group. The acyloxy group is preferably an acyloxy group having from 1 to 20 carbon atoms. Examples of the substituent of the substituted acyloxy group include an ionic hydrophilic group. Examples of the acyloxy group include an acetoxy group and a benzoyloxy group.

The carbamoyloxy group includes a substituted carbamoyloxy group. Examples of the substituent therefor include an alkyl group. Examples of the carbamoyloxy group include an N-methylcarbamoyloxy group.

The alkoxycarbonyloxy group includes a substituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes a substituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The amino group includes a substituted amino group. Examples of the substituent therefor include an alkyl group, an aryl group and a heterocyclic group, and the alkyl group, the aryl group and the heterocyclic group each may further have a substituent. The alkylamino group includes a substituted alkylamino group. The alkylamino group is preferably an alkylamino group having from 1 to 20 carbon atoms. Examples of the substituent of the substituted alkylamino group include an ionic hydrophilic group. Examples of the alkylamino group include a methylamino group and a diethylamino group.

The arylamino group includes a substituted arylamino group. The arylamino group is preferably an arylamino group having from 6 to 20 carbon atoms. Examples of the substituent of the substituted arylamino group include a halogen atom and an ionic hydrophilic group. Examples of the arylamino group include a phenylamino group and a 2-chlorophenylamino group.

The heterocyclic amino group includes a substituted heterocyclic amino group. Examples of the heterocyclic ring include the heterocyclic rings described above for the heterocyclic group. The heterocyclic amino group is preferably a heterocyclic amino group having from 2 to 20 carbon atoms. Examples of the substituent of the substituted heterocyclic amino group include an alkyl group, a halogen atom and an ionic hydrophilic group.

The acylamino group includes a substituted acylamino group. The acylamino group is preferably an acylamino group having from 2 to 20 carbon atoms. Examples of the substituent of the substituted acylamino group include an ionic hydrophilic group. Examples of the acylamino group include an acetylamino group, a propionylamino group, a benzoylamino group, an N-phenylacetylamino group and a 3,5-disulfobenzoylamino group.

The ureido group includes a substituted ureido group. The ureido group is preferably a ureido group having from 1 to 20 carbon atoms. Examples of the substituent of the substituted ureido group include an alkyl group and an aryl group. Examples of the ureido group include a 3-methylureido group, a 3,3-dimethylureido group and a 3-phenylureido group.

The sulfamoylamino group includes a substituted sulfamoylamino group. Examples of the substituent therefor include an alkyl group. Examples of the sulfamoylamino group include an N,N-dipropylsulfamoylamino group.

The alkoxycarbonylamino group includes a substituted alkoxycarbonylamino group. The alkoxycarbonylamino group is preferably an alkoxycarbonylamino group having from 2 to 20 carbon atoms. Examples of the substituent of the substituted alkoxycarbonylamino group include an ionic hydrophilic group. Examples of the alkoxycarbonylamino group include an ethoxycarbonylamino group.

The aryloxycarbonylamino group includes a substituted aryloxycarbonylamino group. The aryloxycarbonylamino group is preferably an aryloxycarbonylamino group having from 7 to 20 carbon atoms. Examples of the substituent of the substituted aryloxycarbonylamino group include an ionic hydrophilic group. Examples of the aryloxycarbonylamino group include a phenoxycarbonylamino group.

The alkylsulfonylamino group and the arylsulfonylamino group include a substituted alkylsulfonylamino group and a substituted arylsulfonylamino group, respectively. The alkylsulfonylamino group and the arylsulfonylamino group are preferably an alkylsulfonylamino group having from 1 to 20 carbon atoms and an arylsulfonylamino group having from 1 to 20 carbon atoms, respectively. Examples of the substituent of the substituted alkylsulfonylamino group and substituted arylsulfonylamino group include an ionic hydrophilic group. Examples of the alkylsulfonylamino group and arylsulfonylamino group include a methylsufonylamino group, an N-phenyl-methylsulfonylamino group, a phenylsulfonylamino group and a 3-carboxyphenyl-sulfonylamino group.

The heterocyclic sulfonylamino group includes a substituted heterocyclic sulfonylamino group. Examples of the heterocyclic ring include the heterocyclic rings described above for the heterocyclic group. The heterocyclic sulfonylamino group is preferably a heterocyclic sulfonylamino group having from 1 to 12 carbon atoms. Examples of the substituent of the substituted heterocyclic sulfonylamino group include an ionic hydrophilic group. Examples of the heterocyclic sulfonylamino group include a 2-thienylsulfonylamino group and a 3-pyridylsulfonylamino group.

The alkylthio group, the arylthio group and the heterocyclic thio group include a substituted alkylthio group, a substituted arylthio group and a substituted heterocyclic thio group, respectively. Examples of the heterocyclic ring include the heterocyclic rings described above for the heterocyclic group. The alkylthio group, the arylthio group and the heterocyclic thio group are preferably an alkylthio group having from 1 to 20 carbon atoms, an arylthio group having from 1 to 20 carbon atoms and a heterocyclic thio group having from 1 to 20 carbon atoms, respectively. Examples of the substituent of the substituted alkylthio group, substituted arylthio group and substituted heterocyclic thio group include an ionic hydrophilic group. Examples of the alkylthio group, arylthio group and heterocyclic thio group include a methylthio group, a phenylthio group and a 2-pyridylthio group.

The alkylsulfonyl group and the arylsulfonyl group include a substituted alkylsulfonyl group and a substituted arylsulfonyl group, respectively. Examples of the alkylsulfonyl group and arylsulfonyl group include a methylsulfonyl group and a phenylsulfonyl group.

The heterocyclic sulfonyl group includes a substituted heterocyclic sulfonyl group. Examples of the heterocyclic ring include the heterocyclic rings described above for the heterocyclic group. The heterocyclic sulfonyl group is preferably a heterocyclic sulfonyl group having from 1 to 20 carbon atoms. Examples of the substituent of the substituted heterocyclic sulfonyl group include an ionic hydrophilic group. Examples of the heterocyclic sulfonyl group include a 2-thienylsulfonyl group and a 3-pyridylsulfonyl group.

The alkylsulfinyl group and the arylsulfinyl group include a substituted alkylsulfinyl group and a substituted arylsulfinyl group, respectively. Examples of the alkylsulfinyl group and arylsulfinyl group include a methylsulfinyl group and a phenylsulfinyl group.

The heterocyclic sulfinyl group includes a substituted heterocyclic sulfinyl group. Examples of the heterocyclic ring include the heterocyclic rings described above for the heterocyclic group. The heterocyclic sulfinyl group is preferably a heterocyclic sulfinyl group having from 1 to 20 carbon atoms. Examples of the substituent of the substituted heterocyclic sulfinyl group include an ionic hydrophilic group. Examples of the heterocyclic sulfinyl group include a 4-pyridylsulfinyl group.

The sulfamoyl group includes a substituted sulfamoyl group. Examples of the substituent therefor include an alkyl group. Examples of the sulfamoyl group include a dimethylsulfamoyl group and a di-(2-hydroxyethyl)sulfamoyl group.

Among the dyes represented by formula (1), particularly preferred is a structure represented by the following formula (1a):

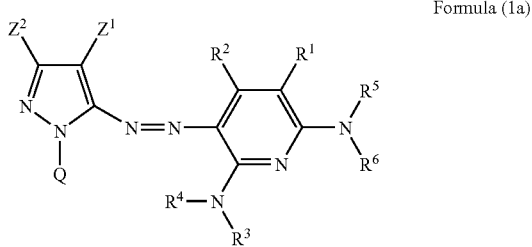

Formula (1a)

In formula (1a), $R^1$ $R^2$ $R^5$ and $R^6$ have the same meanings as in formula (1).

$R^3$ and $R^4$ each independently represents a hydrogen atom or a substituent and the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. $R^3$ and $R^4$ each is preferably a hydrogen atom, an aromatic group, a heterocyclic group, an acyl group, an alkylsulfonyl group or an arylsulfonyl group, more preferably a hydrogen atom, an aromatic group or a heterocyclic group.

$Z^1$ represents an electron-withdrawing group having a Hammett's substituent constant σp value of 0.20 or more. $Z^1$ is preferably an electron-withdrawing group having a σp value of 0.30 or more, more preferably 0.45 or more, still more preferably 0.60 to more, but the σp value preferably does not exceed 1.0. Specific preferred examples of this substituent include electron-withdrawing substituents described later. Among those, preferred are an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms and a halogenated alkyl group having from 1 to 20 carbon atoms, more preferred are a cyano group, an alkylsulfonyl group having from 1 to 20 carbon atoms and an arylsulfonyl group having from 6 to 20 carbon atoms, and most preferred is a cyano group.

$Z^2$ represents a hydrogen atom or a substituent and the substituent is an aliphatic group, an aromatic group or a heterocyclic group. $Z^2$ is preferably an aliphatic group, more preferably an alkyl group having from 1 to 6 carbon atoms.

Q represents a hydrogen atom or a substituent and the substituent is an aliphatic group, an aromatic group or a heterocyclic group. Q is preferably a group comprising a nonmetallic atom group necessary for forming a 5-, 6-, 7- or 8-membered ring. The 5-, 6-, 7- or 8-membered ring may be substituted, may be a saturated ring or may have an unsaturated bond. Q is more preferably an aromatic group or a heterocyclic group. Preferred examples of the nonmetallic atom include a nitrogen atom, an oxygen atom, a sulfur atom and a carbon atom. Specific examples of the ring structure include a benzene ring, a cyclopentane ring, a cyclohexane ring, a cycloheptane ring, a cyclooctane ring, a cyclohexene ring, a pyridine ring, a pyrimidine ring, a pyrazine ring, pyridazine ring, a triazine ring, an imidazole ring, a benzimidazole ring, an oxazole ring, a benzoxazole ring, a thiazole ring, a benzothiazole ring, an oxane ring, a sulfolane ring and a thiane ring.

The hydrogen atom of each substituent described in regard to formula (1a) may be substituted. Examples of the substituent include the substituents described in regard to formula (1), the groups described as examples for G, $R^1$ and $R^2$, and ionic hydrophilic groups.

Here, the Hammett's substituent constant σp value used in the present invention is described. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki (Chemistry Region)*, special number, No. 122, pp. 96-103, Nankodo (1979). In the present invention, each substituent is limited or described by using the Hammett's substituent constant σp but this does not mean that the substituent is limited only to those having a known value which can be found in the above-described publications. Needless to say, the substituent includes substituents of which σp value is not known in publications but when measured based on the Hammett's rule, falls within the range specified. Furthermore, although formula (1a) of the present invention includes those which are not a benzene derivative, the σp value is used as a measure for showing the electron effect of the substituent irrespective of the substitution site. In the present invention, the σp value is used in such a meaning.

Examples of the electron-withdrawing group having a Hammett's substituent constant σp value of 0.60 or more include a cyano group, a nitro group, an alkylsulfonyl group (e.g., methylsulfonyl) and an arylsulfonyl group (e.g., phenylsulfonyl).

Examples of the electron-withdrawing group having a Hammett's σp value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant σp value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a σp value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl).

Specific examples of the electron-withdrawing group having a σp value of 0.20 or more include, in addition to those described above, a halogen atom.

The preferred combination of substituents in the azo dye represented by formula (1) is described below. $R^5$ and $R^6$ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, $R^5$ and $R^6$ are not a hydrogen atom at the same time.

G is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

A is preferably a pyrazole ring, an imidazole ring, an isothiazole ring, a thiadiazole ring or a benzothiazole ring, more preferably a pyrazole ring or an isothiazole ring, and most preferably a pyrazole ring.

$B^1$ and $B^2$ each is preferably $=CR^1-$ or $-CR2=$, and $R^1$ and $R^2$ each is preferably a hydrogen atom, an alkyl group, a halogen atom, a cyano group, a carbamoyl group, a carboxyl group, a hydroxyl group, an alkoxy group or an alkoxycarbonyl group, more preferably a hydrogen atom, an alkyl group, a carboxyl group, a cyano group or a carbamoyl group.

As for the preferred combination of substituents in the compound represented by formula (1), a compound where at least one of various substituents is the preferred group is preferred, a compound where a larger number of various substituents are the preferred groups is more preferred, and a compound where all substituents are the preferred groups is most preferred.

Specific examples of the azo dye represented by formula (1) are shown in (Table 1) to (Table 13) below, but the azo dye for use in the present invention is not limited to those shown below.

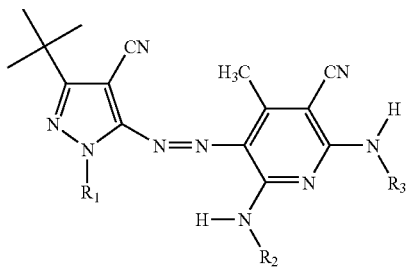

| Dye | $R_1$ | $R_2$ | $R_3$ |
|---|---|---|---|
| a-1 | 2-benzothiazolyl | –C₆H₄–C₈H₁₇ | –C₆H₄–C₈H₁₇ |
| a-2 | 5-chloro-2-benzothiazolyl | –C₆H₄–C₈H₁₇ | 2,4,6-trimethylphenyl |
| a-3 | 6-chloro-2-benzothiazolyl | 2,4,6-trimethylphenyl | –C₆H₄–C₈H₁₇ |
| a-4 | 2-benzothiazolyl | 2-(OC₈H₁₇)phenyl | –C₆H₄–C₈H₁₇ |

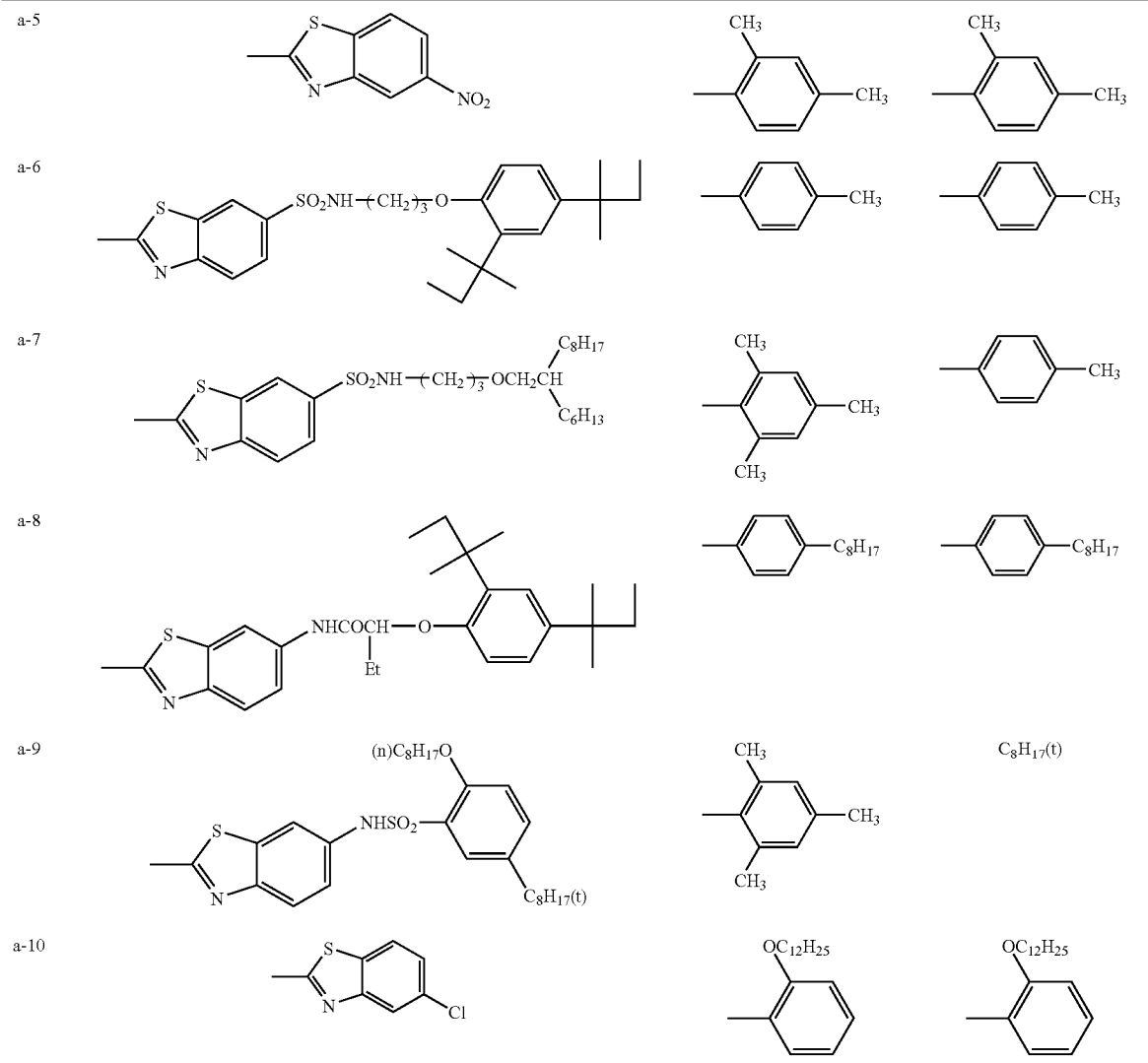

-continued
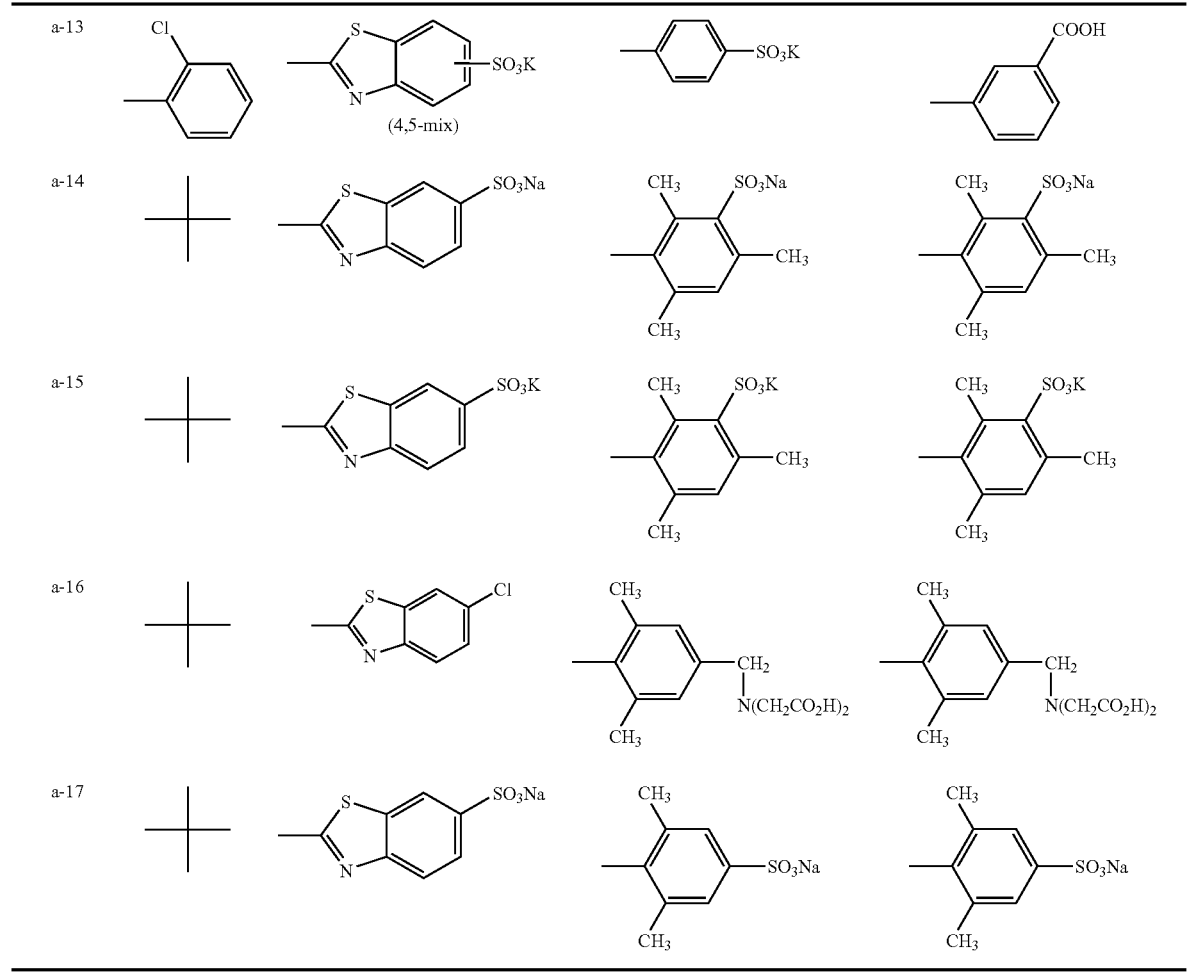
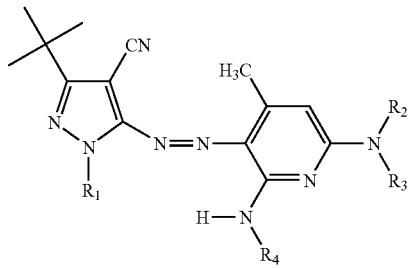
| Dye | R₁ | R₂ |
|---|---|---|
| a-18 | 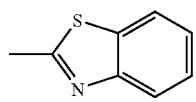 | 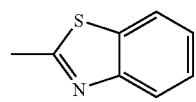 |
| a-19 | 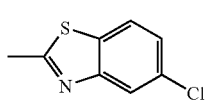 | —SO$_2$CH$_3$ |
| a-20 | 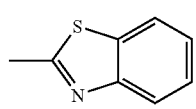 | —COCH$_3$ |

-continued
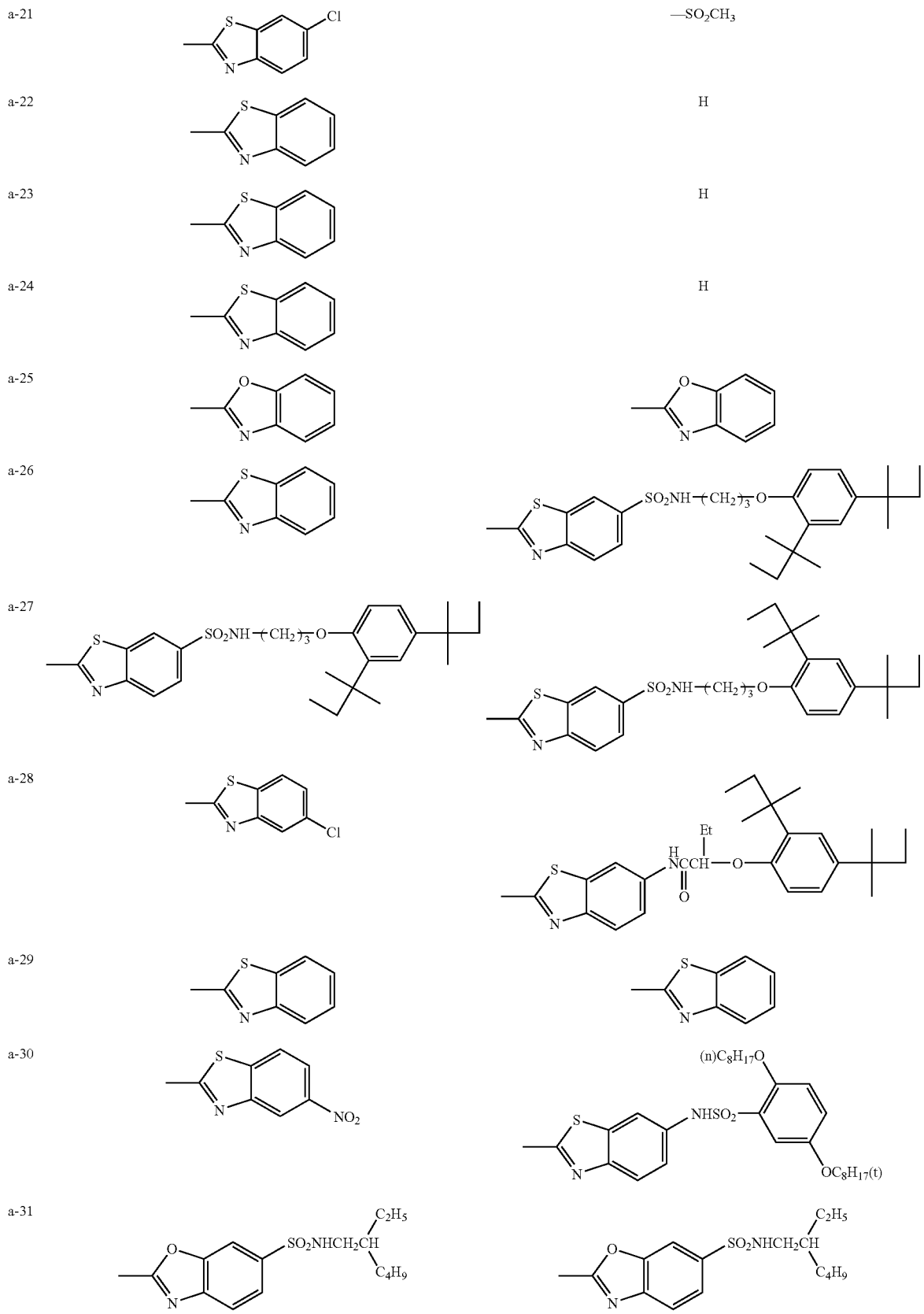

-continued
| | | |
|---|---|---|
| a-32 | 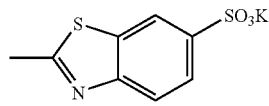 | 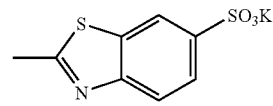 |
| a-33 | 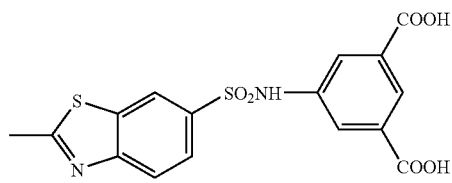 | 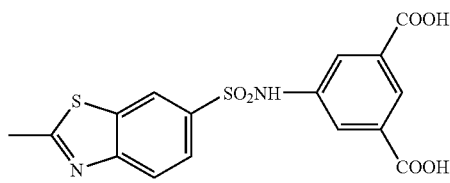 |
| a-34 | 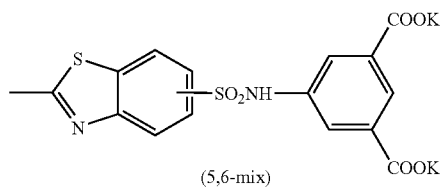<br>(5,6-mix) | 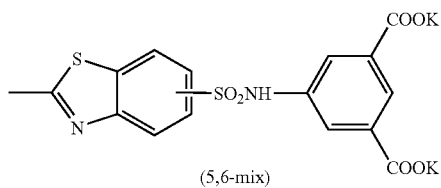<br>(5,6-mix) |
| a-35 | 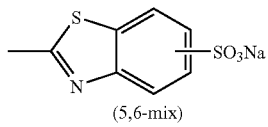<br>(5,6-mix) | 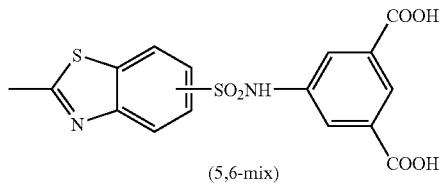<br>(5,6-mix) |
| a-36 | 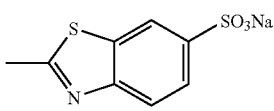 | 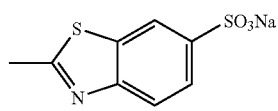 |
| a-37 | 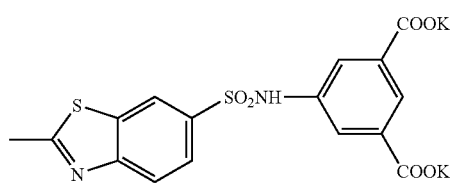 | 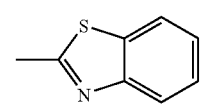 |
| a-38 | 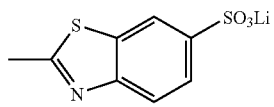 | 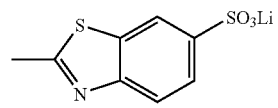 |
| a-39 | 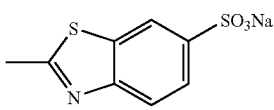 | 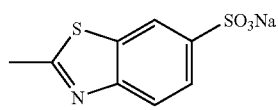 |
| a-40 | 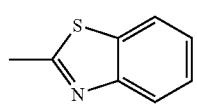 | 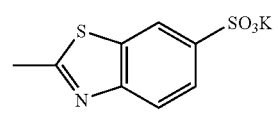 |
| Dye | $R_3$ | $R_4$ |
|---|---|---|
| a-18 | 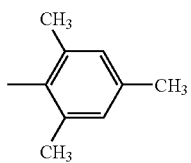 | 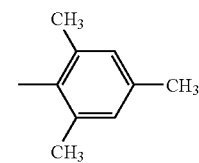 |

-continued
| | | |
|---|---|---|
| a-19 | 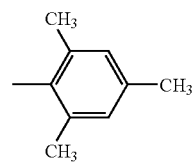 | 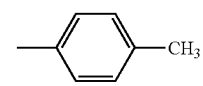 |
| a-20 | C$_8$H$_{17}$(t) | C$_8$H$_{17}$(t) |
| a-21 | 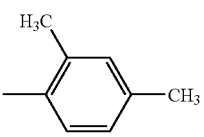 | C$_8$H$_{17}$(t) |
| a-22 | 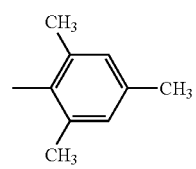 | 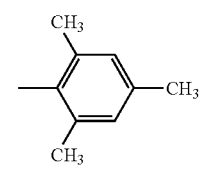 |
| a-23 | 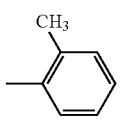 | 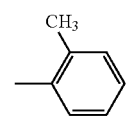 |
| a-24 | 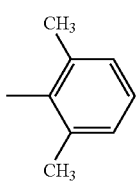 | 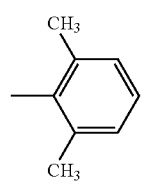 |
| a-25 | 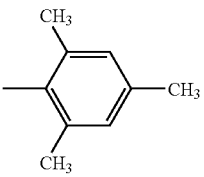 | 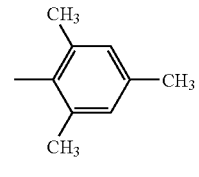 |
| a-26 | 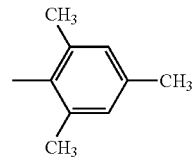 | 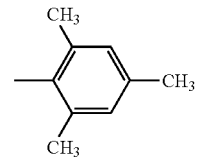 |
| a-27 | 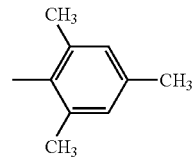 | 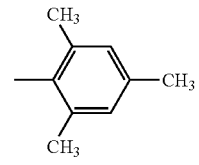 |
| a-28 | 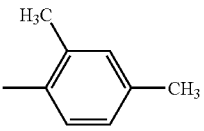 | 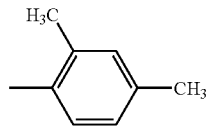 |

-continued
| | | |
|---|---|---|
| a-29 | 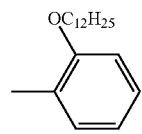 | 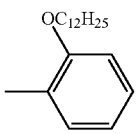 |
| a-30 | 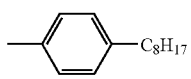 | $C_8H_{17}(t)$ |
| a-31 | 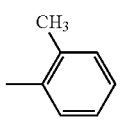 | 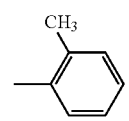 |
| a-32 | 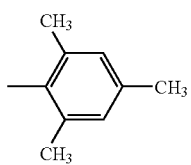 | 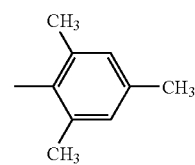 |
| a-33 | 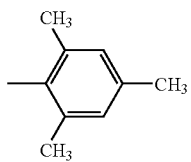 | 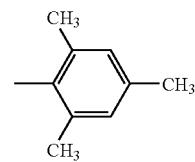 |
| a-34 | 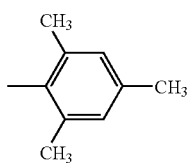 | 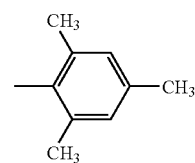 |
| a-35 | 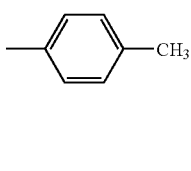 | 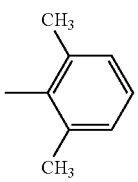 |
| a-36 | 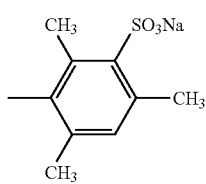 | 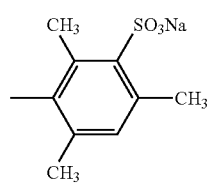 |
| a-37 | 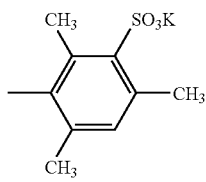 | 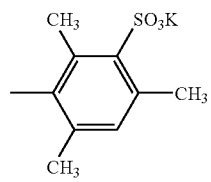 |
| a-38 | 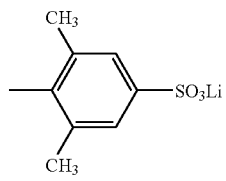 | 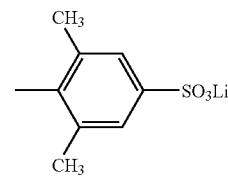 |

-continued

| Dye | | |
|---|---|---|
| a-39 | 3,4,5-trimethylphenyl-CH₂-N(CH₂COOH)₂ | 3,4,5-trimethylphenyl-CH₂-N(CH₂COOH)₂ |
| a-40 | 2,3,4,6-tetramethylphenyl-SO₃K | 2,3,4,6-tetramethylphenyl-SO₃K |

| Dye | R₁ | R₂ | R₃ | R₄ | R₅ | R₆ | R₇ | R₈ |
|---|---|---|---|---|---|---|---|---|
| a-41 | 2,3-dimethylphenyl (CH₃, CH₃) | CN | 2-methylpyridyl | H | CONH₂ | SO₂CH₃ | 2-methylphenyl-OC₈H₁₇ | 2-methylphenyl (CH₃) |
| a-42 | t-Bu | Br | 2-methylpyrimidyl | COOEt | H | 2-methylbenzothiazolyl | C₈H₁₇(t) | COCH₃ |
| a-43 | 2-methylpyridyl | SO₂CH₃ | 4,6-bis(NHCH₃)-1,3,5-triazinyl | CONH₂ | H | 6-chloro-2-methylbenzothiazolyl | 4-methylphenyl | CO-t-Bu |
| a-44 | t-Bu | CN | 2,4,5-tricyano-methylphenyl | H | H | 5-chloro-2-methylbenzothiazolyl | 2-methylphenyl (CH₃) | SO₂CH₃ |
| a-45 | t-Bu | Br | 2,6-dichloro-4-nitrophenyl (methyl) | H | CONH₂ | OCCH₃ (acetyl) | 2,3,5,6-tetramethylphenyl | 4-C₈H₁₇-phenyl |
| a-46 | t-Bu | CN | 2-methylbenzothiazolyl | CH₃ | H | 2-methylbenzothiazolyl | 2,6-diethyl-4-methylphenyl (C₂H₅, CH₃, C₂H₅) | 2,6-diethyl-4-methylphenyl (C₂H₅, CH₃, C₂H₅) |

-continued

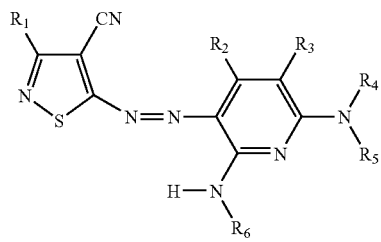

| Dye | R₁ | R₂ | R₃ | R₄ | R₅ | R₆ |
|-----|-----|-----|------|------|-----|-----|
| b-1 | CH₃ | CH₃ | CN | H | -C₆H₄-C₈H₁₇ | -C₆H₄-C₈H₁₇ |
| b-2 | CH₃ | CH₃ | CN | H | 2,4,6-trimethylphenyl | 2,4,6-trimethylphenyl |
| b-3 | CH₃ | CH₃ | CONH₂ | H | -C₆H₄-C₈H₁₇ | 2,4,6-trimethylphenyl |
| b-4 | CH₃ | CH₃ | H | H | 2,3,4,6-tetramethyl-5-SO₃Li-phenyl | 2,3,4,6-tetramethyl-5-SO₃Li-phenyl |
| b-5 | CH₃ | H | CN | H | -C₆H₄-SO₃Na | -C₆H₄-SO₃Na |
| b-6 | CH₃ | CH₃ | H | 2-methylbenzothiazolyl | 2,3,4,6-tetramethyl-5-CH₂N(CH₂CO₂K)₂-phenyl | 2,3,4,6-tetramethyl-5-CH₂N(CH₂CO₂K)₂-phenyl |
| b-7 | CH₃ | CH₃ | H | 2-methylbenzothiazolyl | 2,4,6-trimethylphenyl | -C₆H₄-C₈H₁₇ |
| b-8 | CH₃ | H | H | SO₂CH₃ | 3,4-dimethyl-SO₃Na-phenyl | 3,4-dimethyl-SO₃Na-phenyl |

-continued

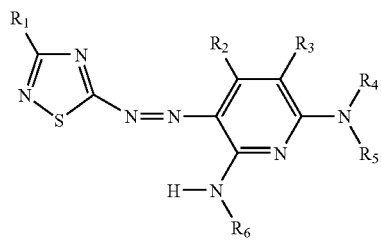

| Dye | R₁ | R₂ | R₃ | R₄ | R₅ | R₆ |
|---|---|---|---|---|---|---|
| c-1 | —SCH₃ | CH₃ | CN | H | C₈H₁₇(t) | -C₆H₄-C₈H₁₇ |
| c-2 | -C₆H₅ | H | CONH₂ | H | -C₆H₄-SO₃K | -C₆H₄-SO₃K |
| c-3 | CH₃-S-CH₂CH₂-SO₃K | CH₃ | H | 2-methylbenzothiazol-6-yl-SO₃K | -C₆H₄-SO₃K | -C₆H₄-SO₃K |
| c-4 | —CH₃ | CH₃ | H | 2-methylbenzothiazol-6-yl-SO₂NH(CH₂)₃O-[2,4-di-t-amylphenyl] | 2,4,6-trimethylphenyl | -C₆H₄-C₈H₁₇ |
| c-5 | -C₆H₅ | H | H | 2-methylbenzothiazol-6-yl-NHSO₂-[2-OC₈H₁₇(n)-5-C₈H₁₇(t)-phenyl] | 2,4,6-trimethylphenyl | C₈H₁₇(t) |

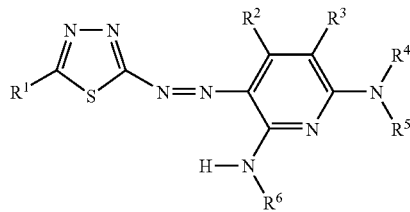

| Dye | R₁ | R₂ | R₃ | R₄ | R₅ | R₆ |
|---|---|---|---|---|---|---|
| d-1 | Me | CH₃ | CN | H | -C₆H₄-SO₃K | -C₆H₄-SO₃K |
| d-2 | Me | CH₃ | CN | H | 3,5-diethyl-4-methylphenyl | 3,5-diethyl-4-methylphenyl |

-continued
| | | | | | | | |
|---|---|---|---|---|---|---|---|
| d-3 | Me | H | H | 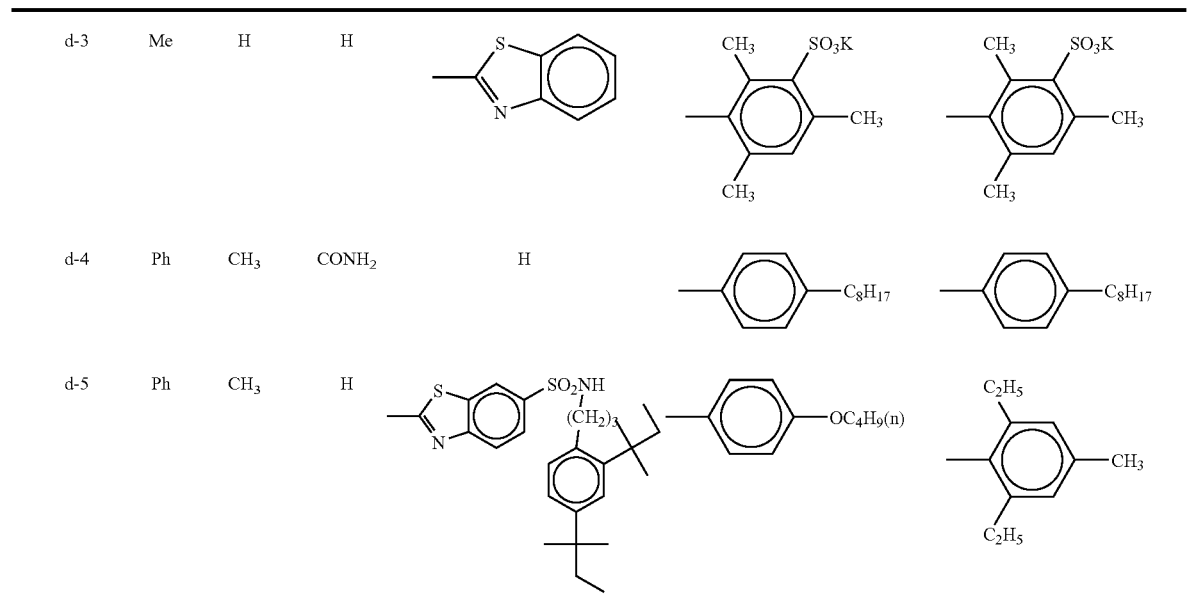 | | | |
| d-4 | Ph | CH₃ | CONH₂ | H | | | |
| d-5 | Ph | CH₃ | H | | | | |
(Note: structures for d-3, d-4, d-5 substituents shown in image)
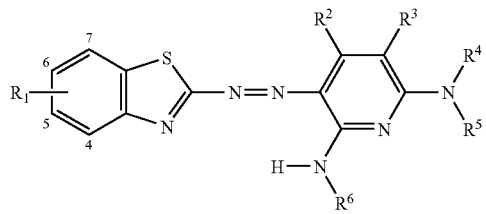
| Dye | R₁ | R₂ | R₃ | R₄ | R₅ | R₆ |
|---|---|---|---|---|---|---|
| e-1 | 5-Cl | CH₃ | CONH₂ | H | $C_8H_{17}(t)$ | $C_8H_{17}(t)$ |
| e-2 | 5,6-diCl | H | H | | | |
| e-3 | 5,6-diCl | CH₃ | H | | | COCH₃ |
| e-4 | 5-CH₃ | H | CN | H | | |
| e-5 | 5-NO₂ | CH₃ | H | SO₂CH₃ | | |
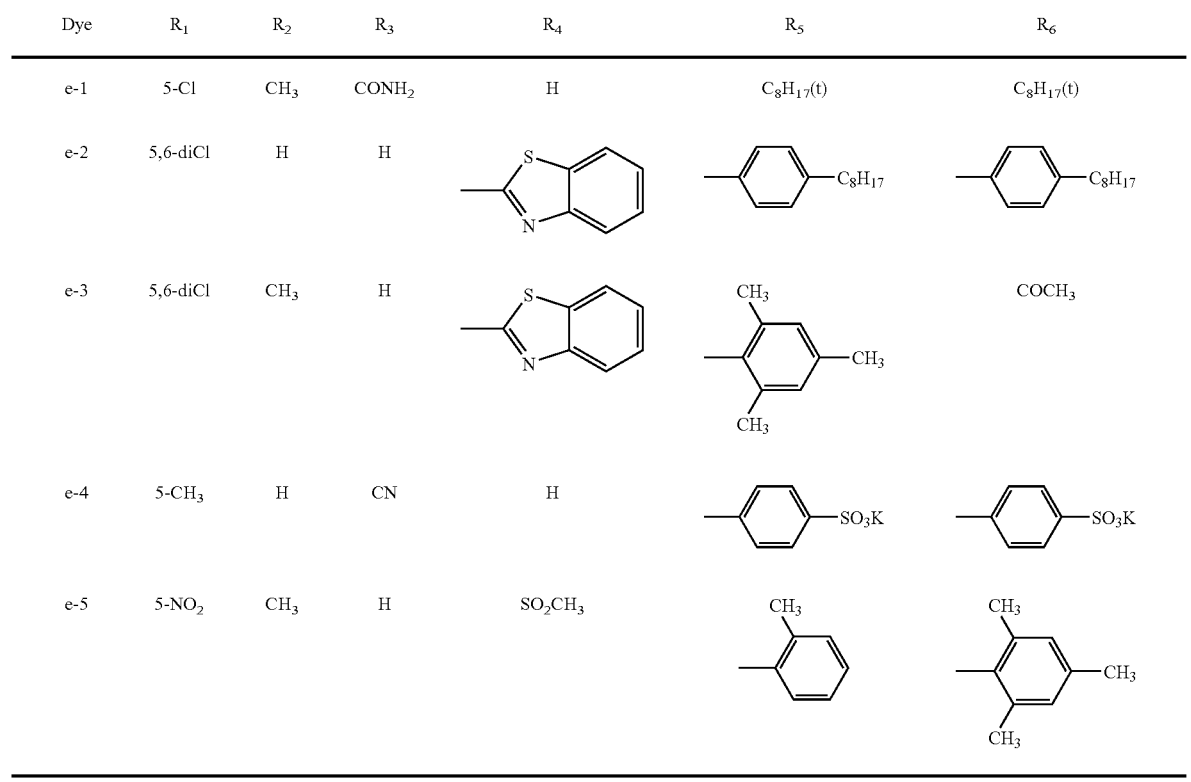

-continued f-1 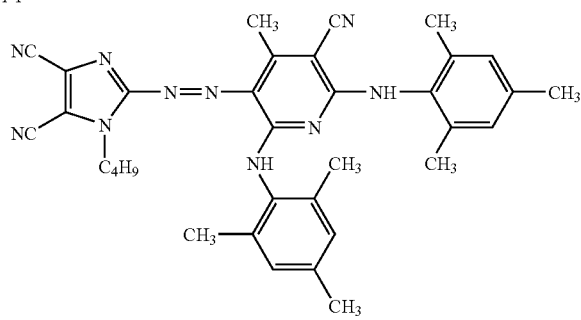 f-2 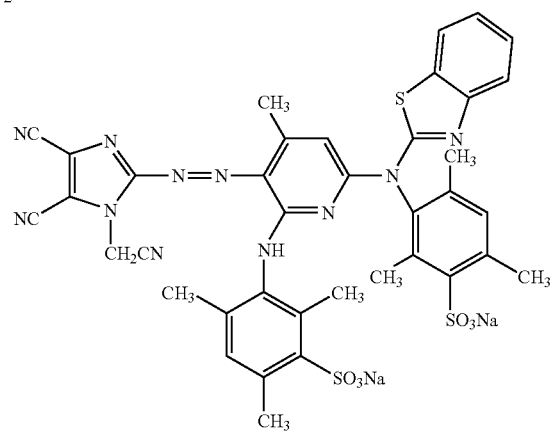

The magenta dye having an azo group for use in the present invention has an oxidation potential, in an aqueous medium for ink, nobler than 1.0 V vs SCE, preferably nobler than 1.1 V vs SCE, more preferably nobler than 1.2 V vs SCE. The potential can be elevated by selecting the preferred structural features described above, more specifically, by selecting a dye structure of a type having a chromophore represented by (heterocyclic ring A)-N=N-(heterocyclic ring B), selecting an azo dye in which an aromatic nitrogen-containing 6-membered heterocyclic ring is bonded as a coupling component directly to at least one side of the azo group, and selecting an azo dye having an aromatic ring amino group- or heterocyclic amino group-containing structure as an auxochrome, and furthermore by removing α hydrogen of the azo dye. In particular, the dye of formula (1) expresses a noble potential. This is specifically described in Japanese Patent Application No. 2001-254878.

The oxidation potential as used herein can be measured by various measuring methods such as polarography in which a dropping mercury electrode is used, cyclic voltammetry method (CV), rotating ring-disk electrode method and comb electrode method. The oxidation potential is specifically measured as follows. A test sample is dissolved to a concentration of $1 \times 10^{-4}$ to $1 \times 10^{-6}$ mol·dm$^{-3}$ in a solvent such as dimethylformamide or acetonitrile containing a supporting electrolyte such as sodium perchlorate or tetrapropylammonium perchlorate and the oxidation potential is measured as a value to SCE (standard saturated calomel electrode) by using the above-described method. The supporting electrolyte and solvent used can be appropriately selected according to the oxidation potential or solubility of the test sample. The supporting electrolyte and solvent which can be used are described in Akira Fujishima et al., *Denkikagaku Sokutei Ho* (*Electrochemical Measuring Method*), pp. 101-118, Gihodo Shuppan Sha (1984).

The oxidation potential value sometimes deviates on the order of several tens of millivolt due to the effect of, for example, liquid junction potential or liquid resistance of sample solution, but the reproducibility of measured potential value can be guaranteed by the calibration using a standard sample (for example, hydroquinone) and the same measured value can be obtained by any of those potential measuring methods.

Another basis for the oxidation resistance of the azo dye having an oxidation potential nobler than 1.0 V vs SCE is an enforced discoloration rate constant for ozone gas. The azo dye preferably has an enforced discoloration rate constant of $5.0 \times 10^{-2}$ [hour$^{-1}$] or less, more preferably $3.0 \times 10^{-2}$ [hour$^{-1}$] or less, still more preferably $1.5 \times 10^{-2}$ [hour$^{-1}$] or less.

The enforced discoloration rate constant for ozone gas is determined as follows. An image is printed on a reflective image-receiving medium by using only the ink concerned and the colored region having a color in the main spectral absorption region of the ink and having a reflection density of 0.90 to 1.10 as measured through a Status A filter is selected as the initial density point. This initial density is defined as the starting density (=100%). Then, this image is discolored by using an ozone discoloration tester capable of always keeping an ozone concentration of 5 mg/L, the time period until the density becomes 80% of the initial density is measured, a reciprocal [hour$^{-1}$] of this time period is determined and on the assumption that the relationship between the discoloration density and the time period follows the rate equation of first-order reaction, the value determined is used as the discoloration reaction rate constant. Accordingly, the discoloration rate constant obtained is a discoloration rate constant in the colored region of an image printed by the ink, but in the present invention, this vale is used as the discoloration rate constant of the ink.

The test print patch may be a patch obtained by printing a black square symbol of JIS code 2223, a stepwise color patch of Macbeth chart, or an arbitrary stepwise density patch where the measured area can be obtained.

The reflection density of the reflection image (stepwise color patch) printed for measurement is a density determined with measurement light through a Status A filter by a densitometer satisfying the International Standard ISO5-4 (geometrical conditions for reflection density).

In the test chamber for the measurement of enforced discoloration rate constant for ozone gas, an ozone generator (for example, in a high-voltage discharge system of applying an a.c. voltage to dry air) capable of constantly maintaining an internal ozone gas concentration of 5-mg/L is provided and the exposure temperature is adjusted to 25° C.

This enforced discoloration rate constant is an index for showing the susceptibility to oxidation by oxidative atmosphere in the environment, such as photochemical smog, exhaust gas of automobiles, organic vapor from painted furniture surface or carpet, or gas generated from the frame interior in a bright room, and this is an index using ozone gas as a representative of such oxidative atmosphere.

The color hue of the magenta ink is described below. The magenta ink preferably has λmax of 500 to 580 nm in view of color hue, more preferably a small half-value width in the long-wave and short-wave sides of the maximum absorption wavelength, namely, sharp absorption. This is specifically described in JP-A-2002-309133. The sharp absorption can be also realized by introducing a methyl group into the α position.

[Phthalocyanine Dye]

The properties required of the inkjet recording ink is to be excellent in both light fastness and ozone resistance and small in the change of color hue and surface state (less generation of bronze and less precipitation of dye). As for the light fastness (OD1.0), the light fastness with a triacetylcellulose (TAC) filter on Epson PM Photographic Image-Receiving Paper by Xe of 1.1 W/m (intermittent conditions) is preferably 90% or more in terms of the residual color ratio for 3 days. Also, the coloring matter residual ratio for 14 days is preferably 85% or more.

As for the ozone resistance, after storage in an ozone environment of 5 ppm for 24 hours, the monochromatic moiety printed by using a single (cyan) color of the ink to give a cyan reflection density of 0.9 to 1.1 in a Status A filter has a coloring matter residual ratio (density after discoloration/initial density×100) of 60% or more. The ozone resistance is more preferably 70% or more, still more preferably 80% or more, in terms of the coloring matter residual ratio for one day. Also, the coloring matter residual ratio for 5 days is preferably 25% or more, more preferably 40% or more, still more preferably 50% or more. Samples varied in the coated amount of dye are prepared by GTC and the amount of Cu element contained in the dye is measured by a fluorescent X ray.

The Cu ion is present in the form of a phthalate as a result of decomposition of the phthalocyanine dye. The amount of Cu salt present in an actual print is preferably 10 mg/m$^2$ or less in terms of Cu ion. The amount of Cu flowed out from the print is determined by forming an entire cyan solid image having a Cu salt amount of 20 mg/m$^2$ or less in terms of Cu ion, discoloring this image with ozone and analyzing the amount of ion flowed out into water. Incidentally, all Cu compounds are trapped by the image-receiving material before the discoloration. The amount of Cu ion flowed out into water is preferably 20% or less of all dyes.

It has been found in the present invention that a phthalocyanine dye having such properties can be obtained, for example, by 1) elevating the oxidation potential, 2) enhancing the aggregating property, 3) introducing an aggregation accelerating group, intensifying the hydrogen bond at the time of λ-λ stacking, or 4) not incorporating a substituent at the α-position, that is, facilitating the stacking.

Conventional phthalocyanine dyes used for the inkjet ink are derived from an unsubstituted phthalocyanine through sulfonation and these are a mixture which cannot be specified in the number and positions of substituents. On the other hand, the dye for use in the inkjet recording ink of the present invention is a phthalocyanine dye which can be specified in the number and positions of substituents. The first structural feature is that the dye is a water-soluble phthalocyanine dye obtained by not passing through sulfonation of an unsubstituted phthalocyanine. The second structural feature is that the dye has an electron-withdrawing group at the β-position of a benzene ring of phthalocyanine, preferably at the β-position of all benzene rings. Specific examples of useful dyes include those where a sulfonyl group is substituted (see, Japanese Patent Application Nos. 2001-47013 and 2001-190214), a sulfamoyl group in general is substituted (see, Japanese Patent Application Nos. 2001-24352 and 2001-189982), a heterocyclic sulfamoyl group is substituted (see, Japanese Patent Application Nos. 2001-96610 and 2001-190216), a heterocyclic sulfonyl group is substituted (see, Japanese Patent Application Nos. 2001-76689 and 2001-190215), a specific sulfamoyl group is substituted (see, Japanese Patent Application No. 2001-57063), a carbonyl group is substituted (see, Japanese Patent Application No. 2002-012869), or the dye has a specific substituent for enhancing the solubility or ink stability or preventing the bronze phenomenon, such as asymmetric carbon (see, Japanese Patent Application No. 2002-012868) or Li salt form (see, Japanese Patent Application No. 2002-012864).

The first physical feature of the phthalocyanine dye for use in the inkjet recording ink of the present invention is to have a high oxidation potential. The oxidation potential is preferably nobler than 1.0 V, more preferably nobler than 1.1 V, and most preferably nobler than 1.2 V. The second physical feature is to have a strong aggregating property. Specific examples of the dye having this property include those where the aggregation of oil-soluble dyes is specified (see, Japanese Patent Application No. 2001-64413) or the aggregation of water-soluble dyes is specified (see, Japanese Patent Application No. 2001-117350).

With respect to the relationship between the number of aggregating groups and the performance (light absorbance of ink), when an aggregating group is introduced, reduction of light absorbance or shifting of λmax to the shorter wave is liable to occur even in a dilute solution. With respect to the relationship between the number of aggregating groups and the performance (reflection OD on Epson PM920 Image-Receiving Paper), as the number of aggregating groups increases, the reflection OD with the same ion intensity more decreases. That is, the aggregation is considered to proceed on the image-receiving paper. With respect to the relationship between the number of aggregating groups and the performance (ozone resistance/light fastness), as the number of aggregating groups increases, the ozone resistance is more enhanced. A dye having a large number of aggregating groups tends to be enhanced also in the light fastness. In order to impart the ozone resistance, the above-described substituent X (which represents $X_1$, $X_2$, $X_3$, $X_4$ or the like) must be present. The reflection OD and the fastness are in the trade-off relationship and therefore, it is necessary to enhance the light fastness without weakening the aggregation.

Preferred embodiments of the ink of the present invention are:

1) a cyan ink where the light fastness with a TAC filter on Epson PM Photographic Image-Receiving Paper by Xe of 1.1 W/m (intermittent conditions) is 90% or more in terms of the residual color ratio for 3 days;

2) a cyan ink where after storage in an ozone environment of 5 ppm for 24 hours, the monochromatic moiety printed by using a single (cyan) color of the ink to give a cyan reflection density of 0.9 to 1.1 in a Status A filter has a coloring matter residual ratio (density after discoloration/initial density×100) of 60% (preferably 80%) or more;

3) a cyan ink where after discoloration with ozone under the conditions of 2) above, the amount of Cu ion flowed out into water is 20% or less of all dyes; and 4) a cyan ink having penetrability such that the amount of ink penetrated into a specific image-receiving paper is 30% or more of the upper portion of the image-receiving layer.

The phthalocyanine dye contained in the inkjet recording ink of the present invention is preferably a water-soluble dye having an oxidation potential nobler than 1.0, more preferably a dye having ozone gas fastness satisfying the above-described conditions, still more preferably a phthalocyanine dye represented by formula (I).

The phthalocyanine dye is a dye having fastness but this dye is known to be inferior in the fastness to ozone gas when used as a coloring matter for inkjet recording.

In the present invention, an electron-withdrawing group is introduced into the phthalocyanine skeleton to render the oxidation potential nobler than 1.0 V (vs SCE) and thereby reduce the reactivity with ozone which is an electrophilic agent. A nobler oxidation potential is more preferred and the oxidation potential is more preferably nobler than 1.1 V (vs SCE) and most preferably nobler than 1.2 V (vs SCE).

The oxidation potential value (Eox) can be easily measured by one skilled in the art and the method therefor is described, for example, in P. Delahay, *New Instrumental Methods in Electrochemistry*, Interscience Publishers (1954), A. J. Bard et al., *Electrochemical Methods*, John Wiley & Sons (1980), and Akira Fujishima et al., *Denkikagaku Sokutei Ho (Electrochemical Measuring Method)*, Gihodo Shuppan Sha (1984).

More specifically, a test sample is dissolved to a concentration of $1 \times 10^{-4}$ to $1 \times 10^{-6}$ mol/liter in a solvent such as dimethylformamide or acetonitrile containing a supporting electrolyte such as sodium perchlorate or tetrapropylammonium perchlorate and the oxidation potential is measured as a value to SCE (saturated calomel electrode) by using a cyclic voltammetry. This value sometimes deviates on the order of several tens of millivolt due to the effect of, for example, liquid junction potential or liquid resistance of sample solution, but the reproducibility of potential can be guaranteed by adding a standard sample (for example, hydroquinone).

In order to univocally specify the potential, in the present invention, the value (vs SCE) measured in a dimethylformamide (concentration of dye: 0.001 mol dm$^{-3}$) containing 0.1 mol dm$^{-3}$ of tetrapropylammonium perchlorate as the supporting electrolyte is used as the oxidation potential of the dye.

The Eox (oxidation potential) value indicates the transferability of an electron from the sample to the electrode and as the value is larger (the oxidation potential is nobler), the electron is less transferable from the sample to the electrode, in other words, the oxidation less occurs. As for the relationship with the structure of compound, the oxidation potential becomes nobler when an electron-withdrawing group is introduced, and becomes baser when an electron-donating group is introduced. In the present invention, the oxidation potential is preferably rendered nobler by introducing an electron-withdrawing group into the phthalocyanine skeleton so as to reduce the reactivity with ozone which is an electrophilic agent. When the Hammett's substituent constant σp value as a measure for the electron-withdrawing property or electron-donating property of substituent is used, the oxidation potential can be rendered nobler by introducing a substituent having a large σp value, such as sulfinyl group, sulfonyl group and sulfamoyl group.

Also for the purpose of such potential control, the phthalocyanine dye represented by formula (I) is preferably used.

The phthalocyanine dye having the above-described oxidation potential is apparently a cyanine dye excellent in both the light fastness and the ozone resistance, because this dye satisfies those conditions for light fastness and ozone resistance.

The phthalocyanine dye (preferably the phthalocyanine dye represented by formula (I)) for use in the present invention is described in detail below.

In formula (I), $X_1$, $X_2$, $X_3$ and $X_4$ each independently represents —SO—-Z, —SO$_2$-z, —SO$_2$NR1R2, a sulfo group, —CONR1R2 or —CO$_2$R1. Among these substituents, preferred are —SO-Z, —SO$_2$-Z, —SO$_2$NR1R2 and —CONR1R2, more preferred are —SO$_2$-Z and —SO$_2$NR1R2, and most preferred is —SO$_2$-Z. In the case where $a_1$ to $a_4$ showing the number of substituents each represents a number of 2 or more, a plurality of substituents $X_1$, $X_2$, $X_3$ or $X_4$ may be the same or different and each independently represents any one of the above-described groups. $X_1$, $X_2$, $X_3$ and $X_4$ may be completely the same substituents, may be substituents of the same kind but partially different as in the case, for example, where $X_1$, $X_2$, $X_3$ and $X_4$ all are —SO$_2$-Z and Zs are different from each other, or may contain substituents different from each other, for example, —SO$_2$-Z and —SO$_2$NR1R2.

Each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group.

R1 and R2 each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a hydrogen atom, a substituted or unsubstituted alkyl group, a substituted or unsubstituted aryl group, or a substituted or unsubstituted heterocyclic group, more preferably a hydrogen atom, a substituted alkyl group, a substituted aryl group or a substituted heterocyclic group. However, it is not preferred that R1 and R2 both are a hydrogen atom.

The substituted or unsubstituted alkyl group represented by R1, R2 and Z is preferably an alkyl group having from 1 to 30 carbon atoms, more preferably a branched alkyl group because the solubility of dye and the stability of ink are improved, still more preferably an alkyl group having an asymmetric carbon (use in the racemic form). Examples of the substituent include those described later as the substituent when Z, R1, R2, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the alkyl group may be substituted by a halogen atom or an ionic hydrophilic group. Incidentally, the number of carbon atoms in the alkyl group does not contain carbon atoms of substituents and this applies to other groups.

The substituted or unsubstituted cycloalkyl group represented by R1, R2 and Z is preferably a cycloalkyl group having from 5 to 30 carbon atoms, more preferably a cycloalkyl group having an asymmetric carbon (use in the racemic form) because the solubility of dye and the stability of ink are improved. Examples of the substituent include those described later as the substituent when Z, R1, R2, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the cycloalkyl group may be substituted by a halogen atom or an ionic hydrophilic group.

The substituted or unsubstituted alkenyl group represented by R1, R2 and Z is preferably an alkenyl group having from 2 to 30 carbon atoms, more preferably a branched alkenyl group because the solubility of dye and the stability of ink are improved, still more preferably an alkenyl group having an asymmetric carbon (use in the racemic form). Examples of the substituent include those described later as the substituent when Z, R1, R2, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the alkenyl group may be substituted by a halogen atom or an ionic hydrophilic group.

The substituted or unsubstituted aralkyl group represented by R1, R2 and Z is preferably an aralkyl group having from 7 to 30 carbon atoms, more preferably a branched aralkyl group because the solubility of dye and the stability of ink are improved, still more preferably an aralkyl group having an asymmetric carbon (use in the racemic form). Examples of the substituent include those described later as the substituent when Z, R1, R2, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the aralkyl group may be substituted by a halogen atom or an ionic hydrophilic group.

The substituted or unsubstituted aryl group represented by R1, R2 and Z is preferably an aryl group having from 6 to 30 carbon atoms. Examples of the substituent include those described later as the substituent when Z. R1, R2, $Y_1$, $Y_2$, $Y_3$ and $Y_4$ can further have a substituent. In particular, an electron-withdrawing group is preferred because the dye can have a noble oxidation potential and can be improved in the fastness. Examples of the electron-withdrawing group include those having a positive Hammett's substituent constant σp value. Among these, preferred are a halogen atom, a heterocyclic group, a cyano group, a carboxyl group, an acylamino group, a sulfonamido group, a sulfamoyl group, a carbamoyl group, a sulfonyl group, an imido group, an acyl group, a sulfo group and a quaternary ammonium group, more preferred are a cyano group, a carboxyl group, a sulfamoyl group, a carbamoyl group, a sulfonyl group, an imido group, an acyl group, a sulfo group and a quaternary ammonium group.

The heterocyclic group represented by R1, R2 and Z is preferably a 5- or 6-membered ring and the ring may be further condensed. Also, the heterocyclic group may be an aromatic heterocyclic group or a non-aromatic heterocyclic group. Examples of the heterocyclic group represented by R1, R2 and Z are shown below in the form of a heterocyclic ring by omitting the substitution site. The substitution site is not limited and, for example, in the case of pyridine, the 2-position, 3-position and 4-position can be substituted. Examples include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine., piperidine, piperazine, imidazolidine and thiazoline. In particular, an aromatic heterocyclic group is preferred. Preferred examples thereof include, shown in the same manner as above, pyridine, pyrazine, pyrimidine, pyridazine, triazine, pyrazole, imidazole, benzimidazole, triazole, thiazole, benzothiazole, isothiazole, benzisothiazole and thiadiazole. These groups each may have a substituent and examples of the substituent include those described later as the substituent when Z, R1, R2, $Y_1$, $Y_2$, $Y_3$ and $Y_4$ can further have a substituent. Preferred substituents are the same as the above-described substituents of the aryl group and more preferred substituents are the same as the above-described more preferred substituents of the aryl group.

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an acylamino group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group or a sulfo group. These groups each may further have a substituent.

$Y_1$, $Y_2$, $Y_3$ and $Y_4$ each is preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

When Z, R1, R2, $Y_1$, $Y_2$, $Y_3$ and $Y_4$ each is a group which can further have a substituent, the group may further have a substituent described below.

Examples of the substituent include a linear or branched alkyl group having from 1 to 12 carbon atoms, a linear or branched aralkyl group having from 7 to 18 carbon atoms, a linear or branched alkenyl group having from 2 to 12 carbon atoms, a linear or branched alkynyl group having from 2 to 12 carbon atoms, a linear or branched cycloalkyl group having from 3 to 12 carbon atoms, a linear or branched cycloalkenyl group having from 3 to 12 carbon atoms (these groups each is preferably a group having a branched chain because the solubility of dye and the stability of ink are improved, more preferably a group having an asymmetric carbon; specific examples of the groups include methyl, ethyl, propyl, isopropyl, sec-butyl, tert-butyl, 2-ethylhexyl, 2-methylsulfonylethyl, 3-phenoxypropyl, trifluoromethyl and cyclopentyl), a halogen atom (e.g., chlorine, bromine), an aryl group (e.g., phenyl, 4-tert-butylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxy group, an amino group, an alkyloxy group (e.g., methoxy, ethoxy, 2-methoxyethoxy, 2-methanesulfonylethoxy), an aryloxy group (e.g., phenoxy, 2-methylphenoxy, 4-tert-butylphenoxy, 3-nitrophenoxy, 3-tert-butyloxycarbamoylphenoxy, 3-methoxycarbamoyl), an acylamino group (e.g., acetamido, benzamido, 4-(3-tert-butyl-4-hydroxyphenoxy)butanamido), an alkylamino group (e.g., methylamino, butylamino, diethylamino, methylbutylamino), an anilino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-oarboxyphenylthio), an alkyloxycarbonylamino group (e.g., methoxycarbonylamino), a sulfonamido group (e.g., methanesulfonamido, benzenesulfonamido, p-toluenesulfonamido), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxycarbonyl), a heterocyclic oxy group (e.g., 1-phenyltetrazol-5-oxy, 2-tetrahydropyranyloxy), an azo group (e.g., phenylazo, 4-methoxyphenylazo, 4-pivaloylamino-phenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g., carboxyl, sulfo, phosphono, quaternary ammonium).

In the case where the phthalocyanine dye represented by formula (I) is water-soluble, the dye preferably contains an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium). Among these counter ions, alkali metal salts are preferred and a lithium salt is more preferred because the solubility of dye and the stability of ink are enhanced.

As for the number of ionic hydrophilic groups, the phthalocyanine dye preferably contains at least two ionic hydrophilic groups, more preferably at least two sulfo groups and/or carboxyl groups, within one molecule.

$a_1$ to $a_4$ and $b_1$ to $b_4$ represent the number of substituents $X_1$ to $X_4$ and $Y_1$ to $Y_4$, respectively. $a_1$ to $a_4$ each independently represents an integer of 0 to 4 but all are not 0 at the same time. $b_1$ to $b_4$ each independently represents an integer of 0 to 4. When $a_1$, $a_2$, $a_3$, $a_4$, $b_1$, $b_2$, $b_3$ or $b_4$ represents an integer of 2 or more, a plurality of $X_1$s, $X_2$s, $X_3$s, $X_4$s, $Y_1$s, $Y_2$s, $Y_3$s or $Y_4$s are present and these may be the same or different.

$a_1$ and $b_1$ satisfy the relationship of $a_1+b_1=4$. In particular, a combination that $a_1$ represents 1 or 2 and $b_1$ represents 3 or 2 is preferred, and a combination that $a_1$ represents 1 and $b_1$ represents 3 is most preferred.

The same relationship as that between $a_1$ and $b_1$ is present in each of the pairs $a_2$ and $b_2$, $a_3$ and $b_3$, and $a_4$ and $b_4$, and the preferred combination is also the same.

M represents a hydrogen atom, a metal element or an oxide, hydroxide or halide thereof.

M is preferably a hydrogen atom, a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi, an oxide such as VO and GeO, a hydroxide such as $Si(OH)_2$, $Cr(OH)_2$ and $Sn(OH)_2$, or a halide such as AlCl, $SiCl_2$, VCl, $VCl_2$, VOCl, FeCl, GaCl and ZrCl, more preferably Cu, Ni, Zn or Al, and most preferably Cu.

Also, Pc (phthalocyanine ring) may form a dimer (for example, Pc-M-L-M-Pc) or a trimer through L (divalent linking group). At this time, Ms may be the same or different.

The divalent linking group represented by L is preferably an oxy group —O—, a thio group —S—, a carbonyl group —CO—, a sulfonyl group —$SO_2$—, an imino group —NH—, a methylene group —$CH_2$— or a group formed by combining two or more of these groups.

As for the preferred combination of substituents in the compound represented by formula (I), a compound where at least one of various substituents is the preferred group is preferred, a compound where a larger number of various substituents are the preferred groups is more preferred, and a compound where all substituents are the preferred groups is most preferred.

Among the phthalocyanine dyes represented by formula (I), a phthalocyanine dye having a structure represented by formula (II) is preferred. The phthalocyanine dye represented by formula (II) of the present invention is described in detail below.

In formula (II), $X_{11}$ to $X_{14}$ and $Y_{11}$ to $Y_{18}$ have the same meanings as $X_1$ to $X_4$ and $Y_1$ to $Y_4$ in formula (I), respectively, and preferred examples are also the same. $M_1$ has the same meaning as M in formula (I) and preferred examples are also the same.

In formula (II), $a_{11}$ to $a_{14}$ each independently represents an integer of 1 or 2 and preferably satisfy $4 \leq a_{11}+a_{12}+a_{13}+a_{14} \leq 6$, and $a_{11}=a_{12}=a_{13}=a_{14}=1$ is more preferred.

$X_{11}$, $X_{12}$, $X_{13}$ and $X_{14}$ may be completely the same substituents, may be substituents of the same kind but partially different as in the case, for example, where $X_{11}$, $X_{12}$, $X_{13}$ and $X_{14}$ all are —$SO_2$-Z and Zs are different from each other, or may contain substituents different from each other, for example, —$SO_2$-Z and —$SO_2$NR1R2.

In the phthalocyanine dye represented by formula (II), the following combinations of substituents are particularly preferred.

$X_{11}$ to $X_{14}$ each independently represents preferably —SO-Z, —$SO_2$-Z, —$SO_2$NR1R2 or —CONR1R2, more preferably —$SO_2$-Z or —$SO_2$NR1R2, and most preferably —$SO_2$-Z.

Each Z independently represents preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the aggregating property and fastness are improved.

R1 and R2 each independently represents preferably a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group. However, it is not preferred that R1 and R2 both are a hydrogen atom. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the aggregating property and fastness are improved.

$Y_{11}$ to $Y_{18}$ each independently represents preferably a hydrogen atom, a halogen atom, an alkyl group, an aryl group, a cyano group; an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

$a_{11}$ to $a_{14}$ each independently represents preferably 1 or 2 and it is more preferred that all are 1.

$M_1$ represents a hydrogen atom, a metal element or an oxide, hydroxide or halide thereof, preferably Cu, Ni, Zn or Al, and most preferably Cu.

In the case where the phthalocyanine dye represented by formula (II) is water-soluble, the dye preferably contains an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium). Among these counter ions, alkali metal salts are preferred and a lithium salt is more preferred because the solubility of dye and the stability of ink are enhanced.

As for the number of ionic hydrophilic groups, the phthalocyanine dye preferably contains at least two ionic hydrophilic groups, more preferably at least two sulfo groups and/or carboxyl groups, within one molecule.

As for the preferred combination of substituents in the compound represented by formula (II), a compound where at least one of various substituents is the preferred group is preferred, a compound where a larger number of various substituents are the preferred groups is more preferred, and a compound where all substituents are the preferred groups is most preferred.

As for the chemical structure of the phthalocyanine dye of the present invention, at least one electron-withdrawing group such as sulfinyl group, sulfonyl group and sulfamoyl group is preferably introduced into respective four benzene rings of phthalocyanine such that the total of σp values of the substituents in the entire phthalocyanine skeleton becomes 1.6 or more.

The Hammett's substituent constant σp value is briefly described here. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki (Chemistry Region)*, special number, No. 122, pp. 96-103, Nankodo (1979).

Inevitably in view of the synthesis method, the phthalocyanine derivative represented by formula (I) is generally a mixture of analogues differing in the site where the substituents Xn (n=1 to 4) and Ym (m=1 to 4) are introduced and in the number of the substituents introduced. Accordingly, these analogue mixtures are statistically averaged and represented by a formula in many cases. In the present invention, it has been found that when these analogue mixtures are classified into the following three types, a specific mixture is particularly preferred. The phthalocyanine-base dye analogue mixtures represented by formulae (I) and (II) are defined by classifying these into the following three types based on the substitution site. $Y_{11}$, $Y_{12}$, $Y_{13}$, $Y_{14}$, $Y_{15}$, $Y_{16}$, $Y_{17}$ and $Y_{18}$ in formula (II) are designated as the 1-position, 4-position, 5-position, 8-position, 9-position, 12-position, 13-position and 16-position, respectively.

(1) β-Position Substitution Type:

A phthalocyanine dye having specific substituents at the 2- and/or 3-position, the 6- and/or 7-position, the 10- and/or 11-position, and the 14- and/or 15-position.

(2) α-Position Substitution Type:

A phthalocyanine dye having specific substituents at the 1- and/or 4-position, the 5- and/or 8-position, the 9- and/or 12-position, and the 13- and/or 16-position.

(3) α,β-Position Mixed Substitution Type:

A phthalocyanine dye having specific substitutions at the 1- to 16-positions without any regularity.

In the present invention, phthalocyanine dye derivatives differing in the structure (particularly in the substitution site) are described by using these β-position substitution type, α-position substitution type and α,β-position mixed substitution type.

The phthalocyanine derivative for use in the present invention can be synthesized by combining the methods described or cited, for example, in Shirai and Kobayashi, *Phthalocyanine-Kagaku to Kino-(Phthalocyanine-Chemistry and Function-)*, pp. 1-62, IPC, and C. C. Leznoff and A. B. P. Lever, *Phthalocyanines—Properties and Applications*, pp. 1-54, VCH, or methods analogous thereto.

The phthalocyanine compound represented by formula (I) of the present invention can be synthesized, for example, through sulfonation, sulfonyl chloridation or amidation reaction of an unsubstituted phthalocyanine compound as described in International Publications 00/17275, 00/08103, 00/08101 and 98/41853 and JP-A-10-36471. In this case, sulfonation may take place at any site of the phthalocyanine nucleus and the number of sites sulfonated is difficult to control. Accordingly, when a sulfo group is introduced under such reaction conditions, the positions and number of sulfo groups introduced into the product cannot be specified and a mixture of those differing in the number of substituents or in the substitution site inevitably results. If the compound of the present invention is synthesized starting from such a product, the compound of the present invention is obtained as an α,β-position mixed substitution type mixture containing several kinds of compounds differing in the number of substituents or in the substitution site because the number of sulfamoyl groups substituted on the heterocyclic ring or their substitution sites cannot be specified.

As described above, for example, when many electron-withdrawing groups such as sulfamoyl group are introduced into the phthalocyanine nucleus, the oxidation potential becomes nobler and the ozone resistance is increased. However, according to the above-described synthesis method, a phthalocyanine dye where the number of electron-withdrawing groups introduced is small, namely, the oxidation potential is baser, is inevitably mingled. Therefore, in order to improve the ozone resistance, it is preferred to use a synthesis method where the production of a compound having a baser oxidation potential is suppressed.

The phthalocyanine compound represented by formula (II) of the present invention can be synthesized, for example, by reacting a phthalonitrile derivative (Compound P) shown below and/or a diiminoisoindoline derivative (Compound Q) shown below with a metal derivative represented by formula (III) or can be derived from a tetrasulfophthalocyanine compound obtained by reacting a 4-sulfophthalonitrile derivative (Compound R) shown below with a metal derivative represented by formula (III).

In the formulae above, $X_p$ corresponds to $X_{11}$, $X_{12}$, $X_{13}$ or $X_{14}$ in formula (II) and $Y_q$ and $Y_{q'}$ each corresponds to $Y_{11}$, $Y_{12}$, $Y_{13}$, $Y_{14}$, $Y_{15}$, $Y_{16}$, $Y_{17}$ or $Y_{18}$ in formula (II). In Compound R, M' represents cation.

Examples of the cation represented by M' include alkali metal ions such as Li, Na and K, and organic cations such as triethylammonium ion and pyridinium ion.

Formula (III):

$$M\text{-}(Y)_d$$

wherein M has the same meaning as M in formulae (I) and (II), Y represents a monovalent or divalent ligand such as halogen atom, acetate anion, acetylacetonate and oxygen, and d represents an integer of 1 to 4.

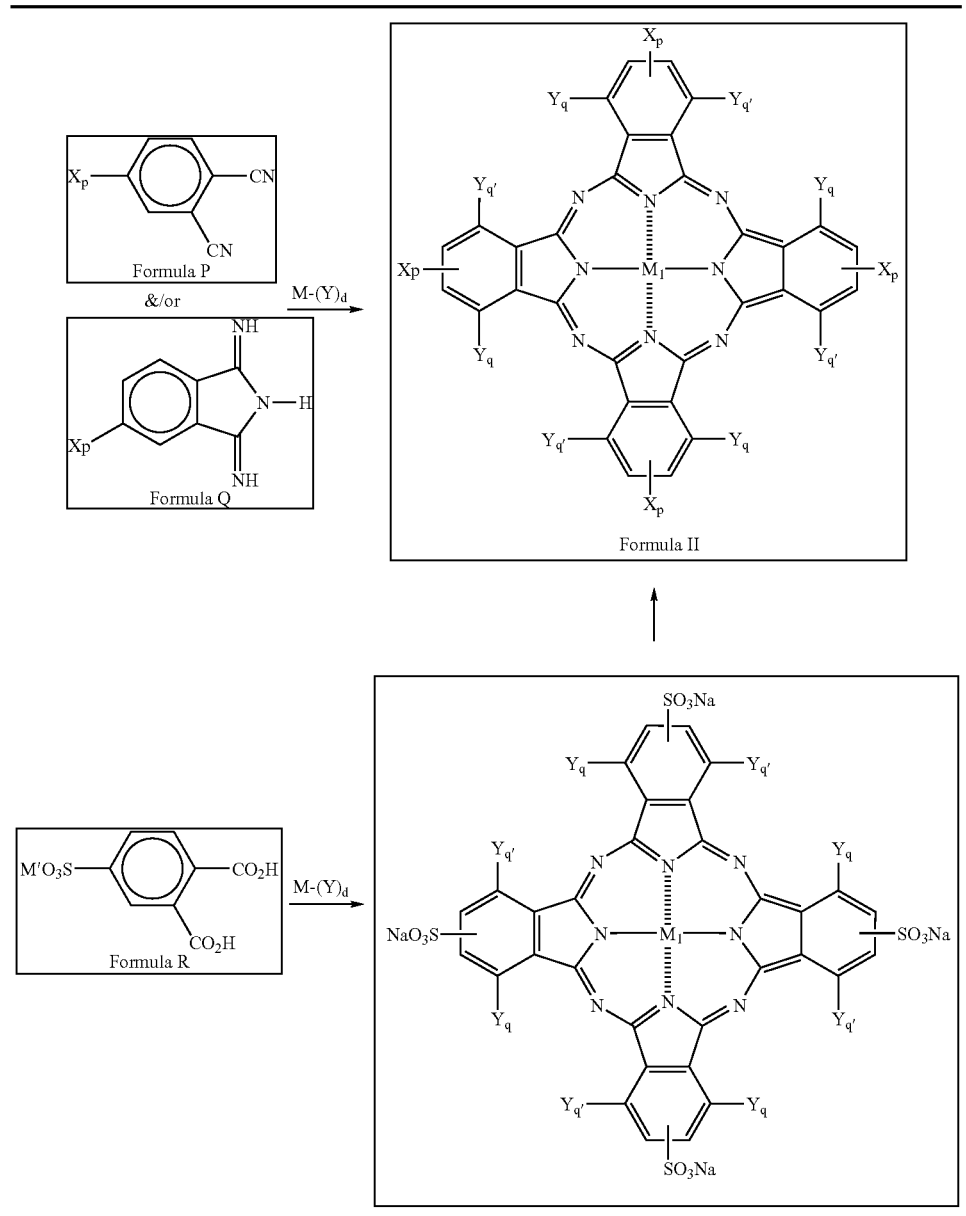

That is, according to this synthesis method, a specific number of desired substituents can be introduced. Particularly, in the case of introducing a large number of electron-withdrawing groups so as to render the oxidation potential nobler as in the present invention, this synthesis method is very excellent as compared with the above-described method for synthesizing the phthalocyanine compound of formula (I).

The thus-obtained phthalocyanine compound represented by formulae (II) is usually a mixture of compounds represented by the following formulae (a)-1 to (a)-4 which are isomers with respect to the substitution site of each $X_p$, namely, a β-position substitution type.

Formula (a)-1

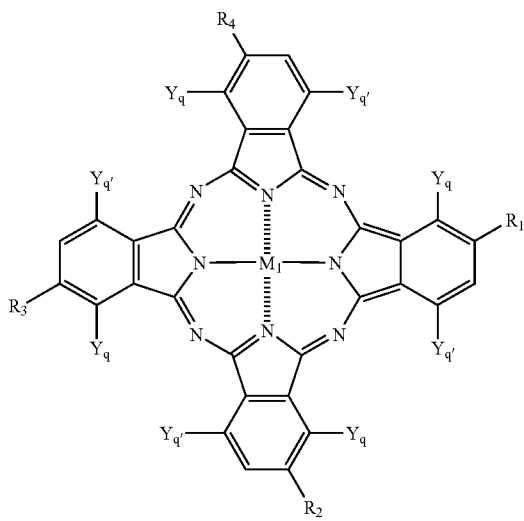

Formula (a)-2

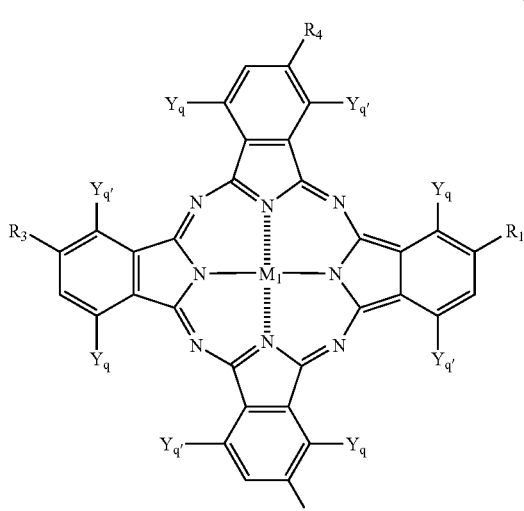

-continued

Formula (a)-3

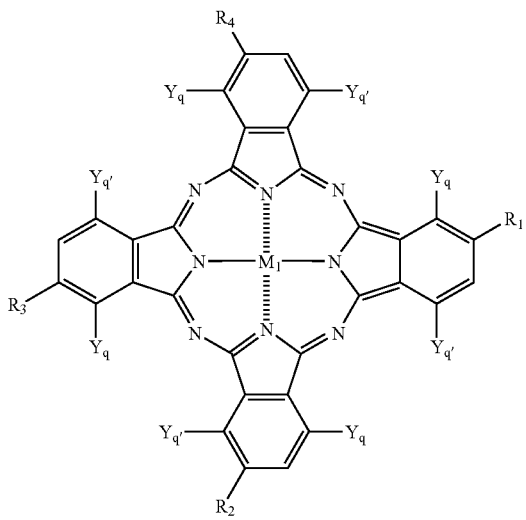

Formula (a)-4

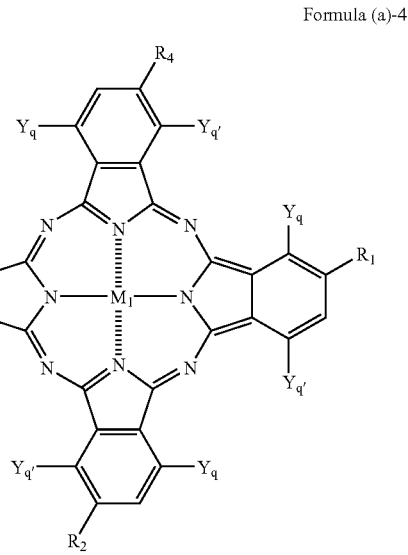

In the synthesis method above, when all $X_p$s are the same, a β-position substitution type phthalocyanine dye where $X_{11}$, $X_{12}$, $X_{13}$ and $X_{14}$ are completely the same substituents can be obtained. On the other hand, when $X_p$s are different, a dye having substituents of the same kind but partially different from each other or a dye having substituents different from each other can be synthesized. Among the dyes of formula (II), these dyes having electron-withdrawing substituents different from each other are preferred because the solubility and aggregating property of dye and the aging stability of ink can be controlled.

In the present invention, it has been found very important for the improvement of fastness that in any substitution type, the oxidation potential is nobler than 1.0 V (vs SCE). The great effect thereof cannot be expected at all from the above-described known techniques. Furthermore, although the reason is not particularly known, there is a tendency that the β-position substitution type is apparently more excellent in the color hue, light fastness, ozone gas resistance and the like than the α,β-position mixed substitution type.

Specific examples (Compounds I-1 to I-12 and 101 to 190) of the phthalocyanine dyes represented by formulae (I) and (II) are set forth below, but the phthalocyanine dye for use in the present invention is not limited to the following examples.

Compounds:
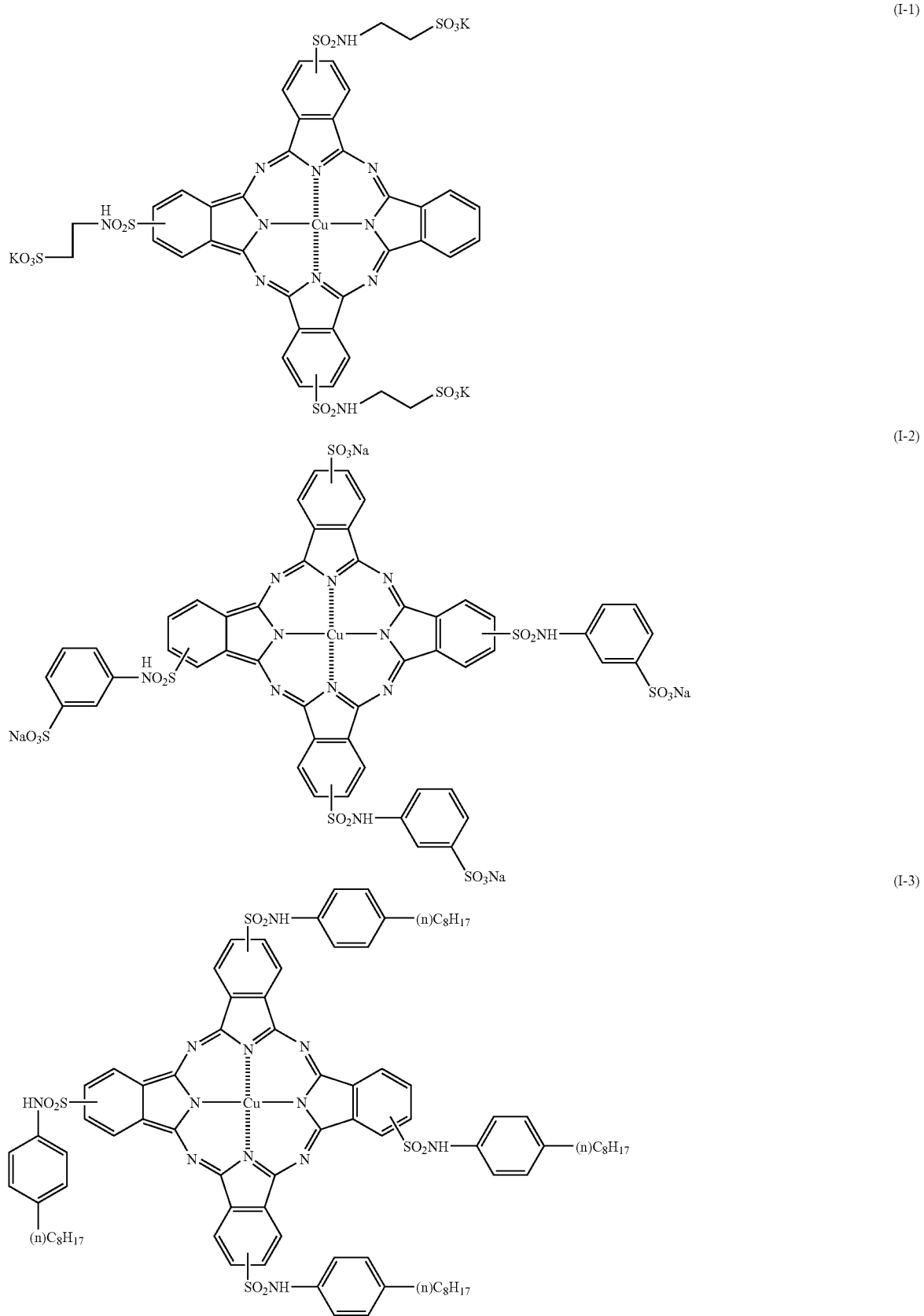
(I-1)
(I-2)
(I-3)

-continued
(I-4)
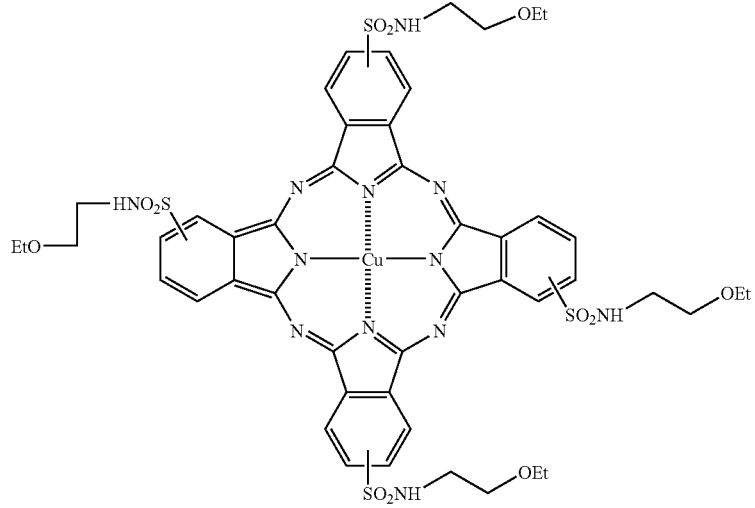
(I-5)
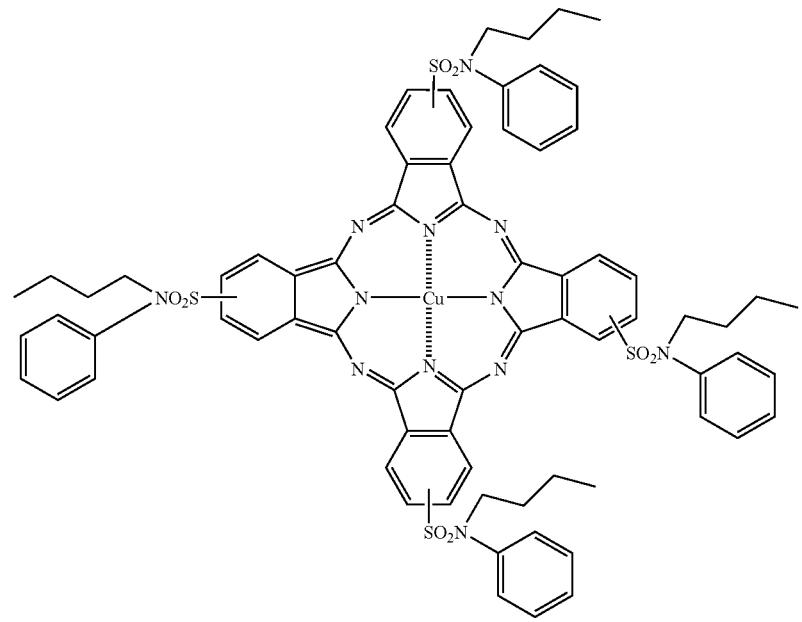
(I-6)
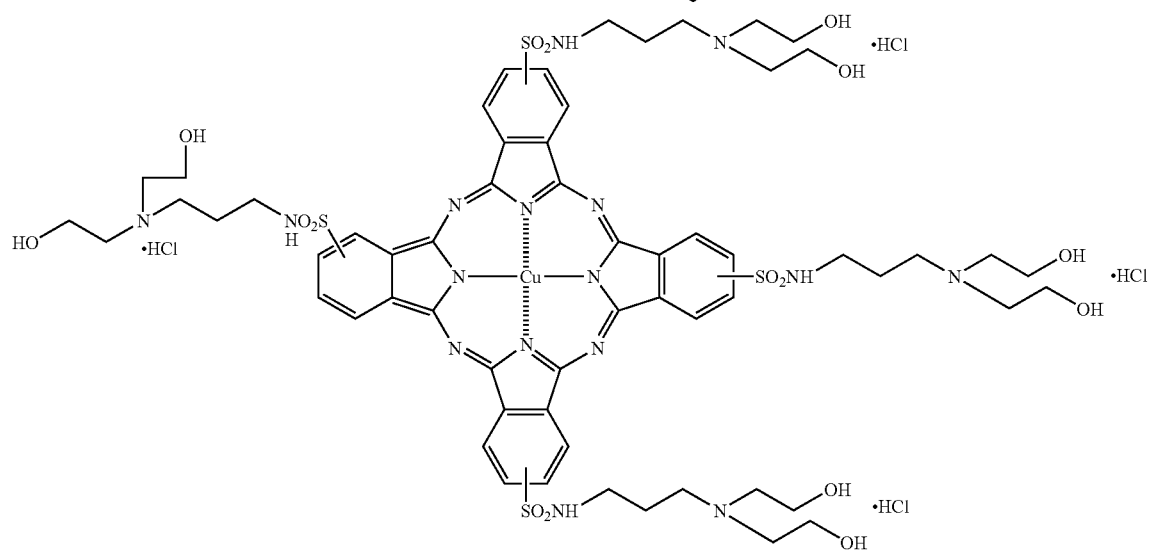

-continued
(I-7)
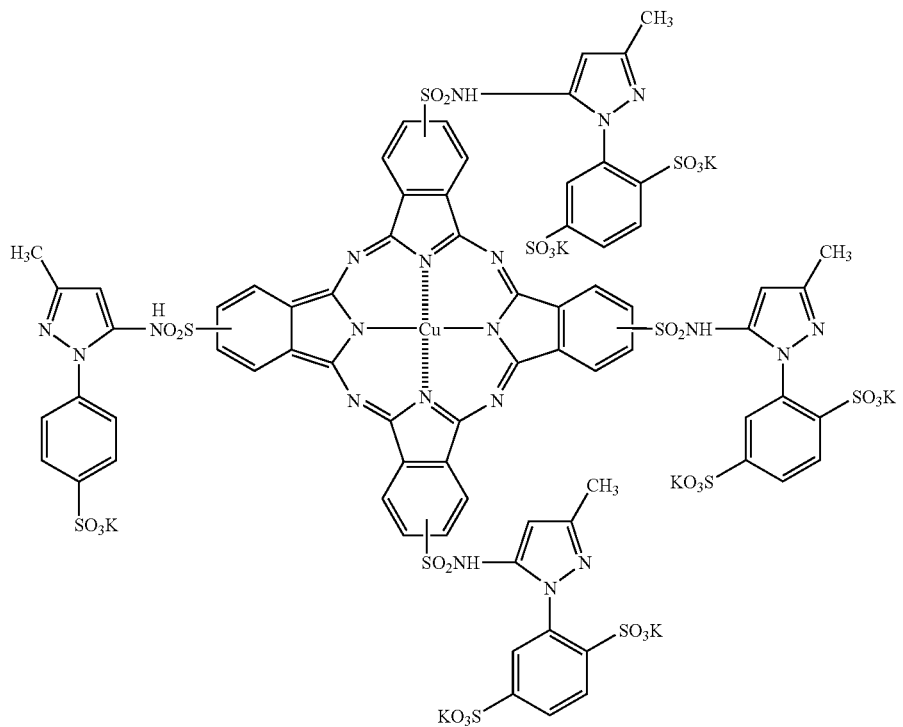
(I-8)
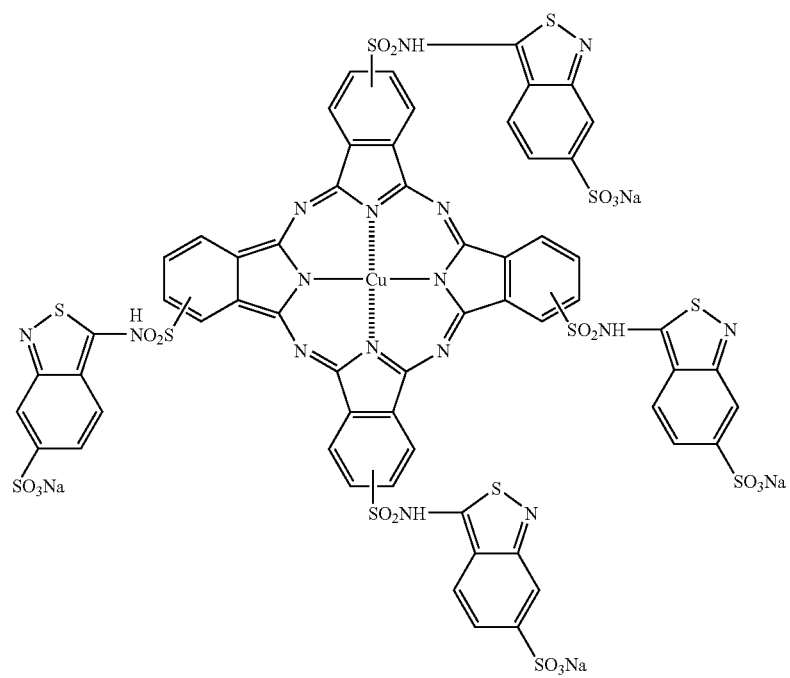

-continued
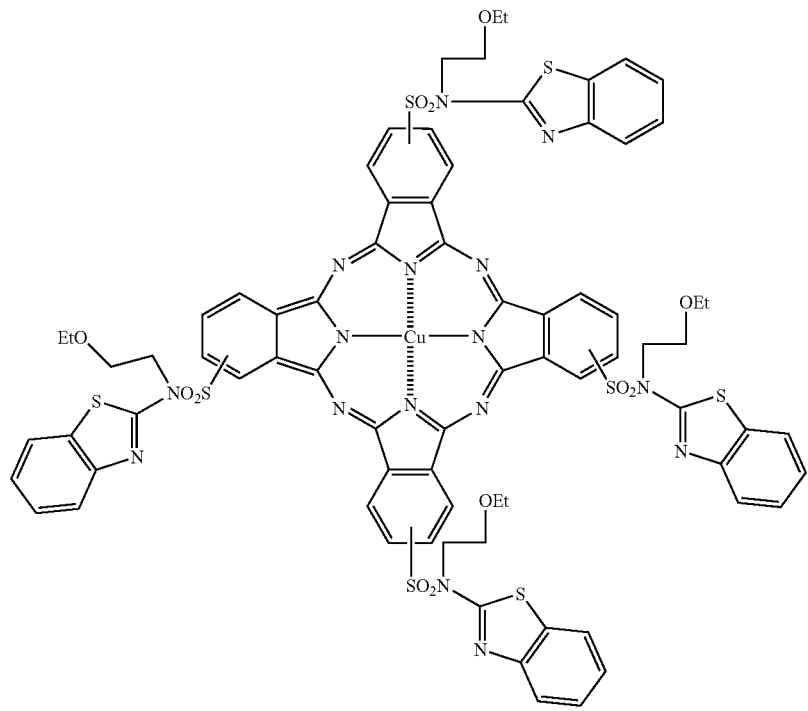
(I-9)
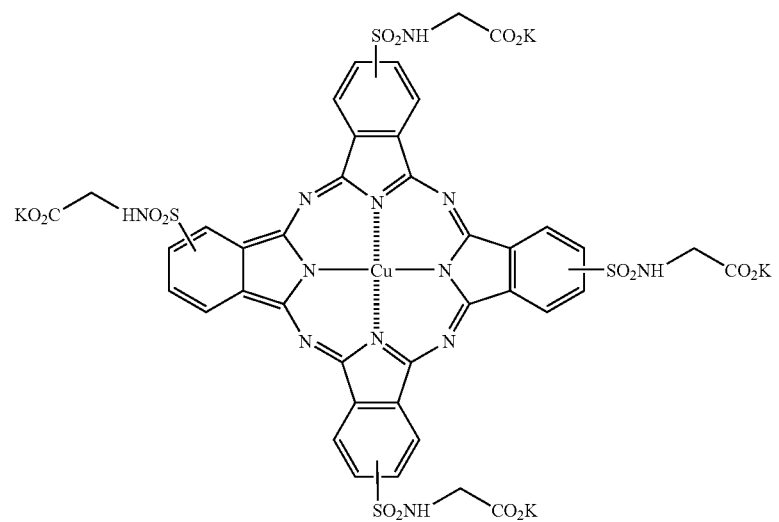
(I-10)

(I-11)
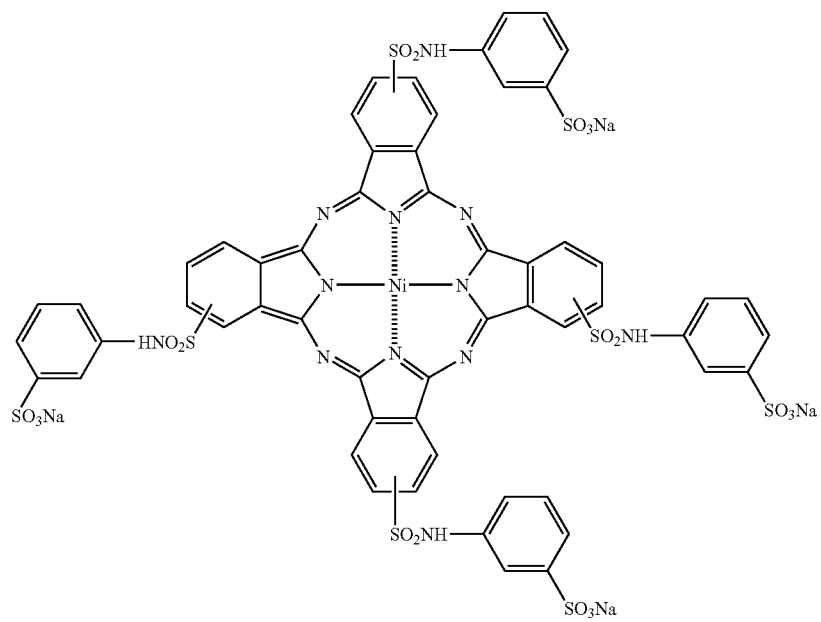
(I-12)
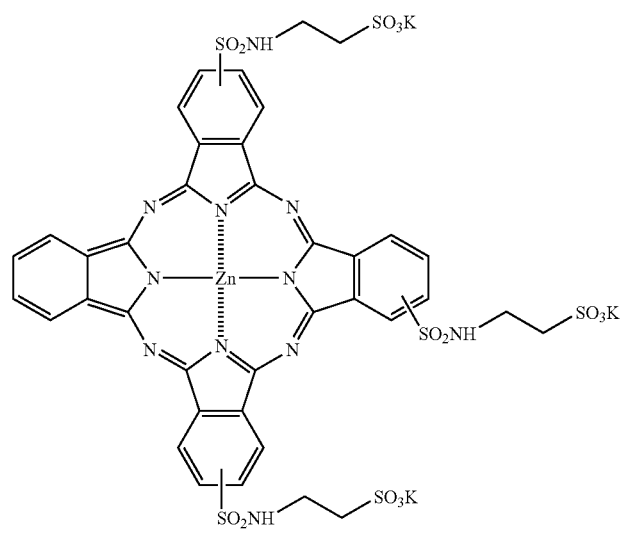
In the following Tables, specific examples of each pair of (X1, X2), (Y11, Y12), (Y13, Y14), (Y15, Y16) and (Y17, Y18) are independently in an irregular order.

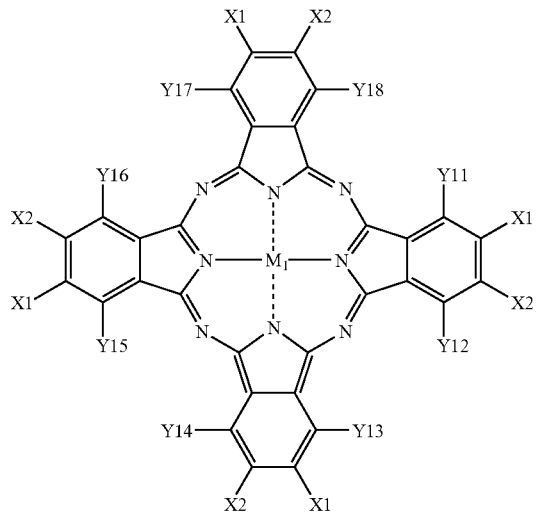

| Compound No. | M | X1 | X2 | Y11, Y12 | Y13, Y14 | Y15, Y16 | Y17, Y18 |
|---|---|---|---|---|---|---|---|
| 101 | Cu | —SO$_2$—NH—CH$_2$—CH$_2$—SO$_3$Li | —H | —H, —H | —H, —H | —H, —H | —H, —H |
| 102 | Cu | —SO$_2$—NH—CH$_2$—CH(OH)—CO—NH—CH$_2$CH$_2$—SO$_3$Na | —H | —Cl, —H | —Cl, —H | —Cl, —H | —Cl, —H |
| 103 | Cu | —SO$_2$—NH—CH$_2$—CH$_2$—CH$_2$—SO$_2$NH—CH$_2$CH(OH)—SO$_3$Li | —H | —H, —H | —H, —H | —H, —H | —H, —H |
| 104 | Cu | —SO$_2$—NH—C$_6$H$_4$—SO$_2$NH—CH$_2$CH$_2$—SO$_3$Li | —H | —H, —H | —H, —H | —H, —H | —H, —H |
| 105 | Ni | —SO$_2$—NH—CH$_2$—CH$_2$—CO—NH—CH(CH$_2$—COONa)—COONa | —H | —Cl, —H | —Cl, —H | —Cl, —H | —Cl, —H |
| 106 | Cu | —SO$_2$—NH—CH$_2$—CH$_2$—SO$_2$—NH—CH$_2$—COONa | —CN | —H, —H | —H, —H | —H, —H | —H, —H |
| 107 | Cu | —SO$_2$—CH$_2$—CH$_2$—CH$_2$—SO$_2$—NH—CH(CH$_2$—OH)—COOLi | —H | —H, —H | —H, —H | —H, —H | —H, —H |
| 108 | Cu | —SO$_2$—CH$_2$—CH$_2$—CH$_2$—SO$_3$Li | —H | —H, —H | —H, —H | —H, —H | —H, —H |
| 109 | Cu | —SO$_2$—CH$_2$—CH$_2$—CH$_2$—SO$_3$K | —H | —H, —H | —H, —H | —H, —H | —H, —H |
| 110 | Cu | —SO$_2$—(CH$_2$)$_5$—CO$_2$K | —H | —H, —H | —H, —H | —H, —H | —H, —H |
| 111 | Cu | —SO$_2$—NH—CH$_2$—CH$_2$—CH$_2$—SO$_2$—NH—CH$_2$CH(OH)—CH$_2$—SO$_3$Li | —H | —H, —H | —H, —H | —H, —H | —H, —H |
| 112 | Cu | —SO$_2$—NH—CH$_2$—CH$_2$—CH$_2$—SO$_2$NH—CH$_2$—CH(OH)—CH$_3$ | —SO$_3$Li | —H, —H | —H, —H | —H, —H | —H, —H |
| 113 | Cu | —SO$_2$—CH$_2$—CH(OH)—CH$_2$SO$_3$K | —H | —H, —H | —H, —H | —H, —H | —H, —H |

-continued

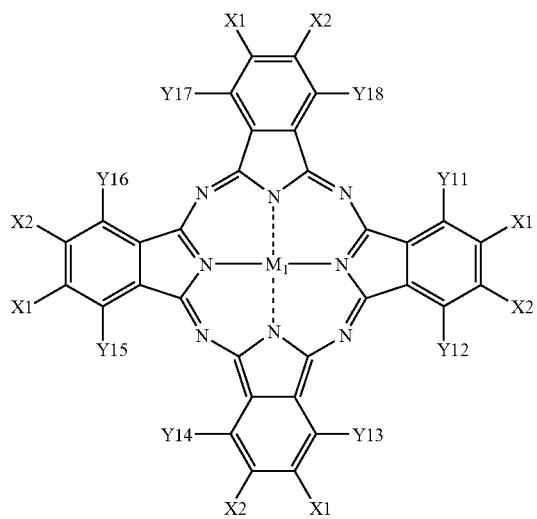

| Compound No. | M | X1 | X2 | Y11, Y12 | Y13, Y14 | Y15, Y16 | Y17, Y18 |
|---|---|---|---|---|---|---|---|
| 114 | Cu | —SO₂—CH₂—CH(OH)—CH₃ | —SO₃Li | —H, —H | —H, —H | —H, —H | —H, —H |
| 115 | Cu | —SO₂NH(CH₂)₃⁺N(CH₃)(CH₂CH₂OH)₂ · CH₃-C₆H₄-SO₃⁻ | —H | —H, —H | —H, —H | —H, —H | —H, —H |
| 116 | Cu | —CO—NH—CH₂—CH(OH)—CH₂SO₃K | —H | —H, —H | —H, —H | —H, —H | —H, —H |
| 117 | Cu | —CO—NH—CH(COOLi)—CH₂CH₂SO₃Li | —H | —H, —H | —H, —H | —H, —H | —H, —H |
| 118 | Cu | —SO₂CH₂CH₂CH(CH₃)(SO₃Li) | —H | —H, —H | —H, —H | —H, —H | —H, —H |
| 119 | Cu | —SO₂—CH₂—CH(OH)—CH₂—SO₃Na | —H | —H, —H | —H, —H | —H, —H | —H, —H |
| 120 | Cu | —SO₂—CH₂—CH₂—CH(CH₃)—COOLi | —H | —H, —H | —H, —H | —H, —H | —H, —H |
| 121 | Cu | —SO₂(CH₂)₃SO₂NHCH₂—CH(OH)—CH₂—SO₃Li | —H | —H, —H | —H, —H | —H, —H | —H, —H |
| 122 | Cu | —CO₂CH₂CH₂CH₂SO₂—NH—CH₂—CH(OH)—CH₂—SO₃Li | —H | —H, —H | —H, —H | —H, —H | —H, —H |
| 123 | Cu | —SO₂NH—C₈H₁₇(t) | —H | —H, —H | —H, —H | —H, —H | —H, —H |
| 124 | Cu | —SO₂—NH—CH₂—CH(CH₂CH₃)—CH₂CHCH₂—CH₃ | —H | —H, —H | —H, —H | —H, —H | —H, —H |

-continued

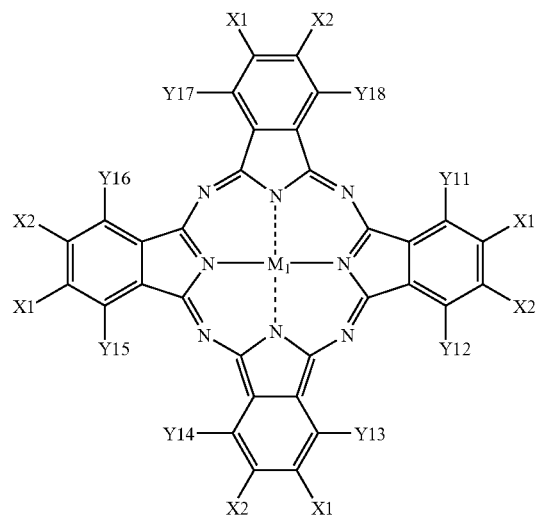

| Compound No. | M | X1 | X2 | Y11, Y12 | Y13, Y14 | Y15, Y16 | Y17, Y18 |
|---|---|---|---|---|---|---|---|
| 125 | Cu | —SO₂CH₂CH₂CH₂SO₂—NH—CH₂—CH(CH₃)—CH₂—CH₃ | —H | —H, —H | —H, —H | —H, —H | —H, —H |
| 126 | Cu | —SO₂—CH₂—CH₂—CH₂—CO₂—CH(CH₃)—CH₃—O—CH₃ | —H | —H, —H | —H, —H | —H, —H | —H, —H |
| 127 | Cu | —SO₂CH₂CH₂CH₂SO₂NHCH₂CH₂CH₂O—CH(CH₃)₂ | —H | —H, —H | —H, —H | —H, —H | —H, —H |
| 128 | Zn | —SO₂—CH₂—CH(OCH₃)—CH₂—O—CH₂ | —CN | —H, —H | —H, —H | —H, —H | —H, —H |
| 129 | Cu | —CO—NH—CH₂—CH(CH₂CH₃)—CH₂—CH₂—CH₂CH₃ | —H | —Cl, —H | —Cl, —H | —Cl, —H | —Cl, —H |
| 130 | Cu | —CO₂—CH(CH₃)—CH₂—O—C₄H₉(t) | —H | —H, —H | —H, —H | —H, —H | —H, —H |
| 131 | Cu | —SO₂—CH₂—CH₂—CH(CH₃)—SO₂—NH—C₆H₃(SO₃Li)₂ | —H | —H, —H | —H, —H | —H, —H | —H, —H |
| 132 | Cu | —SO₂NH—C₆H₃(CO₂C₆H₁₃(n))₂ | —H | —H, —H | —H, —H | —H, —H | —H, —H |

-continued
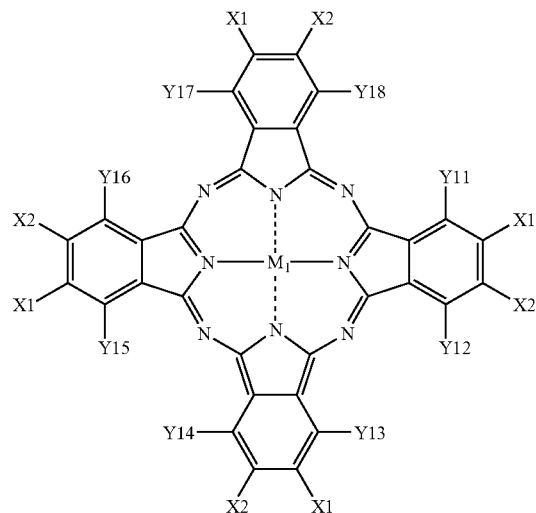
| Compound No. | M | X1 | X2 | Y11, Y12 | Y13, Y14 | Y15, Y16 | Y17, Y18 |
|---|---|---|---|---|---|---|---|
| 133 | Cu | —SO₂NH—⟨benzene⟩—OCH₂CH₂OCH₃, with —SO₂NHCH₂CH(C₂H₅)(C₄H₉) | —H | —H, —H | —H, —H | —H, —H | —H, —H |
| 134 | Cu | —SO₂NH—⟨benzene⟩—SO₂—NH—CH₂—CH(CH₂CH₃)—CH₂—CH₂—CH₂—CH₃ | —H | —H, —H | —H, —H | —H, —H | —H, —H |
| 135 | Cu | —SO₂—⟨benzene⟩—CO₂Na | —H | —H, —H | —H, —H | —H, —H | —H, —H |
| 136 | Cu | —SO₂N(C₄H₉(n))—⟨phenyl⟩ | —H | —H, —H | —H, —H | —H, —H | —H, —H |
| 137 | Cu | —SO₂—⟨benzothiazole⟩—SO₃Li | —H | —H, —H | —H, —H | —H, —H | —H, —H |
| 138 | Cu | —SO₂NH—⟨3-methylpyrazole⟩—N—⟨phenyl⟩(SO₃Li)(LiO₃S) | —H | —H, —H | —H, —H | —H, —H | —H, —H |

-continued

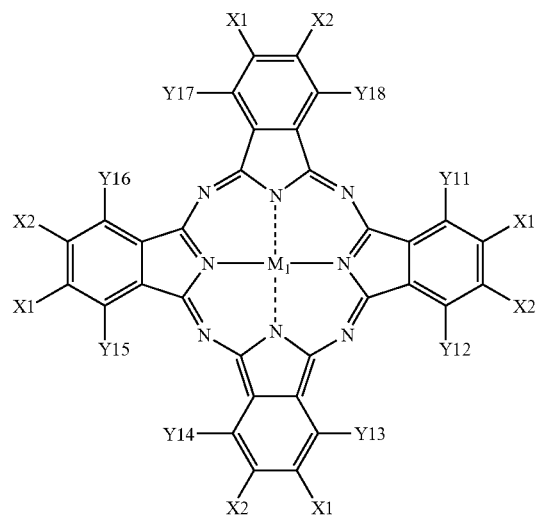

| Compound No. | M | X1 | X2 | Y11, Y12 | Y13, Y14 | Y15, Y16 | Y17, Y18 |
|---|---|---|---|---|---|---|---|
| 139 | Cu | —SO₂(CH₂)₃—NH—C(O)—[benzene with CO₂Li, CO₂Li] | —Cl | —H, —H | —H, —H | —H, —H | —H, —H |
| 140 | Cu | —CO₂—CH₂CH₂CH₂—NH—[triazine with two NH—CH₂—CH₂—CH(CH₃)—SO₃Li groups] | —H | —H, —H | —H, —H | —H, —H | —H, —H |
| 141 | Cu | —SO₂NH—CH(COONa)—CH₂—CO—N—(CH₂CH₂OH)₂ | —H | —H, —H | —H, —H | —H, —H | —H, —H |
| 142 | Cu | —SO₂NH—[phenyl]—NHC(O)—[phenyl-SO₃Li] | —H | —H, —H | —H, —H | —H, —H | —H, —H |
| 143 | Cu | —CO—NH—CH₂—CH(OH)—CO—NH—CH(COOK)—CH₂CH₂—SO₃K | —H | —H, —H | —H, —H | —H, —H | —H, —H |
| 144 | Cu | —SO₂—CH₂CH₂CH₂—NH—CO—[phenyl]—CO—NH—CH(COOLi)—CH₂—COOLi | —H | —H, —H | —H, —H | —H, —H | —H, —H |
| 145 | Cu | —SO₂CH₂CH₂OCH₂CH₂OCH₂CH₂SO₃Li | —H | —H, —H | —H, —H | —H, —H | —H, —H |

In the following Tables, each introduction site of substituents ($X_{p1}$) and ($X_{p2}$) is in an irregular order within the β-position substitution type.

| Compound No. | M | Xp₁ | m | Xp₂ | n |
|---|---|---|---|---|---|
| 146 | Cu | —SO₂—NH—CH₂—CH(CH₃)—SO₃Li | 3 | —SO₂—NH—CH₂—CH(OH)—CH₃ | 1 |
| 147 | Cu | —SO₂—NH—CH₂—CH₂SO₃Li | 3 | —SO₂—NH—CH₂—CH₂—SO₂—NH—CH₂—CH₂—CH₃ | 1 |
| 148 | Cu | —SO₂—NH—CH₂—CH(CH₃)—SO₃Li | 3 | —SO₂NH—CH₂—CH₂—SO₂—NH—CH₂—CH₂—O—CH₂—CH₂—OH | 1 |
| 149 | Cu | —SO₂—NH—CH₂—CH(CH₃)—SO₃Li | 2 | —SO₂—NH—CH₂—CH₂—CH₂—CO—N(CH₂—CH₂—OH)₂ | 2 |
| 150 | Cu | —SO₂—NH—CH₂—CH₂—SO₂—NH—CH₂CH₂—COONa | 3 | —SO₂NH—CH(CH₃)—CH₂OH | 1 |
| 151 | Cu | —SO₂—NH—C₆H₄—SO₂NH—CH₂—CH(OH)—CH—SO₃Li | 3 | —SO₂NH—CH₂—CH₂—O—CH₂—CH₂—OH | 1 |
| 152 | Cu | —SO₂—CH₂—CH(CH₃)—SO₃Li | 2.5 | —SO₂—CH₂—CH₂—O—CH₂—CH₂—OH | 1.5 |
| 153 | Cu | —SO₂—CH₂—CH(CH₃)—SO₃Na | 2 | —SO₂—CH₂—CH₂—CH₂—CO—N(CH₂—CH₂—OH)₂ | 2 |
| 154 | Cu | —SO₂—CH₂—CH₂—CH₂—SO₃Li | 3 | —SO₂—CH₂—CH₂—SO₂—NH—CH₂—CH(OH)—CH₃ | 1 |
| 155 | Cu | —SO₂—CH₂—CH₂—COOK | 2 | —SO₂—CH₂—CH₂—SO₂—NH—CH₂—CH(OH)—CH₂—COOK | 2 |
| 156 | Cu | —SO₂—CH₂—CH₂—SO₃Li | 3 | —SO₂—CH₂—CH(OH)—CH₂—SO₃Li | 1 |

-continued

| Compound No. | M | $Xp_1$ | m | $Xp_2$ | n |
|---|---|---|---|---|---|
| 157 | Cu | —$SO_2$—$CH_2$—$CH_2$—O—$CH_2$—$CH_2$—$SO_3Li$ | 2 | —$SO_2$—$CH_2$—$CH_2$—$CH_2$—$CO_2$—$CH_2$—$CH_2$—CH(OH)—$CH_2$—$CH_2$—COOK | 2 |
| 158 | Cu | —$SO_2$—$CH_2$—CH(OH)—$CH_2SO_3Li$ | 3 | —$SO_2NH$—(C$_6H_4$)—$CH_2$—CH(OH)—$CH_2$—OH | 1 |
| 159 | Cu | —$SO_2NHCH_2CH_2$—$SO_3Li$ | 3 | —$SO_2$—$CH_2$—$CH_2$—$SO_2$—NH—$CH_2$—CH(OH)—$CH_3$ | 1 |
| 160 | Cu | —$SO_2$—$CH_2$—$CH_2$—O—$CH_2$—$CH_2$—O—$CH_2$—$CH_2$—$SO_3Na$ | 3 | —$SO_2$—$CH_2$—$CH_2$—CO—NH—$CH_2$—COONa (with $CH_2$—$CH_2$—COONa branch) | 1 |
| 161 | Cu | —$SO_2CH_2CH_2SO_3Li$ | 3 | —$SO_2CH_2CH_2SO_2NHCH_2$—CH(OH)—$CH_2SO_3Li$ | 1 |
| 162 | Cu | —$SO_2CH_2CH_2SO_3Li$ | 2 | —$SO_2CH_2CH_2OCH_2CH_2OCH_2CH_2OH$ | 2 |
| 163 | Cu | —$SO_2CH_2CH_2SO_3K$ | 3 | —$SO_2CH_2CH_2SO_2NH$—CH($CH_3$)—$CH_2$—OH | 1 |
| 164 | Cu | —$SO_2CH_2CH_2SO_3Li$ | 2 | —$SO_2CH_2CH_2SO_2N(CH_2CH_2OH)_2$ | 2 |
| 165 | Cu | —CO—NH—$CH_2$—$CH_2$—$SO_3K$ | 3 | —CO—NH—$CH_2$—$CH_2$—O—$CH_2$—$CH_2$—OH | 1 |
| 166 | Cu | —CO—NH—$CH_2$—$SO_2$—NH—$CH_2$—$CH_2$—COONa | 3 | —CO—NH—$CH_2$—CH(OH)—$CH_3$ | 1 |
| 167 | Cu | —$SO_2(CH_2)_3SO_2NHCH_2$—CH(OH)—$CH_2CO_2Li$ | 2.5 | —CO—$CH_2$—$CH_2$—CO—N($CH_2$—$CH_2$—OH)$_2$ | 1.5 |
| 168 | Cu | —$CO_2$—$CH_2$—CH($CH_3$)—$CH$—$SO_3Na$ | 2 | —CO—$CH_2$—$CH_2$—$CH_2$—CO—N($CH_2$—$CH_2$—OH)$_2$ | 2 |
| 169 | Cu | —$CO_2$—$CH_2$—$CH_2$—$SO_3Li$ | 3 | —$CO_2$—$CH_2$—$CH_2$—$CH_2$—$SO_2$—NH—$CH_2$—CH(OH)—$CH_3$ | 1 |

-continued $M\text{-}Pc(Xp_1)_m(Xp_2)_n$

| Compound No. | M | $Xp_1$ | m | $Xp_2$ | n |
|---|---|---|---|---|---|
| 181 | Cu | —SO$_2$—CH$_2$—CH$_2$—CO$_2$—NH—CH(CH$_3$)—CH$_2$—CH$_3$ | 3 | —SO$_2$—CH$_2$—CH$_2$—SO$_2$—NH—CH—(CH$_3$)$_2$ | 1 |
| 182 | Cu | —SO$_2$—CH$_2$—CH$_2$—SO$_2$NH—CH$_2$—CH(OH)—CH$_2$—CH$_3$ | 2.5 | —SO$_2$—CH$_2$—CH$_2$—CO$_2$—NH—CH(CH$_3$)—CH$_2$—CH$_3$ | 1.5 |
| 183 | Cu | —SO$_2$—CH$_2$—CH$_2$—CO$_2$—NH—CH(CH$_3$)—CH$_2$—CH$_3$ | 2 | —SO$_2$—CH$_2$—CH$_2$—SO$_2$—NH—(CH$_2$)$_3$—CH$_2$—O—CH$_2$CH$_2$—OH | 2 |
| 184 | Cu | —SO$_2$—CH$_2$—CH$_2$—SO$_2$—NH—CH$_2$—CH(OH)—CH$_2$—CH$_3$ | 3 | —SO$_2$—CH$_2$—CH$_2$—O—CH$_2$—O—CH$_3$ | 1 |
| 185 | Cu | —SO$_2$—CH$_2$—CH$_2$—CO$_2$—NH—CH$_2$—CH(OH)—CH$_2$—CH$_3$ | 3 | —SO$_2$—CH$_2$—CH$_2$—O—CH$_2$—CH$_2$—O—CH$_3$ | 1 |
| 186 | Cu | —SO$_2$—CH$_2$—CH$_2$—SO$_2$—NH—CH$_2$—CH(CH$_3$)—CH$_2$—CH$_3$ | 3 | —SO$_2$—CH$_2$—CH$_2$—O—CH$_2$—CH$_2$—OH | 1 |
| 187 | Cu | —SO$_2$—CH$_2$—CH$_2$—CO$_2$—NH—CH(CH$_3$)—CH$_2$—CH$_3$ | 3 | —CO$_2$—CH$_2$—CH(CH$_2$CH$_3$)—CH$_2$—CH$_2$—CH$_2$CH$_3$ | 1 |
| 188 | Cu | —SO$_2$—CH$_2$—CH$_2$—SO$_2$—NH—CH(CH$_3$)$_2$ | 3 | —CO$_2$—CH$_2$—CH$_2$—O—CH$_2$—CH$_2$—O—CH$_3$ | 1 |
| 189 | Cu | —CO—NH—CH$_2$—CH(CH$_2$CH$_3$)—CH$_2$—CH$_2$—CH$_3$ | 3 | —SO$_2$—NH—CH$_2$—CH(CH$_2$CH$_3$)—CH$_2$—CH$_2$—CH$_2$—CH$_3$ | 1 |
| 190 | Cu | —CO—NH—CH$_2$—CH(CH$_2$CH$_3$)—CH$_2$—CH$_2$—CH$_2$CH$_3$ | 3 | —CO—NH—CH$_2$—CH$_2$—O—CH$_2$—CH$_2$—O—CH$_3$ | 1 |

The structure of the phthalocyanine compound represented by M-Pc$(X_{p1})_m(X_{p2})_n$ in Compound Nos. 146 to 190 is shown below:

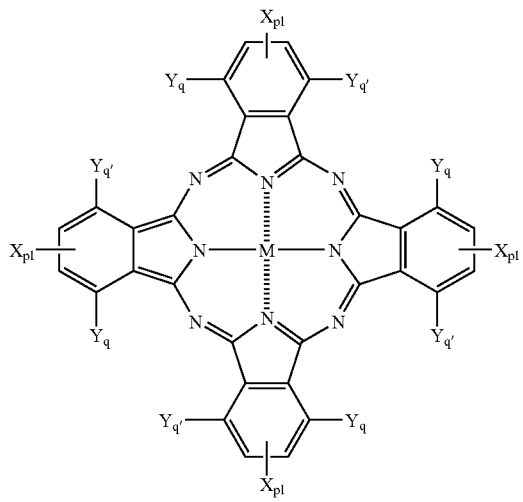

(wherein each $X_{p1}$ is independently $X_{p1}$ or $X_{p2}$).

The phthalocyanine dye represented by formula (I) can be synthesized according to the patent publications described above. Furthermore, the phthalocyanine dye represented by formula (II) can be synthesized by the methods described in JP-A-2001-226275, JP-A-2001-96610, JP-A-2001-47013 and JP-A-2001-193638 in addition to the above-described synthesis method. The starting material, dye intermediate and synthesis route are not limited to those described in these patent publications.

[Ink]

The inkjet recording ink of the present invention (sometimes referred to as "the ink of the present invention") is a magenta or cyan ink obtained by dissolving or dispersing at least one azo dye or phthalocyanine dye described above in an aqueous medium and preferably containing the azo dye or phthalocyanine dye in an amount of 0.2 to 20 mass %, more preferably from 0.5 to 15 mass %.

In the ink of the present invention, for adjusting the color tone, other dyes can be added in addition to the above-described specific azo or phthalocyanine dye. Also, for constituting an ink set for full color printing, a yellow color, a black ink and the like are used in combination with the ink of the present invention and in these inks, respective coloring matters are used. Furthermore, a magenta ink and a cyan ink other than those of the present invention can also be used. Examples of the coloring matter which can be used in combination include the followings.

Examples of the yellow coloring matter include aryl- or heteryl-azo dyes having a phenol, a naphthol, an aniline, a pyrazolone, a pyridone or an open chain-type active methylene compound as the coupling component; azomethine dyes having an open chain-type active methylene compound as the coupling component; methine dyes such as benzylidene dye and monomethine oxonol dye; and quinone-base dyes such as naphthoquinone dye and anthraquinone dye. Other examples of the coloring matter species include quinophthalone dye, nitro•nitroso dye, acridine dye and acridinone dye. These coloring matters may be a coloring matter which provides a yellow color for the first time when a part of the chromophore is dissociated. In this case, the counter cation may be an inorganic cation such as alkali metal and ammonium, an organic cation such as pyridinium and quaternary ammonium salt, or a polymer cation having such a cation in the partial structure.

Examples of the magenta coloring matter include aryl- or heteryl-azo dyes having a phenol, a naphthol or an aniline as the coupling component; azomethine dyes having a pyrazolone or a pyrazolotriazole as the coupling component; methine dyes such as arylidene dye, styryl dye, merocyanine dye and oxonol dye; carbonium dyes such as diphenylmethane dye, triphenylmethane dye and xanthene dye; quinone-base dyes such as naphthoquinone, anthraquinone and anthrapyridone; and condensed polycyclic dyes such as dioxazine dye. These coloring matters may be a coloring matter which provides a magenta color for the first time when a part of the chromophore is dissociated. In this case, the counter cation may be an inorganic cation such as alkali metal and ammonium, an organic cation such as pyridinium and quaternary ammonium salt, or a polymer cation having such a cation in the partial structure.

Examples of the cyan coloring matter include azomethine dyes such as indoaniline dye and indophenol dye; polymethine dyes such as cyanine dye, oxonol dye and merocyanine dye; carbonium dyes such as diphenylmethane dye, triphenylmethane dye and xanthene dye; phthalocyanine dyes; anthraquinone dyes; aryl- or heteryl-azo dyes having a phenol, a naphthol or an aniline as the coupling component; and indigo-thioindigo dyes. These coloring matters may be a coloring matter which provides a cyan color for the first time when a part of the chromophore is dissociated. In this case, the counter cation may be an inorganic cation such as alkali metal and ammonium, an organic cation such as pyridinium and quaternary ammonium salt, or a polymer cation having such a cation in the partial structure.

A black coloring matter such as polyazo dye can also be used.

Other examples of the water-soluble dye include a direct dye, an acid dye, a food color, a basic dye and a reactive dye. Preferred examples thereof include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243 and 247; C.I. Direct Violet 7, 9, 47, 48, 51, 66, 90, 93, 94, 95, 98, 100 and 101; C.I. direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397; C.I. Acid Violet 5, 34, 43, 47, 48, 90, 103 and 126; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326; C.I. Acid Black 7, 24, 29, 48, 52:1 and 172; C.I. Reactive Red 3, 13, 17, 19, 21, 22, 23, 24, 29, 35, 37, 40, 41, 43, 45, 49 and 55; C.I. Reactive Violet 1, 3, 4, 5, 6, 7, 8, 9, 16, 17, 22, 23, 24, 26, 27, 33 and 34; C.I. Reactive Yellow 2, 3, 13, 14, 15, 17, 18, 23, 24, 25, 26, 27, 29, 35, 37, 41 and 42; C.I. Reactive Blue 2, 3, 5, 8, 10, 13, 14, 15, 17, 18, 19, 21, 25, 26, 27, 28, 29 and 38; C.I. Reactive Black 4, 5, 8, 14, 21, 23, 26, 31, 32 and 34; C.I. Basic Red 12, 13, 14, 15, 18, 22, 23, 24, 25, 27, 29, 35, 36, 38, 39, 45 and 46; C.I. Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39 and 40; C.I. Basic Blue 1, 3, 5, 7, 9, 22, 26, 41, 45, 46, 47, 54, 57, 60, 62, 65, 66, 69 and 71; and C.I. Basic Black 8.

The coloring matter containing the azo dye or phthalocyanine dye for use in the present invention is substantially water-soluble or water-dispersible. More specifically, the coloring matter containing respective dyes preferably has a solubility of 2 mass % or more, more preferably 5 mass % or more, in water at 20° C.

In the ink of the present invention and other inks combined therewith for providing an ink set, a pigment can also be used in combination.

As the pigment for use in the present invention, commercially available pigments and known pigments described in various publications can be used. Examples of the publication include *Color Index*, compiled by The Society of Dyers and Colourists, *Kaitei Shin Han Ganryo Binran* (*Revised New Handbook of Pigments*), compiled by Nippon Ganryo Gijutsu Kyokai (1989), *Saishin Ganryo Oyo Gijutsu* (*Newest Pigment Application Technology*), CMC Shuppan (1986), *Insatsu Ink Gijutsu* (*Printing Ink Technique*), CMC Shuppan (1984), and W. Herbst and K. Hunger, *Industrial Organic Pigments*, VCH Verlagsgesellschaft (1993). Specific examples of the pigment include organic pigments such as azo pigments (e.g., azo lake pigment, insoluble azo pigment, condensed azo pigment, chelate azo pigment), polycyclic pigments (e.g., phthalocyanine-base pigment, anthraquinone-base pigment, perylene-base or perynone-base pigment, indigo-base pigment, quinacridone-base pigment, dioxazine-base pigment, isoindolinone-base pigment, quinophthalone-base pigment, diketopyrrolopyrrole-base pigment), dyeing lake pigments (lake pigments of acidic or basic dye) and azine pigments, and inorganic pigments such as C.I. Pigment Yellow 34, 37, 42 and 53 which are a yellow pigment, C.I. Pigment Red 101 and 108 which are a red-type pigment, C.I. Pigment Blue 27, 29 and 17:1 which are a blue-type pigment, C.I. Pigment Black 7 and magnetite which are a black-type pigment, and C.I. Pigment White 4, 6, 18 and 21 which are a white-type pigment.

The pigment having a color tone preferred for the formation of an image includes the followings. As the blue to cyan pigment, phthalocyanine pigments, anthraquinone-type indanthrone pigments (for example, C.I. Pigment Blue 60) and dyeing lake pigment-type triarylcarbonium pigments are preferred, and phthalocyanine pigments are most preferred (preferred examples thereof include copper phthalocyanine such as C.I. Pigment Blue 15:1, 15:2, 15:3, 15:4 and 15:6, monochloro or low chlorinated copper phthalocyanine, aluminum phthalocyanine such as pigments described in European Patent 860475, nonmetallic phthalocyanine such as C.I. Pigment Blue 16, and phthalocyanine with the center metal being Zn, Ni or Ti, and among these, C.I. Pigment Blue 15:3 and 15:4 and aluminum phthalocyanine are more preferred).

As the red to violet pigment, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146 and 184, and among these, C.I. Pigment Red 57:1, 146 and 184 are more preferred), quinacridone-base pigments (preferred examples thereof include C.I. Pigment Red 122, 192, 202, 207 and 209 and C.I. Pigment Violet 19 and 42, and among these, C.I. Pigment Red 122 is more preferred), dyeing lake pigment-type triarylcarbonium pigments (preferred examples thereof include xanthene-base C.I. Pigment Red 81:1 and C.I. Pigment Violet 1, 2, 3, 27 and 39), dioxazine-base pigments (for example, C.I. Pigment Violet 23 and 37), diketopyrrolopyrrole-base pigments (for example, C.I. Pigment Red 254), perylene pigments (for example, C.I. Pigment Violet 29), anthraquinone-base pigments (for example, C.I. Pigment Violet 5:1, 31 and 33) and thioindigo-base pigments (for example, C.I. Pigment Red 38 and 88) are preferred.

As the yellow pigment, azo pigments (preferred examples thereof include monoazo pigment-type C.I. Pigment Yellow 1, 3, 74 and 98, disazo pigment-type C.I. Pigment Yellow 12, 13, 14, 16, 17 and 83, synthetic azo-type C.I. Pigment 93, 94, 95, 128 and 155, and benzimidazolone-type C.I. Pigment Yellow 120, 151, 154, 156 and 180, and among these, those not using a benzidine-base compound as a raw material are more preferred), isoindoline-isoindolinone-base pigments (preferred examples thereof include C.I. Pigment Yellow 109, 110, 137 and 139), quinophthalone pigments (preferred examples thereof include C.I. Pigment Yellow 138) and flavanthrone pigments (for example, C.I. Pigment Yellow 24) are preferred.

As the black pigment, inorganic pigments (preferred examples thereof include carbon black and magnetite) and aniline black are preferred.

Other than these, an orange pigment (for example, C.I. Pigment Orange 13 and 16) and a green pigment (for example, C.I. Pigment Green 7) may be used.

The above-described pigment which can be used in the present invention may be used as it is or may be subjected to a surface treatment. For the surface treatment, a method of coating the surface with resin or wax, a method of attaching a surfactant, and a method of binding a reactive substance (for example, a radical generated from a silane coupling agent, an epoxy compound, polyisocyanate or a diazonium salt) to the pigment surface may be used and these are described in the following publications and patents:

(1) *Kinzoku Sekken no Seishitsu to Oyo* (*Properties and Applications of Metal Soap*), Saiwai Shobo;

(2) *Insatsu Ink Insatsu* (*Printing Ink Printing*), CMC Shuppan (1984);

(3) *Saishin Ganryo Oyo Gijutsu* (*Newest Pigment Application Technology*), CMC Shuppan (1986);

(4) U.S. Pat. Nos. 5,554,739 and 5,571,311; and (5) JP-A-9-151342, JP-A-10-140065, JP-A-10-292143 and JP-A-11-166145.

Particularly, self-dispersible pigments prepared by allowing a diazonium salt to act on carbon black described in U.S. patents of (4) and capsulated pigments prepared by the method described in Japanese patent publications of (5) are effective, because dispersion stability can be obtained without using an excess dispersant in the ink.

In the present invention, the pigment may be dispersed by further using a dispersant. Various known dispersants can be used according to the pigment used, for example, a surfactant-type low molecular dispersant or a polymer-type dispersant can be used. Examples of the dispersant include those described in JP-A-3-69949 and European Patent 549486. In using the dispersant, a pigment derivative called synergist may also be added so as to accelerate the adsorption of dispersant to the pigment.

The particle size of the pigment which can be used in the present invention is, after dispersion, preferably from 0.01 to 10 μm, more preferably from 0.05 to 1 μm.

As for the method of dispersing the pigment, known dispersion techniques used for the production of ink or toner can be used. Examples of the dispersing machine include vertical or horizontal agitator mill, attritor, colloid mill, ball mill, three-roll mill, pearl mill, super-mill, impeller, disperser, KD mill, dynatron and pressure kneader. These are described in detail in *Saishin Ganryo Oyo Gijutsu* (*Newest Pigment Application Technology*), CMC Shuppan (1986).

The ink of the present invention further comprises an antiseptic. The antiseptic as used in the present invention means a material having a function of preventing the generation or growth of microorganisms, particularly, bacteria and fungi.

As the antiseptic for use in the present invention various antiseptics can be used.

Examples thereof include heavy metal ion-containing inorganic antiseptics (e.g., silver ion-containing material) and salts. As for the organic antiseptic, various antiseptics can be used, such as quaternary ammonium salts (e.g., tetrabutylammonium chloride, cetylpyridinium chloride, benzyltrimethylammonium chloride), phenol derivatives (e.g., phenol, cresol, butylphenol, xylenol, bisphenol), phenoxy ether derivatives (e.g., phenoxyethanol), heterocyclic compounds (e.g., benzotriazole, Proxel, 1,2-benzoisothiazolin-3-one), acid amides, carbamic acid, carbamates, amidines-guanidines, pyridines (e.g., sodium pyridinethione-1-oxide), diazines, triazines, pyrroles.imidazoles, oxazoles.oxazines, thiazoles.thiadiazines, thioureas, thiosemicarbazides, dithiocarbamates, sulfides, sulfoxides, sulfones, sulfamides, antibiotics (e.g., penicillin, tetracyclin), sodium dehydroacetate, sodium benzoate, ethyl p-hydroxybenzoate, and salts thereof. Also, antiseptics described, for example, in *Bokin Bobi Handbook* (*Handbook of Microbicide and Fungicide*), Gihodo (1986), and *Bokin Bobai Zai Jiten* (*Dictionary of Microbicide and Fungicide*), compiled by Nippon Bokin Bobai Gakkai Jiten Henshu Iinkai, can be used.

Various compounds having an oil-soluble structure or a water-soluble structure may be used therefor, but a water-soluble compound is preferred.

Particularly, in the present invention, when two or more of these antiseptics are used in combination, the ejection stability after long-term aging of the ink is remarkably enhanced and the effect of the present invention is more successfully brought out. In using two or more antiseptics in combination, these are preferably differing in the skeleton of chemical structure. Furthermore, in the case of containing two or more antiseptics, at least one antiseptic is preferably a heterocyclic compound. For example, a combination of a heterocyclic compound and an antibiotic, or a combination of a heterocyclic compound and a phenol derivative is preferred. In using two antiseptics in combination, the content ratio therebetween is not limited but is preferably in the range of antiseptic A/antiseptic B=0.01 to 100 (by mass).

The antiseptic can be used in a wide range of amount but the amount added thereof is preferably from 0.001 to 10 mass %, more preferably from 0.1 to 5 mass %.

The inkjet recording ink of the present invention preferably contains. By containing the a surfactant, the liquid properties of the ink are controlled and this can provide excellent effects such as enhancement of ejection stability of ink, improvement of water resistance of image, and prevention of bleeding of printed ink.

Examples of the surfactant include anionic surfactants such as sodium dodecylsulfate, sodium dodecyloxysulfonate and sodium alkylbenzenesulfonate, cationic surfactants such as cetylpyridinium chloride, trimethylcetylammonium chloride and tetrabutylammonium chloride, and nonionic surfactants such as polyoxyethylene nonylphenyl ether, polyoxyethylene naphthyl ether and polyoxyethylene octylphenyl ether. Among these, nonionic surfactants are preferred.

The surfactant content in the ink is preferably from 0.001 to 15 mass %, more preferably from 0.005 to 10 mass %, still more preferably from 0.01 to 5 mass %.

The inkjet recording ink of the present invention can be prepared by dissolving and/or dispersing the azo dye and the surfactant in an aqueous medium. The term "aqueous medium" as used in the present invention means water or a mixture of water and a small amount of water-miscible organic solvent, where additives such as wetting agent and stabilizer are added, if desired.

Examples of the water-miscible organic solvent which can be used in the present invention include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

In preparing the ink of the present invention, in the case of a water-soluble ink, the dye and the surfactant are preferably first dissolved in water and thereafter, various solvents and additives are added, dissolved and mixed to provide a uniform ink solution.

For dissolving the dye and the like, various methods such as stirring, ultrasonic irradiation and shaking can be used. Among these, stirring is preferred. In performing the stirring, various systems known in this field can be used, such as flow stirring and stirring utilizing the shearing force by means of a reversal agitator or a dissolver. Also, a stirring method utilizing the shearing force with the bottom surface of a container, such as magnetic stirrer, can be advantageously used.

In the case where the azo or phthalocyanine dye is an oil-soluble dye, the ink can be prepared by dissolving the oil-soluble dye in a high boiling point organic solvent and emulsion-dispersing it in an aqueous medium.

The high boiling point organic solvent for use in the present invention has a boiling point of 150° C. or more, preferably 170° C. or more.

Examples of the high boiling point organic solvent include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate, bis (1, 1-diethylpropyl) phthalate), esters of phosphoric acid or phosphone (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, di-2-ethylhexylphenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tertoctylaniline), chlorinated paraffins (e.g., paraffins having a chlorine content of 10 to 80%), trimesic acid esters (e.g., tributyl trimesate), dodecylbenzene, diisopropylnaphthalene, phenols (e.g., 2,4-di-tert-amylphenol, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxy)butyric acid, 2-ethoxyoctane-decanoic acid) and alkylphosphoric acids (e.g., di-(2-ethylhexyl)phosphoric acid and diphenylphosphoric acid). The high boiling point organic solvent can be used in an amount of, in terms of mass ratio to the oil-soluble dye, from 0.01 to 3 times, preferably from 0.01 to 1.0 times.

These high boiling point organic solvents may be used individually or as a mixture of several kinds [for example, tricresyl phosphate and dibutyl phthalate, trioctyl phosphate and di(2-ethylhexyl)sebacate, or dibutyl phthalate and poly (N-tert-butylacrylamide)].

Examples of the high boiling point organic solvent for use in the present invention, other than the above-described compounds, and/or the synthesis method of these high boiling point organic solvents are described in U.S. Pat. Nos. 2,322, 027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253, EP-A-289820, EP-A-309158, EP-A-309159, EP-A-309160, EP-A-509311, EP-A-510576, East German Patents 147,009, 157,147, 159,573 and 225,240A, British Patent 2091124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

The high boiling point organic solvent can be used in an amount of, in terms of mass ratio to the oil-soluble dye, from 0.01 to 3 times, preferably from 0.01 to 1.0 times.

In the present invention, the oil-soluble dye or high boiling point organic solvent is used by emulsion-dispersing it in an aqueous medium. Depending on the case, a low boiling point organic solvent may be used in combination at the emulsion-dispersion in view of emulsifiability. The low boiling point organic solvent which can be used in combination is an organic solvent having a boiling point of about 30 to 150° C. under atmospheric pressure. Preferred examples thereof include, but are not limited to, esters (e.g., ethyl acetate, butyl acetate, ethyl propionate, β-ethoxyethyl acetate, methylcellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofuran, dioxane).

In the emulsion-dispersion, an oil phase obtained by dissolving the dye in a high boiling organic solvent or depending on the case, in a mixed solvent of a high boiling organic solvent and a low boiling organic solvent is dispersed in an aqueous phase mainly comprising water to form fine oil droplets of the oil phase. At this time, in either one or both of the aqueous phase and the oil phase, additives described later, such as surfactant, wetting agent, dye stabilizer, emulsification stabilizer and antiseptic, can be added, if desired.

In the general emulsification method, an oil phase is added to an aqueous phase, but a so-called phase inversion emulsification method of adding dropwise an aqueous phase in an oil phase can also be preferably used. This emulsification method can also be applied when the azo or phthalocyanine dye for use in the present invention is water-soluble and the additive is oil-soluble.

In performing the emulsion-dispersion, various surfactants can be used. Preferred examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylene alkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can also be used.

For the purpose of stabilizing the dispersion immediately after emulsification, a water-soluble polymer may be added in combination with the surfactant. Preferred examples of the water-soluble polymer include polyvinyl alcohol, polyvinylpyrrolidone, polyethylene oxide, polyacrylic acid, polyacrylamide and copolymers thereof. Other than these, natural water-soluble polymers such as polysaccharides, casein and gelatin are also preferably used. Furthermore, for the stabilization of dye dispersion, a polymer which does not substantially dissolve in an aqueous medium, such as polyvinyl, polyurethane, polyester, polyamide, polyurea and polycarbonate obtained by the polymerization of acrylic acid esters, methacrylic acid esters, vinyl esters, acrylamides, methacrylamides, olefins, styrenes, vinyl ethers or acrylonitriles, can also be used in combination. This polymer preferably contains —$SO_3^-$ or —$COO^-$. In the case of using this polymer which does not substantially dissolve in an aqueous medium, the polymer is preferably used in an amount of 20 mass % or less, more preferably 10 mass % or less, based on the high boiling point organic solvent.

In preparing an aqueous ink by dispersing the oil-soluble dye or high boiling point organic solvent according to emulsion-dispersion, the control of particle size is important. In order to elevate the color purity or density of an image formed by the inkjet recording, it is essential to reduce the average particle size. The average particle size is, in terms of the volume average particle size, preferably 1 μm or less, more preferably from 5 to 100 nm.

The volume average particle size and particle size distribution of the dispersed particles can be easily measured by a known method such as static light scattering method, dynamic light scattering method, centrifugal precipitation method and the method described in *Jikken Kagaku Koza* (*Lecture of Experimental Chemistry*), 4th ed., pp. 417-418. For example, the ink is diluted with distilled water to have a particle concentration of 0.1 to 1 mass %, then, the particle size can be easily measured by a commercially available volume average particle size measuring apparatus (for example, Microtrac UPA (manufactured by Nikkiso K.K.)). The dynamic light scattering method utilizing the laser Doppler effect is particularly preferred because even a small particle size can be measured.

The volume average particle size is an average particle size weighted with the particle volume and is obtained, by multiplying the diameter of individual particles in the gathering of particles by the volume of the particle and dividing the sum total of the obtained values by the total volume of the particles. The volume average particle size is described in Soichi Muroi, *Kobunshi Latex no Kagaku* (*Chemistry of Polymer Latex*), page 119, Kobunshi Kanko Kai.

Also, it is revealed that the presence of coarse particles greatly affects the printing performance. More specifically, the coarse particle clogs the nozzle of head or even if the nozzle is not clogged, forms a soil to bring about ejection failure or ejection slippage of ink and this seriously affects the printing performance. In order to prevent these troubles, it is important to reduce the number of particles having a particle size of 5 μm or more to 10 or less and the number of particles having a particle size of 1 μm or more to 1,000 or less, in 1 μl of ink prepared.

For removing these coarse particles, a known method such as centrifugal separation or microfiltration can be used. This separation step may be performed immediately after the emulsion-dispersion or may be performed immediately before filling the ink in an ink cartridge after various additives such as wetting agent and surfactant are added to the emulsified dispersion.

A mechanically emulsifying apparatus is effective for reducing the average particle size and eliminating coarse particles.

As for the emulsifying apparatus, known apparatuses such as simple stirrer, impeller stirring system, in-line stirring system, mill system (e.g., colloid mill) and ultrasonic system can be used, but a high-pressure homogenizer is particularly preferred.

The mechanism of the high-pressure homogenizer is described in detail in U.S. Pat. No. 4,533,254 and JP-A-6-47264. Examples of the commercially available apparatus include Gaulin Homogenizer (manufactured by A.P.V Gaulin Inc.), Microfluidizer (manufactured by Microfluidex Inc.) and Altimizer (produced by Sugino Machine).

The high-pressure homogenizer with a mechanism of pulverizing particles in an ultrahigh pressure jet stream recently described in U.S. Pat. No. 5,720,551 is particularly effective for the emulsion-dispersion of the present invention. Examples of the emulsifying apparatus using this ultrahigh pressure jet stream include DeBEE2000 (manufactured by BEE International Ltd.).

In performing the emulsification by a high-pressure emulsion-dispersing apparatus, the pressure is 50 MPa or more, preferably 60 MPa or more, more preferably 180 MPa or more.

A method of using two or more emulsifying apparatuses, for example, by performing the emulsification in a stirring emulsifier and then passing the emulsified product through a high-pressure homogenizer is particularly preferred. In addition, a method of once performing the emulsion-dispersion by such an emulsifying apparatus and after adding additives such as wetting agent and surfactant, again passing the dispersion through a high-pressure homogenizer during filling of the ink into a cartridge is also preferred.

In the case of containing a low boiling point organic solvent in addition to the high boiling point organic solvent, the low boiling point solvent is preferably removed in view of stability of the emulsified product, safety and hygiene. For removing the low boiling point solvent, various known methods can be used according to the kind of the solvent, such as evaporation, vacuum evaporation and ultrafiltration. This removal of the low boiling point organic solvent is preferably performed as soon as possible immediately after the emulsification.

The preparation method for the inkjet ink is described in detail in JP-A-5-148436, JP-A-5-295312, JP-A-7-97541, JP-A-7-82515 and JP-A-7-118584 and the methods described in these patent publications can be used also for the preparation of the inkjet recording ink of the present invention.

In the inkjet recording ink of the present invention, additives such as drying inhibitor for preventing clogging due to drying of ink at the ejection port, penetration accelerator for more successfully penetrating the ink into paper, ultraviolet absorbent, antioxidant, viscosity adjusting agent, surface tension adjusting agent, dispersant, dispersion stabilizer, rust inhibitor, pH adjusting agent, defoaming agent and chelating agent, may be appropriately selected and used in an appropriate amount.

The drying inhibitor for use in the present invention is preferably a water-soluble organic solvent having a vapor pressure lower than water. Specific examples thereof include polyhydric alcohols as represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. In the ink, the drying inhibitor is preferably contained in an amount of 10 to 50 mass %.

Examples of the penetration accelerator which can be used in the present invention include alcohols such as ethanol, isopropanol, butanol, di(tri) ethylene glycol monobutyl ether and 1,2-hexanediol, sodium laurylsulfate, sodium oleate and nonionic surfactants. A sufficiently high effect can be obtained by adding from 10 to 30 mass % of the penetration accelerator in the ink. The penetration accelerator is preferably used in an amount of causing no blurring of printed letter or no print through.

Examples of the ultraviolet absorbent which can be used in the present invention for improving the preservability of image include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JP-A-10-182621 and JP-T-8-501291, compounds described in *Research Disclosure* No. 24239, and compounds of absorbing ultraviolet light and emitting fluorescent light, so-called fluorescent brightening agents, as represented by stilbene-base compounds and benzoxazole-base compounds.

As for the antioxidant which is used in the present invention for improving the preservability of images various organic or metal complex-base discoloration inhibitors can be used. Examples of the organic discoloration inhibitor include hydroquinones, alkoxyphenols, dialkoxyphenols, phenols, anilines, amines, indanes, chromans, alkoxyanilines and heterocyclic rings. Examples of the metal complex include nickel complex and zinc complex. More specifically, compounds described in patents cited in *Research Disclosure*, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the rust inhibitor include acidic sulfite, sodium thiosulfate, ammonium thioglycolate, diisopropylammonium nitrite, pentaerythritol tetranitrate, dicyclohexylammonium nitrite and benzotriazole. In the ink, the rust inhibitor is preferably used in an amount of 0.02 to 5.00 mass %.

The pH adjusting agent for use in the present invention can be suitably used for adjusting the pH and imparting dispersion stability. The pH of the ink is preferably adjusted to 8 to 11 at 25° C. If the pH is less than 8, the solubility of dye decreases to readily cause clogging of a nozzle, whereas if it exceeds 11, the water resistance tends to deteriorate. Examples of the pH adjusting agent include organic bases and inorganic alkalis for giving a basic pH, and organic acids and inorganic acids for giving an acidic pH.

Examples of the organic base include triethanolamine, diethanolamine, N-methyldiethanolamine and dimethylethanolamine. Examples of the inorganic alkali include alkali metal hydroxides (e.g., sodium hydroxide, lithium hydroxide, potassium hydroxide), alkali metal carbonates (e.g., sodium carbonate, sodium hydrogencarbonate) and ammonium. Examples of the organic acid include an acetic acid, a propionic acid, a trifluoroacetic acid and an alkylsulfonic acid. Examples of the inorganic acid include a hydrochloric acid, a sulfuric acid and a phosphoric acid.

In the present invention, apart from the above-described surfactants, a nonionic, cationic or anionic surfactant is used as the surface tension adjusting agent. Examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylenealkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can also be used.

The surface tension of the ink of the present invention is, with or without use of such a surface tension adjusting agent, preferably from 20 to 60 mN/m, more preferably from 25 to 45 mN/m.

The ink of the present invention preferably has a viscosity of 30 mPa·s or less. The viscosity is more preferably adjusted to 20 mPa·s or less. For the purpose of adjusting the viscosity, a viscosity adjusting agent is sometimes used. Examples of the viscosity adjusting agent include water-soluble polymers such as celluloses and polyvinyl alcohol, and nonionic surfactants. The viscosity adjusting agent is described in detail in *Nendo Chosei Gijutsu* (*Viscosity Adjusting Technology*), Chap. 9, Gijutsu Joho Kyokai (1999), and *Inkjet Printer Yo Chemicals* (98 *Zoho*)-*Zairyo no Kaihatsu Doko•Tenbo Chosa*-(*Chemicals for Inkjet Printer* (*Enlarged Edition of 98*)-*Survey on Development Tendency•Prospect of Materials*-), pp. 162-174, CMC (1997).

In the present invention, if desired, various cationic, anionic or nonionic surfactants described above may be used as a dispersant or a dispersion stabilizer, and fluorine- or silicone-base compounds or chelating agents as represented by EDTA may be used as a defoaming agent.

The inkjet recording ink of the present invention can also be used for uses other than the inkjet recording, such as a material for display image, an image-forming material for interior decoration, and an image-forming material for outdoor decoration.

The material for display image indicates various materials such as poster, wallpaper, ornamental goods (e.g., ornament, doll), handbill for commercial advertisement, wrapping paper, wrapping material, paper bag, vinyl bag, package material, billboard, image drawn on or attached to the side face of traffic (e.g., automobile, bus, electric car), and clothing with a logo. In the case of using the dye of the present invention as a material for forming a display image, the image includes not only a strict image but also all patterns by a dye, which can be perceived by a human, such as abstract design, letter and geometrical pattern.

The material for interior decoration indicates various materials such as wallpaper, ornamental goods (e.g., ornament, doll), luminaire member, furniture member and design member of floor or ceiling. In the case of using the dye of the present invention as a material for forming an image, the image includes not only a strict image but also all patterns by a dye, which can be perceived by a human, such as abstract design, letter and geometrical pattern.

The material for outdoor decoration indicates various materials such as wall material, roofing material, billboard, gardening material, outdoor ornamental goods (e.g., ornament, doll) and outdoor luminaire member. In the case of using the dye of the present invention as a material for forming an image, the image includes not only a strict image but also all patterns by a dye, which can be perceived by a human, such as abstract design, letter and geometrical pattern.

In these uses, examples of the medium on which the pattern is formed include various materials such as paper, fiber, cloth (including non-woven fabric), plastic, metal and ceramic. Examples of the dyeing form include mordanting, printing and fixing of a coloring matter in the form of a reactive dye having introduced thereinto a reactive group. Among these, preferred is dyeing by mordanting.

The recording paper and recording film for use in the inkjet recording method of the present invention are described below. The support which can be used for the recording paper or film is produced, for example, from a chemical pulp such as LBKP and NBKP, a mechanical pulp such as GP, PGW, RMP, TMP, CTMP, CMP and CGP, or a waste paper pulp such as DIP, by mixing, if desired, conventionally known additives such as pigment, binder, sizing agent, fixing agent, cation agent and paper strength increasing agent, and then sheeting the mixture by using various devices such as Fourdrinier paper machine and cylinder paper machine. Other than these supports, synthetic paper or plastic film sheet may be used as the support. The thickness of the support is preferably from 10 to 250 µm and the basis weight is preferably from 10 to 250 g/m².

An image-receiving layer and a backcoat layer may be provided on the support as it is to produce an image-receiving material for the ink of the present invention, or after providing a size press or an anchor coat layer by using starch, polyvinyl alcohol or the like, an image-receiving layer and a backcoat layer may be provided to produce an image-receiving material. The support may be further subjected to a flattening treatment by a calendering device such as machine calender, TG calender and soft calender.

In the present invention, the support is preferably paper or plastic film of which both surfaces are laminated with polyolefin (for example, polyethylene, polystyrene, polybutene or a copolymer thereof) or polyethylene terephthalate. In the polyolefin, a white pigment (for example, titanium oxide or zinc oxide) or a tinting dye (for example, cobalt blue, ultramarine or neodymium oxide) is preferably added.

The image-receiving layer provided on the support contains a porous material and an aqueous binder. Also, the image-receiving layer preferably contains a pigment and the pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin. Among these, porous inorganic white pigments are preferred, and synthetic amorphous silica and the like having a large pore area are more preferred. The synthetic amorphous silica may be either a silicic acid anhydride obtained by a dry production process (gas phase process) or a silicic acid hydrate obtained by a wet production process.

Specific examples of the recording paper containing the pigment in the image-receiving layer, which can be used, include those disclosed in JP-A-10-81064, JP-A-10-119423, JP-A-10-157277, JP-A-10-217601, JP-A-10-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777 and JP-A-2001-301314.

Examples of the aqueous binder contained in the image-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and water-dispersible polymers such as styrene butadiene latex and acryl emulsion. These aqueous binders can be used individually or in combination of two or more thereof. Among these, polyvinyl alcohol and silanol-modified polyvinyl alcohol are preferred in the present invention in view of adhesion to the pigment and peeling resistance of the image-receiving layer.

The image-receiving layer may contain a mordant, a water-proofing agent, a light fastness enhancer, a gas resistance enhancer, a surfactant, a hardening agent and other additives in addition to the pigment and aqueous binder.

The mordant added to the image-receiving layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent image quality can be obtained and at the same time, the light fastness of the image is improved.

The water-proofing agent is effective for obtaining a water-resistant image. The water-proofing agent is preferably a cationic resin. Examples of the cationic resin include polyamidopolyamine epichlorohydrin, polyethyleneimine, polyaminesulfone, poly-dimethyldiallylammonium chloride and cation polyacrylamide. The content of the cationic resin is preferably from 1 to 15 mass %, more preferably from 3 to 10 mass %, based on the entire solid content of the ink-receiving layer.

Examples of the light fastness enhancer and the gas resistance enhancer include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl group-containing compounds, ester compounds, amide compounds, ether compounds, alcohol compounds, sulfinic acid compounds, saccharides, water-soluble reducing compounds, organic acids, inorganic acids, hydroxy group-containing organic acids, benzotriazole compounds, benzophenone compounds, triazine compounds, heterocyclic compounds, water-soluble metal salts, organic metal compounds and metal complexes.

Specific examples of these compounds include those described in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258 and JP-A-11-321090.

The surfactant functions as a coating aid, a releasability improver, a slipperiness improver or an antistatic agent. This surfactant is described in JP-A-62-173463 and JP-A-62-183457.

Instead of the surfactant, an organofluoro compound may be used. The organofluoro compound is preferably hydrophobic. Examples of the organofluoro compound include fluorine-containing surfactants, oily fluorine-base compounds (for example, fluorine oil) and solid fluorine compound resins (for example, ethylene tetrafluoride resin) The organofluoro compound is described in JP-B-57-9053 (columns 8 to 17), JP-A-61-20994 and JP-A-62-135826.

As the hardening agent, for example, the materials described in JP-A-1-161236 (page 222), JP-A-9-263036, JP-A-10-119423 and JP-A-2001-310547 can be used.

Other examples of the additive added to the image-receiving layer include a pigment dispersant, a thickener, a defoaming agent, a dye, a fluorescent brightening agent, an antiseptic, a pH adjusting agent, a matting agent and a hardening agent. The image-receiving layer may be composed of one layer or two layers.

In the recording paper or film, a backcoat layer may also be provided. Examples of the component which can be added to this layer include a white pigment, an aqueous binder and other components.

Examples of the white pigment contained in the backcoat layer include inorganic white pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other examples of the component contained in the backcoat layer include a defoaming agent, a foam inhibitor, a dye, a fluorescent brightening agent, an antiseptic and a water-proofing agent.

In a constituent layer (including the back layer) of the inkjet recording paper or film, a polymer fine particle dispersion may be added. The polymer fine particle dispersion is used for the purpose of improving film properties, for example, stabilizing the dimension and preventing the curling, adhesion or film cracking. The polymer fine particle dispersion is described in JP-A-62-245258, JP-A-62-1316648 and JP-A-62-110066. When a polymer fine particle dispersion having a low glass transition temperature (40° C. or less) is added to a layer containing a mordant, the layer can be prevented from cracking or curling. The curling can be prevented also by adding a polymer fine particle dispersion having a high glass transition temperature to the back layer.

The ink of the present invention is not limited in the inkjet recording system to which the ink is applied, and is used for a known system, for example, an electric charge control system of jetting out the ink by utilizing the electrostatic induction force, a drop-on-demand system (pressure pulse system) utilizing an oscillation pressure of a piezoelectric element, an acoustic inkjet system of converting electric signals into acoustic beams, irradiating the beams on the ink and jetting out the ink by utilizing the radiation pressure, and a thermal inkjet (bubble jet) system of heating the ink to form a bubble and utilizing the pressure generated.

The inkjet recording system includes a system of ejecting a large number of small-volume ink droplets of a so-called photo ink having a low concentration, a system of improving the image quality by using a plurality of inks having substantially the same color hue but differing in the concentration, and a system using a colorless transparent ink.

BEST MODE FOR CARRYING OUT THE INVENTION

The present invention is described below by referring to Examples, but the present invention is not limited thereto.

EXAMPLE 1

Deionized water was added to the following components to make 1 liter and the resulting solution was stirred for 1 hour under heating at 30 to 40° C. and then filtered under reduced pressure through a microfilter having an average pore size of 0.25 μm to prepare a light magenta ink.

[Formulation of Light Magenta Ink LM-101]

(Solid Contents)

| | |
|---|---|
| Magenta Dye (a-36) | 7.5 g/liter |
| Urea | 37 g/liter |

(Liquid Components)

| | |
|---|---|
| Diethylene glycol (DEG) | 50 g/liter |
| Glycerin (GR) | 30 g/liter |
| Triethylene glycol monobutyl ether (TGB) | 30 g/liter |
| Triethanolamine (TEA) | 6.9 g/liter |
| Surfynol STG (SW) | 10 g/liter |

Also, Magenta Ink M-101 was prepared by increasing Magenta Dye (a-36) to 23 g in the formulation above.

[Formulation of Magenta Ink M-101]

(Solid Contents)

| | |
|---|---|
| Magenta Dye (a-36) | 23 g/liter |
| Urea | 37 g/liter |

(Liquid Components)

| | |
|---|---|
| Diethylene glycol (DEG) | 50 g/liter |
| Glycerin (GR) | 30 g/liter |
| Triethylene glycol monobutyl ether (TGB) | 30 g/liter |
| Triethanolamine (TEA) | 6.9 g/liter |
| Surfynol STG (SW) | 10 g/liter |

The oxidation potential of Magenta Dye (a-36) used here was nobler than 1.0 V (vs SCE).

Inks LM-102 to LM-109 and Inks M-102 to M-109 each having thoroughly the same composition as LM-101 or M-101 except for adding additives as shown in Table 1 below were produced.

TABLE 1

| | Additive |
|---|---|
| LM-101, M-101 (Comparative Example) | none |
| LM-102, M-102 (Comparative Example) | 2 g/liter of ethylene glycol to LM-101, M-101 |
| LM-103, M-103 (Comparative Example) | 5 g/liter of ethylene glycol to LM-101, M-101 |
| LM-104, M-104 (Invention) | 2 g/liter of phenoxyethanol to LM-101, M-101 |
| LM-105, M-105 (Invention) | 5 g/liter of phenoxyethanol to LM-101, M-101 |
| LM-106, M-106 (Invention) | 2 g/liter of Proxel to LM-101, M-101 |
| LM-107, M-107 (Invention) | 5 g/liter of Proxel to LM-101, M-101 |
| LM-108, M-108 (Invention) | 1 g/liter of Proxel and 1 g/liter of phenoxyethanol to LM-101, M-101 |
| LM-109, M-109 (Invention) | 2 g/liter of Proxel and 2 g/liter of phenoxyethanol to LM-101, M-101 |

These inks each was filled in a magenta ink•light magenta ink cartridge of Inkjet Printer PM-950C (manufactured by Seiko Epson Corporation) and by using the inks of PM-950C for other colors, magenta monochromatic images differing in the density were printed. The image-receiving sheet where the image was printed was inkjet paper Photo Gloss Paper EX produced by Fuji Photo Film Co., Ltd. The image obtained was evaluated on the ejection property of ink and the image fastness.

(Evaluation Test)

1) As for the ejection stability, cartridges were set in the printer and after confirming the ejection of ink from all nozzles, the image was output on 20 sheets of A4-size paper and rated based on the following criteria:
A: Printing was not disordered from start to end of printing.
B: Printing was disordered in some outputs.
C: Printing was disordered from start to end of printing.

This test was performed immediately after the filling of ink (ejection property A) and after the ink cartridge was stored for 2 weeks under the conditions of 40° C. and 80% RH (ejection property B).

2) As for the image preservability, a magenta solid image printed sample was prepared and subjected to the following evaluations.

(1) In the evaluation of light fastness, the image density Ci immediately after printing was measured by a reflection densitometer (X-Rite 310TR) and after the image was irradiated with xenon light (85,000 lx) for 10 days by using a weather meter manufactured by Atlas, the image density Cf was again measured. Then, the dye residual ratio (100×Cf/Ci) was determined and evaluated. The dye residual ratio was evaluated at three points having a reflection density of 1, 1.5 and 2. The sample was rated A when the dye residual ratio was 70% or more at any density, rated B when less than 70% at two points, and rated C when less than 70% at all points.

(2) In the evaluation of heat fastness, the density was measured by a reflection densitometer (X-Rite 310TR) before and after the sample was stored for 10 days under the conditions of 80° C. and 15% RH and the dye residual ratio was determined and evaluated. The dye residual ratio was evaluated at three points having a reflection density of 1, 1.5 and 2. The sample was rated A when the dye residual ratio was 90% or more at any density, rated B when less than 90% at two points, and rated C when less than 90% at all points.

(3) In the evaluation of ozone ($O_3$) resistance, the photo gloss paper having formed thereon the image was left standing for 7 days in a box set to an ozone gas concentration of 0.5 ppm and the image density before and after standing in the ozone gas atmosphere was measured by a reflection densitometer (X-Rite 310TR) and evaluated in terms of the coloring matter residual ratio. The reflection density was measured at three points of 1, 1.5 and 2.0. The ozone gas concentration in the box was set by using an ozone gas monitor (Model OZG-EM-01) manufactured by APPLICS.

The sample was rated on a three-stage scale, namely, rated A when the coloring matter residual ratio was 80% or more at any density, rated B when less than 80% at one or two point (s), and rated C when less than 70% at all points.

The results obtained are shown in Table 2 below.

TABLE 2

|  | Ejection Property A | Ejection Property B | Light Fastness | Heat Fastness | $O_3$ Resistance |
|---|---|---|---|---|---|
| Magenta ink·light magenta ink for PM-950 of EPSON | A | A | C | B | C |
| LM-101, M-101 (Comparative Example) | A | C | A | A | A |
| LM-102, M-102 (Comparative Example) | A | C | A | A | A |
| LM-103, M-103 (Comparative Example) | A | C | A | A | A |
| LM-104, M-104 (Invention) | A | A | A | A | A |
| LM-105, M-105 (Invention) | A | A | A | A | A |
| LM-106, M-106 (Invention) | A | A | A | A | A |

TABLE 2-continued

|  | Ejection Property A | Ejection Property B | Light Fastness | Heat Fastness | $O_3$ Resistance |
|---|---|---|---|---|---|
| LM-107, M-107 (Invention) | A | A | A | A | A |
| LM-108, M-108 (Invention) | A | A | A | A | A |
| LM-109, M-109 (Invention) | A | A | A | A | A |

As seen from the results in the Table, the systems using the ink set of the present invention were satisfied in all performances and surpassed Comparative Examples. When the test for comparison of ejection property was performed after the ink cartridge was stored for 6 weeks under the conditions of 40° C. and 80% RH, the system using LM-108 and M-108 and the system using LM-109 and M-109 were stayed in the rank A, but other systems were decreased to the rank C. This reveals that when two or more antiseptics differing in the structure are contained in the present invention, the ejection stability after aging is more enhanced.

The color hue obtained by the ink of the present invention was equal to that of the ink for PM-950C of EPSON.

Also, when in Example 1, the magenta dye (a-36) was replaced by other dyes represented by formula (1) to produce the ink of the present invention, the same effects as in Example 1 were obtained in view of weather resistance (fastness to light, heat and ozone), ejection stability and color hue.

EXAMPLE 2

Deionized water was added to the following components to make 1 liter and the resulting solution was stirred for 1 hour under heating at 30 to 40° C. and then filtered under reduced pressure through a microfilter having an average pore size of 0.25 µm to prepare a light cyan ink solution (LC-101).

[Formulation of Light Cyan Ink (LC-101)]

(Solid Contents)

| Cyan Dye (154) of the present invention | 17.5 g/liter |
|---|---|
| Urea | 37 g/liter |

(Liquid Components)

| Diethylene glycol | 50 g/liter |
|---|---|
| Glycerin | 30 g/liter |
| Triethylene glycol monobutyl ether | 30 g/liter |
| Triethanolamine | 6.9 g/liter |
| Surfynol STG | 10 g/liter |
| Triethanolamine (TEA) | 6.9 g/liter |
| Surfynol STG (SW) | 10 g/liter |

Also, Cyan Ink Solution (C-101) was prepared by increasing Cyan Dye (154) to 68 g in the formulation above.

[Formulation of Cyan Ink (C-101)]

(Solid Contents)

| Cyan Dye (154) of the present invention | 68 g/liter |
|---|---|
| Urea | 37 g/liter |

(Liquid Components)

| Diethylene glycol | 50 g/liter |
|---|---|
| Glycerin | 30 g/liter |
| Triethylene glycol monobutyl ether | 30 g/liter |
| Triethanolamine | 6.9 g/liter |
| Surfynol STG | 10 g/liter |

The oxidation potential of Cyan Dye (154) used here was nobler than 1.0 V (vs SCE).

Inks (LC-102) to (LC-109) and Inks (C-102) to (C-109) each having thoroughly the same composition as Ink (LC-101) or (C-101) except for adding additives as shown in Table A below were produced.

TABLE A

| | Additive |
|---|---|
| LC-101, C-101 (Comparative Example) | none |
| LC-102, C-102 (Comparative Example) | 2 g/liter of ethylene glycol to LC-101, C-101 |
| LC-103, C-103 (Comparative Example) | 10 g/liter of ethylene glycol to LC-101, C-101 |
| LC-104, C-104 (Invention) | 2 g/liter of phenoxyethanol to LC-101, C-101 |
| LC-105, C-105 (Invention) | 5 g/liter of phenoxyethanol to LC-101, C-101 |
| LC-106, C-106 (Invention) | 2 g/liter of Proxel to LC-101, C-101 |
| LC-107, C-107 (Invention) | 5 g/liter of Proxel to LC-101, C-101 |
| LC-108, C-108 (Invention) | 1 g/liter of Proxel and 1 g/liter of phenoxyethanol to LC-101, C-101 |
| LC-109, C-109 (Invention) | 2 g/liter of Proxel and 2 g/liter of phenoxyethanol to LC-101, C-101 |

These inks each was filled in a cyan ink-light cyan ink cartridge of Inkjet Printer PM-950C (manufactured by Seiko Epson Corporation) and by using the inks of PM-950C for other colors, images differing in the density were printed. The image-receiving sheet where the image was printed was inkjet paper Photo Gloss Paper EX produced by Fuji Photo Film Co., Ltd. The image obtained was evaluated on the ejection property of ink and the image fastness in the same manner as in Example 1.

The results obtained are shown in Table B below.

TABLE B

| | Ejection Property A | Ejection Property B | Light Fastness | Heat Fastness | $O_3$ Resistance |
|---|---|---|---|---|---|
| Genuine ink of EPSON | A | A | B | B | C |
| LC-101, C-101 (Comparative Example) | A | C | A | A | A |
| LC-102, C-102 (Comparative Example) | A | C | A | A | A |
| LC-103, C-103 (Comparative Example) | A | C | A | A | A |
| LC-104, C-104 (Invention) | A | A | A | A | A |
| LC-105, C-105 (Invention) | A | A | A | A | A |
| LC-106, C-106 (Invention) | A | A | A | A | A |
| LC-107, C-107 (Invention) | A | A | A | A | A |
| LC-108, C-108 (Invention) | A | A | A | A | A |
| LC-109, C-109 (Invention) | A | A | A | A | A |

As seen from the results in Table B, the systems using the ink set of the present invention were satisfied in all performances and excellent as compared with Comparative Examples. When the test for comparison of ejection property was performed after the ink cartridge was stored for 6 weeks under the conditions of 40° C. and 80% RH, the system using Inks (LC-108) and (C-108) and the system using Inks (LC-109) and (C-109) were stayed in the rank A, but other systems were decreased to the rank C. This reveals that when two or more antiseptics differing in the structure are contained in the present invention, the ejection stability after aging is more enhanced.

INDUSTRIAL APPLICABILITY

According to the present invention, an inkjet recording ink which is an aqueous ink advantageous in view of handleability, odor, safety and the like and which ensures good color hue and excellent ejection stability even after long-term aging and exhibits excellent weather resistance can be provided.

The invention claimed is:

1. An inkjet recording ink comprising an aqueous medium and a phthalocyanine dye dissolved in said aqueous medium, wherein said phthalocyanine dye is a water-soluble dye having an oxidation potential nobler than 1.0 V (vs SCE) and wherein said ink contains two or more different antiseptics, wherein said phthalocyanine dye is represented by the following formula (I):

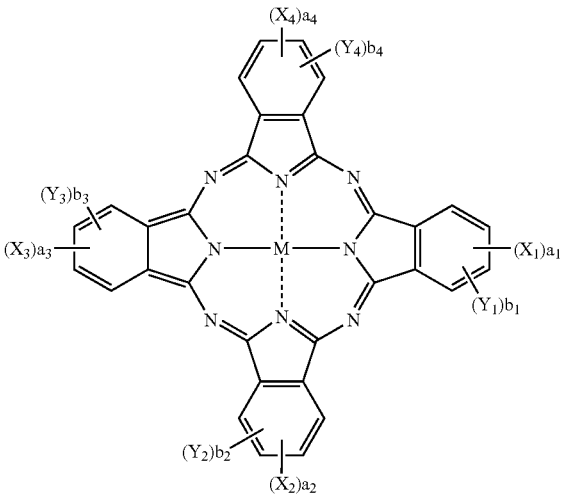

Formula (I)

wherein $X_1$, $X_2$, $X_3$ and $X_4$ each independently represents —SO-Z, —$SO_2$-Z, —$SO_2$NR1R2, a sulfo group, —CONR1R2 or —$CO_2$R1;

Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, and R1 and R2 each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that when a plurality of Zs are present, these may be same or different;

$Y_1, Y_2, Y_3$ and $Y_4$ each independently represents a monovalent substituent;

provided that when a plurality of $X_1s$, $X_2s$, $X_3s$, $X_4s$, $Y_1s$, $Y_2s$, $Y_3s$ or $Y_4s$ are present, these may be same or different;

$a_1$ to $a_4$ and $b_1$ to $b_4$ represent a number of substituents $X_1$ to $X_4$ and $Y_1$ to $Y_4$, respectively, $a_1$ to $a_4$ each independently represents an integer of 0 to 4 but all are not 0 at the same time, and $b_1$ to $b_4$ each independently represents an integer of 0 to 4; and M represents a hydrogen atom, a metal atom or an oxide thereof, hydroxide or halide thereof.

2. The inkjet recording ink as claimed in claim 1, wherein an ozone discoloration rate constant of recorded image is $5.0 \times 10^{-2}$ [hour$^{-1}$] or less when said inkjet recording ink is used for a recording of an image.

3. The inkjet recording ink as claimed in claim 1, wherein a monochromatic moiety of an image printed by using said inkjet recording ink to give a cyan reflection density of 0.9 to 1.1 in a Status A filter has a coloring matter residual ratio (density after discoloration/initial density×100) of 60% or more after storage of said printed image in an ozone environment of 5 ppm for 24 hours.

4. The inkjet recording ink as claimed in claim 1, wherein after storage of the image printed by using said inkjet recording ink to give a cyan reflection density of 0.9 to 1.1 in a Status A filter in an ozone environment of 5 ppm for 24 hours, an amount of Cu ion flowed out from said ink into water is 20% or less of all dyes.

5. The inkjet recording ink as claimed in claim 1, wherein said phthalocyanine dye is a water-soluble dye having an electron-withdrawing group at a β-position of a benzene ring of said phthalocyanine.

6. The inkjet recording ink as claimed in claim 1, wherein said phthalocyanine dye is a water-soluble phthalocyanine dye produced by a process not passing through sulfonation of an unsubstituted phthalocyanine.

7. The inkjet recording ink as claimed in claim 1, wherein the dye represented by formula (I) is a dye represented by the following formula (II):

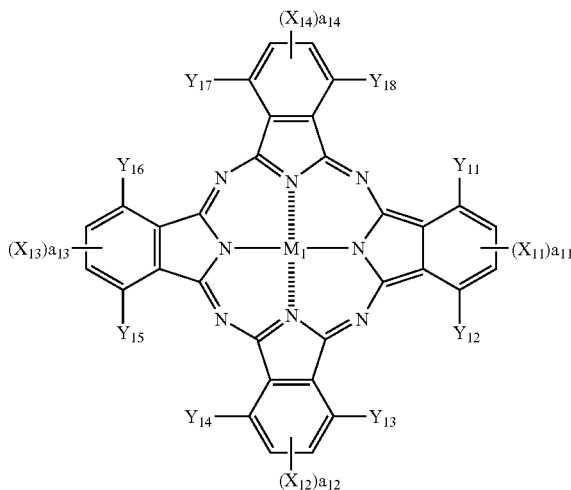

Formula (II)

wherein $X_{11}$ to $X_{14}$ and $M_1$ have same meanings as $X_1$ to $X_4$ and M in formula (I), respectively $Y_{11}$ to $Y_{18}$ each independently represents a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group;

provided that when a plurality of $X_{11}s$, $X_{12}s$, $X_{13}s$, $X_{14}s$, $Y_{11}s$, $Y_{12}s$, $Y_{13}s$ or $Y_{14}s$ are present, these may be the same or different; and $a_{11}$ to $a_{14}$ represent a number of substituents $X_{11}$ to $X_{14}$ respectively and each independently represents an integer of 1 or 2.

8. The inkjet recording ink as claimed in claim 1, which contains an organic solvent having a boiling point of 150° C. or more.

9. An inkjet recording method comprising ejecting said inkjet recording ink claimed in claim 1 on an image-receiving material.

10. An inkjet recording method comprising ejecting ink droplets according to recording signals on an image-receiving material including a support having thereon an image-receiving layer containing a white inorganic pigment particle, thereby recording an image on said image-receiving material, wherein said ink droplet comprises said inkjet recording ink claimed in claim 1.

* * * * *